(12) United States Patent
Paxton et al.

(10) Patent No.: US 7,458,564 B2
(45) Date of Patent: Dec. 2, 2008

(54) GAS CLEANING PROCESS AND EQUIPMENT THEREFOR

(75) Inventors: Richard George Paxton, West Midlands (GB); Michael Fellows-Smith, Benoni (ZA); Friedrich Michael Mindszenty, Johannesburg (ZA); Christian Alexander Mindszenty, Johannesburg (ZA)

(73) Assignee: Mittal Steel South Africa Limited, Vanderbijlpark (ZA)

( * ) Notice: Subject to any disclaimer, the term of this patent is extended or adjusted under 35 U.S.C. 154(b) by 395 days.

(21) Appl. No.: 10/533,125

(22) PCT Filed: Oct. 29, 2003

(86) PCT No.: PCT/ZA03/00160

§ 371 (c)(1),
(2), (4) Date: Dec. 19, 2005

(87) PCT Pub. No.: WO2004/039492

PCT Pub. Date: May 13, 2004

(65) Prior Publication Data

US 2006/0101996 A1    May 18, 2006

(30) Foreign Application Priority Data

Oct. 29, 2002   (ZA) ................................. 2002/8730

(51) Int. Cl.
*B01F 3/04* (2006.01)
(52) U.S. Cl. .......................... 261/79.2; 55/440; 55/461; 96/314
(58) Field of Classification Search ................ 261/79.2; 55/345, 440, 461; 96/190, 215, 314
See application file for complete search history.

(56) References Cited

U.S. PATENT DOCUMENTS 1,228,939 A * 6/1917 Macfadden et al. ........... 96/356

(Continued)

FOREIGN PATENT DOCUMENTS

DE          24 57 446          6/1976

(Continued)

*Primary Examiner*—Scott Bushey
(74) *Attorney, Agent, or Firm*—Finnegan, Henderson, Farabow, Garrett & Dunner, L.L.P.

(57) ABSTRACT

The invention relates to equipment for use in the removal of relatively fine particulates from a first substance, using a second substance. The equipment includes a static, co-current contacting mixer section, having a plurality of stages defining a flow path, with a flow profile, for the first and the second substance, at least some of the stages being shaped to define a substantially curved flow path having an effective centre of curvature located to one side of the flow path, and wherein each adjacent stage has a centre of curvature on an opposite side of the flow path to provide a point of inflexion between adjacent stages and whereby, as the substances flow through the reactor between the adjacent stages, particles present in the first substance migrate through the second substance, first in one direction and then in a substantially opposite direction to promote interphasic interaction between the first and the second substance, the flow path characterised in being provided with an edge formation between at least two adjacent stages towards the point of inflexion so as to enhance the launch of the second substance on the outside of the curved flow path of one stage at relatively high velocity from the edge formation to the inside of the curved flow path of the adjacent stage, thus increasing the contact between the first and the second substances. The equipment also includes a cyclonic section and a spinner section. The invention also relates to a method for the removal of relatively fine particulates from a gas stream, using a scrubbing fluid, as well as a plastic composite material for the manufacture of the equipment.

41 Claims, 34 Drawing Sheets

U.S. PATENT DOCUMENTS

| | | | | |
|---|---|---|---|---|
| 3,338,035 | A | * | 8/1967 | Dinkelacker .................. 55/440 |
| 3,948,771 | A | * | 4/1976 | Bielefeldt ................... 210/779 |
| 4,001,121 | A | * | 1/1977 | Bielefeldt ............... 210/512.3 |
| 4,268,287 | A | * | 5/1981 | Norris ......................... 55/306 |
| 4,375,365 | A | * | 3/1983 | Muller et al. ................. 55/346 |
| 4,530,707 | A | * | 7/1985 | Ovard ......................... 55/440 |
| 4,551,496 | A | | 11/1985 | Renlund et al. |
| 5,741,466 | A | * | 4/1998 | Bodnaras ................... 422/228 |
| 5,972,062 | A | * | 10/1999 | Zimmermann ............... 55/440 |
| 6,766,817 | B2 | | 7/2004 | da Silva |

FOREIGN PATENT DOCUMENTS

| | | |
|---|---|---|
| DE | 100 36 499 A1 | 2/2001 |
| EP | 0 608 902 A1 | 8/1994 |
| GB | 942756 | 11/1963 |
| WO | WO94/29017 | 12/1994 |

* cited by examiner

GAS CLEANING PROCESS AND EQUIPMENT THEREFOR

TECHNICAL FIELD

This invention relates to a gas cleaning process and equipment therefor.

More particularly but not exclusively, the invention relates to the removal of relatively fine particulates from a gas stream, using a scrubbing fluid, and the subsequent separation of the gas and the scrubbing fluid, as well as equipment therefor.

This invention further relates to plastic and abrasion resistant composite materials for the manufacture of the equipment for the removal of the particulates from the gas stream and the subsequent separation of the gas and the scrubbing fluid.

BACKGROUND ART

The removal of relatively fine particulates from a gas stream, using a scrubbing fluid, together with the subsequent separation of the gas and the scrubbing fluid, is well known, and is often carried out by means of a so-called wet scrubbing process.

More particularly, the removal of relatively fine particulates from a gas stream, using a scrubbing fluid, and the subsequent separation of the gas and the scrubbing fluid, is applied in the treatment of the hot off-gases from a Sinter Process such as that which forms part of many of the modern iron making processes.

The off-gases from the Sinter Process typically have a temperature of around 150° C., with a short duration maximum of around 180° C. to 200° C. The gases contain the products of a carbon fuelled combustion process with a relatively large amount of excess air. The gases also contain dust, products of incomplete combustion (including dibenzofurans, PCB's and related compounds), acid gases (derived from sulphur and other impurities in the feed stocks) and condensed fumes. These fumes typically contain condensed alkali and other metal salts (usually chlorides) and condensed silica compounds with other similarly sized fine particulates resulting from decrepitation and other processes that occur within the sintering process.

As a result of the processes that occur, the total dust load is essentially made up of two distinctly sized groups, a relatively coarse fraction and a relatively fine fraction. The coarse fraction is usually extracted from the off gases using cyclonic or other equivalent separators and this is usually done between the sinter process and the main extraction fans which are used to draw the combustion air through the sinter process. Removal of this coarse dust upstream of these fans ensures minimum wear on these fans.

Downstream of the fans, the fine dust and other contaminants have to be removed before the off-gases can be discharged to atmosphere. Current technologies for this utilise bag filters, electrostatic precipitators and wet electrostatic precipitators.

In many instances, however, the proportion of alkali salts (potassium and sodium salts) causes the dust that is to be removed, unsuitable for bag filters and normal electrostatic precipitators, leaving wet electrostatic precipitators as the only existing technology option which is capable of meeting the current requirements regarding final dust concentrations.

Normal wet scrubbing processes and related systems are typically able to remove particles at relatively high efficiencies down to particle sizes of around 3 to 5 microns. A disadvantage of these wet scrubbing processes and systems is however their inability to achieve removal efficiencies of above 90% of particle sizes of less than 0.05 micron. A further disadvantage is the relative large bulk of the known wet scrubbing systems. Another disadvantage of the known wet scrubbing systems is the relatively large floor area required by those systems that are capable of achieving removal efficiencies of above 90% of particle sizes of less than 0.05 micron, such as the conventional Electrostatic Precipitator ("ESP") or the bag house installation.

An additional disadvantage of the typical primary equipment, or components of the assemblies, or so-called packs of components used in the known wet scrubbing systems is the relative difficulty with which they are moulded or cast, using low cost plastics, resins and reinforced plastics or resins (with or without abrasion inhibiting fillers). A further disadvantage of the equipment and components is the relative difficulty with which they are assembled and maintained, typically requiring the use of specialist tools and/or support services.

The influence of the degree of mixing, and hence the contact accomplished, during the multi-phase interaction in the scrubbing process on the efficiencies obtained with a gas scrubbing process and the associated equipment is also well known. The use of equipment for intensifying the mixing and contacting during the multi-phase interaction is therefore common practice.

High intensity mixing and contacting is for example accomplished in the so-called Multiphase Staged Passive Reactor ("MSPR"), with its smoothly contoured design, substantially as described in U.S. Pat. No. 5,741,466 and French Patent No 1.461.788.

The MSPR, as described in the above French Patent, is a static, co-current contacting device for contacting a flow of gas with a typically smaller volumetric flow of liquid, mixture of liquids or slurry. The device is typically used for the purposes of enhancing mass and/or heat transfer in, the removal of fine particulates from, and the creation and dispersion of fine liquid or slurry droplets into a gas stream. The mass transfer typically includes evaporation or partial evaporation of the liquid, the partial or complete condensation, dissolution or reaction of gaseous or vapour components within the gas onto, into or with the liquid(s) or slurry, or the partial or complete removal of a component within the liquid, mixture of liquids or slurry into the gas stream.

The MSPR, as described in the above U.S. patent, has no moving parts, and is typically used for producing interphasic interaction of a first substance in a liquid phase with a second substance in a non-miscible liquid phase, a solid phase or a gaseous phase, wherein the phases of the first and the second substances respectively are characterised by different relative densities. This MSRP typically comprises a plurality of stages defining a flow path for the first and the second substances, each stage being shaped to define a substantially curved flow path having a centre of curvature located to one side of the flow path, and wherein adjacent stages have a respective centre of curvature on opposite sides of the flow path whereby, as the substances flow through the reactor, particles of the second substance are forced to migrate through the first substance, first in one direction and then in substantially in the opposite direction to promote interphasic interaction.

The MSPR has characteristically a relatively smoothly profiled and constant annular flow passage, so that when applied in gas scrubbing, the scrubbing fluid that collides with the wall of the profile tends to accumulate on the inside curve of each bend in the profile and then "drips off" as a semi continuous flow of droplets. This flow of droplets pulls away from the accumulated layer of fluid as a result of induced turbulence from the gas as it flows around the inside of the bend and centrifugal forces resulting from the velocity of the fluid over the flow passage. In general, not all of the scrubbing fluid will come off the surface of the profile, leaving a significant proportion to flow over the subsequent surface. As a result, this part of the scrubbing fluid will not present itself to the bulk of the dust in the gas flow. Also, for a given gas velocity, the droplets that do leave will be relatively large droplets, all of which do not leave from the same point on the inside radius. Some droplets also tend to be released within the shadow of a droplet, that was released a few millimeters earlier, rather than to fill the gaps between previously and/or simultaneously released droplets. As a result, a relatively low proportion of the total gas flow will be traversed by the droplets that are released, than would be the case if the same number of drops were released uniformly around the perimeter.

In addition, much of the scrubbing fluid that is released will be released from relatively far around the inside of the bend. On the inside of the bend, because of turbulence within the gas on the inside of the bend, the shear forces from the high velocity gas will not all be in the direction of the bulk flow. As a result, there will be a reduced velocity input from the gas into the surface layer of the scrubbing fluid on this part of the surface of the flow profile. This, together with viscous drag from the stationary wall of the flow profile within the film of scrubbing fluid, will cause the film velocity at the release of the droplet to be significantly lower than that of the film velocity upstream of the inside radius.

This reduced velocity and the orientation of this velocity with regard to the subsequent flow profile, results in specific disadvantages, including a relatively smaller number of larger droplets, thereby presenting a substantially reduced droplet surface area; and lack of penetration in that the majority of the droplets do not penetrate relatively far into the gas flow before the following bend causes them to move back towards the wall again as a result of both centrifugal action and inertia.

The resultant substantially reduced droplet surface area causes a relatively poor scrubbing efficiency per unit volume of scrubbing fluid that is released from the surface of the flow profile.

The lack of penetration causes a tendency for scrubbing fluid on one side of the flow profile to scrub the gas on that side of the profile only and for the fluid on the other side to scrub the gas on the other side only, with relatively little intermixing of the two flows of scrubbing fluid.

An additional disadvantage of partial contact of the gas with the scrubbing fluid, is that each time the scrubbing fluid leaves the solid surface of the walls of the flow profile, the gas flow tends to accelerate the droplets up to the gas velocity in that area, causing much of this additional velocity energy to be lost when the droplets re-combine with the film of fluid on the wall. The energy loss per unit of dust or fine droplet removal, per unit of gas scrubbing, becomes particularly significant when the droplets do not contact much of the total gas flow.

A related disadvantage of the MSPR is therefore its inability to retain the relative velocities of the gas and fluid flow through the flow profile, allowing the decline in relative velocities to reduce the ability of the scrubbing fluid droplets to remove fine dust and other particulates.

A further disadvantage of the MSPR is the lack of overall wear and chemical resistance of the material used for the manufacture of the MSPR as well as its ability to with stand environments of high impact, abrasion, corrosion and temperature demands such as those present with the scrubbing of the hot off-gases from the Sinter and other furnace related processes.

OBJECT OF THE INVENTION

It is accordingly a first object of the present invention to provide a relatively inexpensive, but effective method for the removal of relatively fine particulates from a gas stream, using a scrubbing fluid, and the subsequent separation of the gas and the scrubbing fluid, such as that required for the scrubbing of the hot off-gases from the Sinter and other furnace related processes.

It is a second object of the present invention to provide relatively inexpensive, but effective, equipment for use in the removal of the particulates from the gas stream, and the subsequent separation of the gas and the scrubbing fluid.

It is a third object of the present invention to provide relatively inexpensive, but effective, plastic composite materials for the manufacture of the above equipment for the removal of the particulates from the gas stream and the subsequent separation of the gas and the scrubbing fluid.

DISCLOSURE OF THE INVENTION

According to a first aspect of the invention there is provided equipment for use in the removal of relatively fine particulates from a first substance, using a second substance, the equipment including a static, co-current contacting mixer section having a plurality of stages defining a flow path, with a flow profile, for the first and the second substance, at least some of the stages being configured and dimensioned to define a substantially curved flow path having an effective centre of curvature located to one side of the flow path, and wherein each adjacent stage has a centre of curvature on an opposite side of the flow path to provide a point of inflexion between adjacent stages and whereby, as the substances flow through the mixer section between the adjacent stages, particles present in the first substance migrate through the second substance, first in one direction and then in a substantially opposite direction to promote interphasic interaction between the first and the second substance, the flow path characterised in being provided with an edge formation between at least two adjacent stages towards the point of inflexion so as to enhance the launch of the second substance on the outside of the curved flow path of one stage at relatively high velocity from the edge formation to the inside of the curved flow path of the adjacent stage, thus increasing the contact between the first and the second substances.

The first substance may be a gas and the second substance may be a scrubbing fluid.

The edge formation may be stepped, and is preferably provided with a substantially perpendicular face relative to the edge formation to enhance the launch of the scrubbing fluid. The perpendicular face may be provided with a slight taper to facilitate mould release when cast.

The stepped edge formation may be provided with a ledge subsequent to the step to provide a first and a second step, the first and the second step preferably being arranged so as to encourage a small back eddy of gas immediately beneath the first step that deflects any downwards dribble of scrubbing fluid around the stepped edge back up into the underside of the main fluid flow as it leaves the first step so as to maximize the contact between the launched scrubbing fluid and the gas.

Each stepped edge may have a fillet radius to ensure maximum effect from the swirl and scouring action from the back eddy, which is encouraged within the stepped edge. The step may have a similar depth and width relative to the stepped edge, preferably of between 0.5 and 2.5% of the outside diameter of an annulus.

The mixer section may be provided with an edge formation towards each point of inflexion. The flow path is preferably configured and dimensioned to orientate both the angle and the position of each launch with respect to the subsequent shape of the flow profile and the controlled change in direction of the flow profile so as to catch the maximum of the scrubbing fluid that are launched at a landing zone on the opposite side of the flow profile before a subsequent launch, thus achieving maximum scrubbing effect from all scrubbing fluid.

The flow path may have a flow profile that is configured and dimensioned, with the step towards the start of each inside radius, such that the position of launch of effectively all the scrubbing fluid is towards the beginning of each inside curve so as to maximize the contact between the launched fluid and the gas. The flow path may have has a flow profile that is configured and dimensioned such that the scrubbing fluid leaves at the point of launch as a substantially single, flat layer of fluid, thereby ensuring that the minimum of droplets are released within the shadow of droplets that left prior thereto so as to maximize the contact between the launched scrubbing fluid and the gas. The flow path may have a flow profile that is configured and dimensioned such that the bulk of the scrubbing fluid reaches the far side of the flow profile before the scrubbing fluid on that side is released at the position of launch towards the beginning of the next bend so as to maximize the contact between the launched scrubbing fluid and the gas. The flow path may have a flow profile that is configured and dimensioned such that, by the angle of the lead up to that step and the introduction of substantially axially orientated straight sections to the flow profiles, the scrubbing fluid, when reaching the opposite side wall, arrives at an angle of approach which approaches zero degrees so as to maximise the recovery of the energy of the droplets within the surface film and therefore to minimize abrasion at the landing zone. The flow path may have a flow profile that is configured and dimensioned, by the introduction of substantially axially orientated straight sections to the flow profiles, so that the distance from the landing zone to the subsequent launching point is minimized so as to minimize the subsequent effects of viscous drag on the landing velocity of the scrubbing fluid.

The flow path may have an increased launch angle of between about 3° and 10° relative to that which is used for the outer annulus. The flow path may be configured and dimensioned to provide an increased gas velocity down the inner annulus of between about 5 and 25% relative to that down the outer annulus.

The flow path may have a flow profile that is characterised in that the bend that gathers the scrubbing fluid ready for launching into the outer annulus is configured and dimensioned such that the scrubbing fluid droplet impingement and film velocity on this bend and at the subsequent launch point are no more severe than for that at the equivalent point in the outer annulus.

The flow path may have a flow profile that is configured and dimensioned such that the section of the flow profile leading from each inner annular zone to the respective following outer annular zone optimises recovery of the extra velocity energy in the inner annulus area back to pressure energy at the outer annulus. Preferably, the flow path has a flow profile downstream of the landing zone for the bulk of the droplets wherein the flow area increases substantially steadily and progressively whilst maintaining a relatively constant flow direction and achieving a substantial portion of the flow area of the outer annulus prior to the outer annulus launch point and prior to the associated change in direction of the gas flow.

The mixer section may be characterized in achieving removal efficiencies of above 90% of particle sizes of less than 0.05 micron. The reactor may be suitable for scrubbing waste gas from a modern high-performance Sinter Plant.

The mixer section may be provided with a scrubbing fluid inlet, the scrubbing fluid inlet being arranged to create relative adiabatic quenching of the gases. The adiabatic quenching of the gases may be to a temperature of between 20 and 60° C., and preferably to a temperature of about 30 to 50° C. The scrubbing fluid inlet may be arranged such that the bulk of the scrubbing fluid retains a large droplet form and a low launch velocity relative to the droplet sizes and launch velocities in the subsequent stages in the mixer section.

The equipment may include a cyclonic section for the separation of the gas and the scrubbing fluid, the cyclonic section preferably fitting within the same cylindrical profile as that of the mixer section.

In addition, the outlet for the scrubbing fluid is connected in an axial direction and within the same overall cylindrical profile.

The gas and scrubbing fluid mixture typically exits in an axial direction from either the inner or the outer diameter section of the varying diameter annular profile of the mixer section. As a result of the position of the last launch point and the subsequent profile of the annular flow path, most of the scrubbing fluid will be on the outside wall of the last bend as the mixture enters the cyclonic section, with only splash and fine droplets remaining within the bulk gas flow.

The cyclonic section may be provided with an exit end in the form of a vortex finder, configured and dimensioned to duct away the main vortex of substantially scrubbing fluid free gas while gathering the substantially gas free scrubbing fluid off the wall of the cyclonic section.

The equipment may be provided with a relatively long cyclonic section in order to retain the radial velocity component of the gas flow within the cyclone body within the range required to get the required degree of separation of scrubbing fluid droplets prior to discharging the gas.

The length of the cyclonic section preferably is characterised in that the distance between the spinner section and the top of the vortex finder is about 5 to 10 times the diameter of the cyclonic section.

The cyclonic section may have a length of about 1.5 to 2.5 meters, and preferably about 2 meters, and a diameter of about 0.1 to 0.5 meters, and preferably about 0.3 meters.

The equipment also may include a spinner section, having a set of angled blades for imparting a circulatory motion to the gas and scrubbing fluid mixture prior to entry of the cyclonic section. The width of the flow path through the spinner section may be increased radially so that the cross sectional area for the flow is maintained relatively constant as the flow direction changes, thus retaining relative exit velocities of the gas and the scrubbing fluid substantially similar to the respective entry velocities.

The spinner section may be configured and dimensioned so that any object that can pass through the main mixer section can also pass through the spinner section. The spinner section may be provided with an annulus though which the gases and scrubbing fluid flow so as to calm the bulk of any residual turbulence from the spinner blades, and thereafter through a relatively simple cylindrical conduit. The annulus preferably has an inner, hollow profile with a deep cylindrical recess with a conical, alternatively, domed inner end in order to remove any droplets of scrubbing fluid that contaminate the scrubbed and cycloned product gases.

The equipment further may include a discharge pipe centrally orientated relatively to the vortex finder, with a diameter of about 70 to 90% of that of the vortex finder outlet, providing an annular gap there between. The annular gap may be configured and dimensioned to pass any debris that could access the equipment and wider than the typical maximum splash and spray layer that would accompany the scrubbing fluid as it runs down the inner walls of the cyclonic section. The gap is preferably configured and dimensioned so that the minimum width of the annular gap at the vortex finder is based on the concept of capturing all such splash and spray into this annular area.

The equipment may be characterized in that the mixer section, the spinner section and the cyclonic section are cast in a single, substantially integral unit.

According to a second aspect of the invention there is provided a method for the removal of relatively fine particulates from a first substance, using a second substance, the method including the steps of transporting the first substance and the second substance through a plurality of stages in a flow path, at least some of the stages being shaped to define a substantially curved flow path having an effective centre of curvature located to one side of the flow path, and wherein each adjacent stage has a centre of curvature on an opposite side of the flow path to provide a point of inflexion between adjacent stages with the flow path being provided with an edge formation between at least two adjacent stages towards the point of inflexion and whereby, as the first substance and the second substance flow through the reactor between the adjacent stages, particles present in the first substance migrate through the second substance, first in one direction and then in a substantially opposite direction to promote interphasic interaction between the first substance and the second substance; and launching the second substance on the outside of the curved flow path from the edge formation at relatively high velocity to the inside of the curved flow path of the adjacent stage.

The first substance may be a gas and the second substance may be a scrubbing fluid.

The method may be characterized in achieving removal efficiencies of above 90% of particle sizes of less than 0.05 micron. The method may be suitable for scrubbing waste gas from a modern high-performance Sinter Plant, using a suitable scrubbing fluid.

The method may include the step of adding a relatively fine dust upstream of the mixer section to enhance the removal of vapours in the gas. The fine dust may be pre-selected so as to enhance the chemisorbtion on to the dust of gasses and vapours selected from the group consisting of dibenzo furan, PCB, related compounds and any combinations thereof.

According to a third aspect of the invention there is provided a plastics material for the manufacture of the equipment for the removal of relatively fine particulates from a gas stream, the material comprising an abrasion resistant composite selected from the group consisting of a filler, Silicon Carbide and a vinyl ester resin.

The filler may consist of silica, alumina and/or glass fibre, and is preferably subjected to Silane pre-treatment.

The Silicon Carbide may have a predetermined particle size and size distribution, and preferably consist of a combination of 10 and 60 mesh particulate material thus providing the required abrasion and impact resistance. Preferably, the Silicon Carbide consists of pre-selected mixtures of 10 mesh solids with 60 mesh solids, thus obtaining the predetermined mixing and flow properties that enhances the moulding process and the ultimate abrasion and impact resistance of the equipment.

The material may include hollow or sponge-like fine particles so as to impart a degree of elasticity and overall sponginess to the resin. The fine particles preferably have sufficient chemical resistance so as not to degrade by the environment and are small relative to at least the larger filler particles and, preferably are small relative to the smaller filler particles. The fine particles may include hollow glass spheres and both hollow and sponge-like kaolin particles.

SPECIFIC EMBODIMENT OF THE INVENTION

A preferred embodiment of the invention win now be described by means of a non-limiting example only and with reference to the various aspects of the invention and the accompanying drawings.

A single high intensity mixing and contacting device or so-called MSPR, was modified in accordance with the invention. The modified MSPR was used in pilot plants designed for the removal of relatively fine particulates from a gas stream, using a scrubbing fluid, and the subsequent separation of the gas and the scrubbing fluid, the gas stream being part of the hot off-gases from the Sinter and other furnace related processes at one of the Iscor Limited iron making facilities at Vanderbilt Park, South Africa.

The hot off-gases from the Sinter and other furnace related processes, so-called sinter gas, was generated during the sintering of a mixture of fine ores, additives, iron-bearing recycled materials from downstream operations such as coarse dust and sludge from blast-furnace gas (BF gas) cleaning, mill scale, casting scale and coke breeze. The modified MSRP is hereinafter referred to as an "IGCP unit".

As a result of the gas to scrubbing fluid interaction in the IGCP unit, the gas temperature was reduced by a combination of simple heat transfer from the cool scrubbing fluid and the latent heat of evaporation as some of the scrubbing fluid evaporated into the relatively low dew point gases. At the same time, some of the component gases within the main gas stream dissolved into the scrubbing fluid and some also reacted with components within the scrubbing fluid.

In the description, the IGCP unit itself is described, beginning at the gas and scrubbing fluid inlet into the IGCP unit and going all the way through the IGCP unit. After describing the details of all the individual parts of the IGCP unit, the mounting arrangements for groups of units are described together with all the relevant details of the components within the main carrier vessel.

Following this, an overall application is described, indicating how the carrier vessel and its contents form part of an overall process system.

The above descriptions are with reference to the accompanying drawings, wherein—

FIG. 4 is a side elevation of an IGCP unit, depicting the same details as are shown in FIG. 3a;

Figure 1:
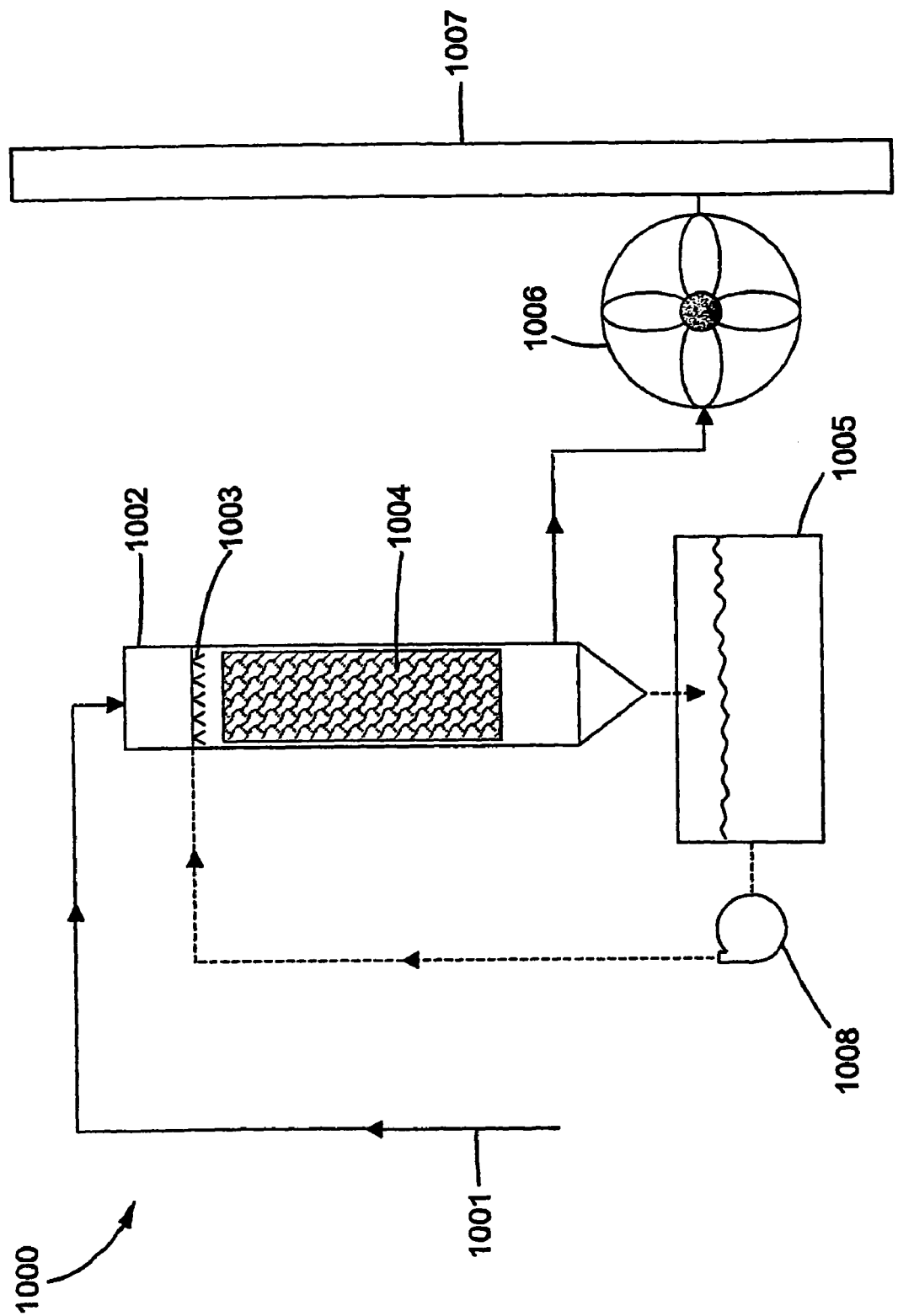
FIG. 1 is a diagrammatic layout of a 1% throughput pilot part incorporating an IGCP unit.

1. THE BASIC FORM AND FUNCTION OF THE FLOW PROFILE OF THE MIXER SECTION OF THE IGCP UNIT

1.1 The Form and Function of the Prior Art Flow Profile

The basic flow profile of the prior art MSPR consists typically of an annular passage that systematically changes diameter as a gas stream, or the so-called main carrier gas, containing contaminants such as fine particulates droplets, such as the hot off-gases from the Sinter and other furnace related processes, and a suitable scrubbing fluid, such as water, progress along the passage. As a result, the gas is continually changing its radial velocity component from radially one way to radially the other.

In addition, the overall average speed of the gas is varied (i.e. increased and/or decreased) along the length of the annulus, e.g. at the changes of direction, at the inner and/or outer radial positions (when the gas has essentially an axial velocity only) or progressively as it moves through the overall profile.

Within this gas flow, the changing velocity components bring with them the issue of the relative gas flow with respect to droplet and other particulates that are present The resultant relative velocities apply viscous drag from the gas to the droplets and particulates, which in turn changes their natural flow path within the gas flow and imparts rotational movements to the individual droplets and particles. The relative and rotational movements between the gas and the droplets and particulates promote intense interactive contact between all of the three phases (solid, liquid and gas) with respect to each other.

In addition to these reasons for interactive contact, and as the mixture passes around each corner in the flow profile, centrifugal forces are applied to each of the three phases. The forces move any particles or droplets that are less dense than the main carrier gas towards the centre of the curvature and all particles or droplets that have a higher density than the main carrier gas are moved away from the centre of the curvature. The relative movements of the particles and droplets thus cause further enhancement of the interactive contact between all of the three phases with respect to each other.

1.2 Features of the Flow Profile in Accordance with the Invention

The flow profile of the mixer section of the IGCP according to the present invention is however shaped so as to collect and accumulate scrubbing fluid on the outside of each curve and to launch it at high velocity from a sharp edge (or corner) at or near to the point of inflexion (change of direction from concave to convex) between the outside collecting surface and the start of the next inside curve.

Viscous drag on the surface of the profile causes the scrubbing fluid to leave the launch point at a velocity that is lower than that of the adjacent gas. This velocity difference not only causes the thin film of scrubbing fluid to break up into small droplets but it also creates an intense interaction between the droplets and the gas and between the droplets and any particulates or other droplets that are within the gas.

Immediately down stream of the launch point, the gas flow changes direction such that all the gas has to pass through this finely dispersed and high velocity stream of scrubbing fluid droplets. Again, intense interaction occurs between the droplets and the gas and between the droplets and any particulates or other droplets, which may be within the gas.

As a result of this intense interaction and as a result of general viscous drag, the droplets of scrubbing fluid begin to take on a second component to their velocity, in line with this new gas flow direction. The finer scrubbing fluid droplets gain a higher velocity than the coarser ones, because of their relatively smaller mass with respect to the viscous drag, which is applied to them.

Soon after the change in direction of the gas flow, the gas flow changes direction again and the finer droplets are subjected to a combination of centrifugal forces and simple inertia which cause them to move to the outside of the gas flow passage. The shape of the gas flow passages is such that the centrifugal forces are very high relative to normal gravity. As a result, the particles move towards the outside of the flow passage at relatively high cross flow velocity, causing an interaction, the intensity of which is a function of gas velocity, droplet size and the specific flow profile that is used.

1.3 The Resultant "Fight Path" of the Scrubbing Fluid in the Flow Profile

In the flow profile in accordance with the invention, the larger droplets of scrubbing fluid first accelerate in the direction of gas flow and then substantially traverse the changed gas flow direction with relatively little change in their direction of movement. This is achieved by the specifically arranged profile and by the launching of the scrubbing fluid from the point of inflection at the end of the previous bend in the profile. Thus, the gas and what is suspended or otherwise present in the gas flow past the droplets as a high speed cross flow as the momentum of the droplets carry them across the flow profile to collide with and mostly coalesce onto the opposite wall of the flow passage. As the gas continues on around the bend in the flow passage, the smaller droplets arrive at the opposite side of the flow passage by a combination of simple momentum resulting from their launch and centrifugal forces resulting from their acceleration in the direction of the gas flow plus the ongoing curvature of the gas flow passage. The finer droplets are less able to cross the gas flow passage as a result of their initial launch velocity, but because they will tend to attain a velocity which is closer to that of the gas, then, relative to their mass they will be subject to much greater centrifugal forces than the medium and larger sized droplets. The centrifugal forces cause the majority of these fine droplets to move to the outside surface of the flow passage and for them to combine with the layer of scrubbing fluid, which has developed as a result of the larger droplets having reached that surface.

A combination of the arrival velocity of each droplet and viscous drag from the gas as it flows around the bend causes the high velocity of the layer of scrubbing fluid which accumulates on the outside of the flow profile. As a result of the high gas velocity and general splash from the larger droplets, much of the layer will consist of a sequence of droplets being ripped off wavelets in the surface layer and being accelerated within the gas. A combination of centrifugal forces and the ongoing curvature of the surface intersecting the flow path of these droplets causes the majority of these droplets to recombine with the surface layer and, because of their increased velocity within the gas boundary layers, the layer of scrubbing fluid film gains speed. The remainder of near the surface droplets inevitably stays close to the surface layer.

At the next point of inflection a similar launch point is provided and the process of re-launching a stream of droplets is repeated. Any droplets of scrubbing fluid which leave the surface layer and do not recombined with it before the surface layer passes this next launch point simply behave in a similar manner to the droplets which form from the surface layer as it leaves the launch point.

The re-launched stream of droplets interact with the particulates and other components of the gas stream, as well as collide with and capture fine droplets from the previous launch which were too fine to have made the complete traverse of the flow passage. As a result, the net amount of scrubbing fluid which is launched from each successive launch point is relatively constant at virtually the total scrubbing fluid flow substantially throughout the whole of the mixer section, other than for a potentially reduced flow at the second launch. In fact, the volume of scrubbing fluid, which is launched at the second launch, is typically greater than about 80% of the total scrubbing fluid flow.

The net result of the various mechanisms influencing the "flight path" of all the different sizes of scrubbing fluid droplets from the launch point to the other side of the flow passage is that all the droplets traverse the gap at high speed and, as the direction of their flight is bent in the direction of the gas flow, so the direction of the gas flow changes some more. This ensures that the gas always endeavour to maintain a generally perpendicularly orientated direction with respect to the velocity of the droplet. With the larger droplets, this relative direction (once the droplets are clear of the launch point) is very close to perpendicular over the whole of the subsequent flight path. With the smaller droplets, this relative direction is not as close to perpendicular and the smaller the droplet, the further it is away from perpendicular.

The further the respective velocity directions between gas and scrubbing fluid are away from perpendicular, the lower the resultant gas to droplet relative velocity. When the gas to scrubbing fluid velocity is reduced, so the number of dust particles, which are collected per unit time for a given size of droplet, also reduces. However, this is mostly compensated for by the fact that the smaller droplets take longer to cross the gap. Therefore, the net scrubbing effect resulting from a longer exposure time to the gas stream per launch for small droplets, but with less intense exposure (or interaction) is similar to that created for larger droplets where there is a shorter exposure time but with more intense exposure.

1.4 The Benefit of Repeating Launches

A significant number of scrubbing fluid launch points arranged one after the other thus accumulates over successive launches into a very high removal efficiency, what otherwise would only provide a relatively poor removal efficiency for a given size of particle or fine droplet per launch of scrubbing fluid. Providing the gas velocity and all the flow profiles and other criteria remain relatively similar over successive launches, the dust removal efficiency for a particular size of dust is relatively constant for each successive launch.

Thus, for example, if say 30% of a specific size of dust is removed as a result of one launch stage, then after 5 such launch stages, just over 82% of that size of dust will be removed and after 10 such stages, a little over 97% will be removed. Similarly and for example, at say 45% removal per launch, and after 5 launches, a total of about 95% will be removed, while at 60% removal per launch, and after 5 launches, a total of about 99% will be removed.

1.5 Scrubber Fluid Droplet Formation

The flow path of the present invention has a flow profile that is shaped such that effectively all of the scrubbing fluid leaves at the start of each inside curve and not at some point that is about 50% or more around the curve.

Also, the scrubbing fluid leaves as a single flat layer (thereby ensuring that no droplets are released within the shadow of droplets which left a little earlier). Furthermore, effectively all of this scrubbing fluid reaches the far side of the flow profile before the fluid on that side is released at the commencement of the next bend. In addition, the introduction of axially (or near axially orientated) straight sections to the flow profiles ensures that a) when the fluid reaches the far wall it arrives at an angle of approach which is as close as possible to zero, such that as much as possible of the energy of the droplets is recovered within the surface film (which also minimizes abrasion); and b) the distance from the "landing zone" for these droplets to the re-launch point is as short as possible so as to minimize the subsequent effects of viscous drag on this "landing velocity".

Effectively, complete launching of the fluid is achieved by creating the step at the start of each inside radius. The angle of the lead up to that step sets the launch angle of the droplets. It is envisaged that the launch angle can be set to suit the shape, proximity and width of the subsequent bend. In this way, maximum contact between the launched droplets and the gas is achieved, each time they are launched.

Typically, there is always a minor "dribble" of scrubbing fluid around the edge of a stepped edge, especially when the edge is not sharp, e.g. as a result of wear or other forms of damage. If such a "dribble" is of sufficient magnitude that further on around the inside of the bend, the "dribbled" fluid would form a significant "drip off" zone, this fluid will not create that much of a scrubbing function per unit of scrubbing fluid that is released. However it will still absorb almost as much energy per unit of scrubbing fluid as that which is launched from the stepped edge.

In order to avoid this loss of efficiency, the detail of the stepped edge has been developed to have a subsequent ledge just beneath the step. This ledge is arranged so as to encourage a small back eddy of gas immediately beneath the main step which will sweep any downwards flow of "dribble" back up again into the underside of the main fluid flow as it leaves the main step. In this way, the fluid that would have been in the "dribble" is put back into the main flow of scrubbing fluid, thereby ensuring maximum scrubbing effect for effectively the same energy usage that would have occurred had the "dribble" been allowed to flow clear of the step to a subsequent "drip off" zone part way around the curve.

2. Preferred Orientation for the IGCP Unit

The normal and preferred arrangement for an individual IGCP unit is with its axis vertical with the input gas and the clean scrubbing fluid inlets at the top. In the preferred arrangement, the scrubbed gas and the used scrubbing fluid exit separately from the bottom of the unit in separate ducts. Although the unit performs relatively efficiently in a horizontal orientation, the ultimate performance is affected by gravity, which causes an initially uniform distribution of scrubbing fluid within the gas flow to become sufficiently non-uniform to affect the scrubbing performance. This effect from gravity is largely overcome by using a slightly higher flow rate of scrubbing fluid, however, this does create an overall higher gas pressure drop within the unit for the same degree of performance.

3. Various Features of the Mixer Section of the IGCP Unit 3.1 Scrubbing Fluid Inlet into the IGCP Unit The scrubbing fluid can be fed into the inlet of the unit in a number of ways. The choice depends upon the nature of the dust, which is to be removed. When dust is not present, i.e. for simple contacting of gas with scrubbing fluid, the choice of scrubbing fluid inlet should be based on simple economics and practicality.

For process reliability and cost reasons, the use of spray nozzles is avoided. If the dust (or part of the dust) has the potential for reacting with the scrubbing fluid to form a concretion which hardens with time, then it is essential to prevent any of the dust from being able to settle or accumulate onto a wet surface or onto a surface where capillary action or occasional splash could sufficiently wet the dust so as to cause the concretion process to proceed.

In this invention, four different techniques for feeding the scrubbing fluid have been envisaged that will overcome the problem of concretion.

The four concretion resistant options are:
a) An arrangement with a single central feed which is directed to a shaped central target piece which breaks the flow into a uniformly spread radial flow. This radial flow is usually horizontal or slightly down from horizontal. However, it may be angled slightly upwards or further downwards from horizontal. The inlet gas flows around the centre feed and is also spread radially outwards by this target piece. Before the gas reaches the outer wall of the cylindrical IGCP unit, the circular entry cowl (or ring) causes the direction of gas flow to change from partially radial to axial and then the gas enters the annular flow profile of the IGCP unit Before the gas enters the IGCP unit flow profile, it flows through the radial flow of scrubbing fluid.

The scrubbing fluid naturally wets and irrigates the inner surface of the annular flow profile of the IGCP unit and once it has traversed the annular gap, it wets the outer surface as well. The shape of the central target is such that not only is the inlet velocity of the fluid maintained (so as to give the fluid sufficient momentum to carry the majority of itself across the gap) but also the incoming gas has to accelerate across the top of the radial flow of scrubbing fluid over the surface of the target piece, in order to gain the necessary speed to enter and pass through the annular flow profile of the IGCP unit. The consequent high velocity gas flow causes the scrubbing fluid to be accelerated as a result of viscous drag from the high velocity gas, firstly in a radially outwards direction whilst it is still flowing on the surface of the target piece and then in a downwards or axial direction as the gas turns to flow down (or along if the IGCP unit is arranged horizontally) the annular flow profile.

As a result of this arrangement, the scrubbing fluid first strikes the wall of the IGCP unit below (or downstream) of the circular entry cowl. In addition, the shape of the wall at this point is such that the fluid strikes the wall at a relatively shallow (or glancing) angle and as a result all potential splashes are in the general direction of the gas flow, even if those splashes have a significant radial component. There is therefore an almost single line contact between the fluid and the outer wall of the annulus, i.e. a single line between dry wall and wet wall. Any dust which settles onto the wall at this line will be in a high velocity and hence high shear area. As a result, dust accumulation is unlikely to occur and if it does, it will only accumulate very slowly.

With this type of entry and when there is the potential for concretion, it would be normal for the IGCP unit to be arranged with more than one unit. Typically they would be arranged into a minimum of four groups. On a sequential basis one group would have its gas input stopped while the other three (or more) groups would share the extra load. The scrubbing fluid would remain on. The shape of the central target piece, its position relative to the circular entry cowl and the shape of the downstream side of this cowl are such that when the gas flow stops, the fluid will strike the wall a little further upstream and at a more acute angle. The more acute angle will both reduce splashing and assist the rapid wash off of any commencement to a concretion build up.

After what should normally be a few seconds, the gas flow can be restored to that group of units and each in turn of the other groups of units can be similarly washed clear of any concretion.

The frequency of these wash offs will be determined by the rate of the chemical concretion reaction. Typically, wash off should not be necessary more than once every few hours, even in the presence of high dust loads with very rapid chemical reactions.

This style of concretion prevention lends itself to situations where the inlet gas is hot and where the wet surface created by the washing off process will dry rapidly because of the heating effect from the thermal mass of the circular entry cowl and the drying effect of the high velocity hot gases flowing past the surface.

In many circumstances, this same wash off procedure can be achieved by simply reducing the gas flow (rather than stopping it) on that group of units for a few seconds.

Alternatively the wash off can be achieved by increasing the scrubbing flow to that group of units. An increased scrubbing fluid flow will cause the fluid entry velocity to increase thereby increasing the radial component of the velocity of the fluid as the fluid flows across the surface of the target piece and then on across the annular gap to the outer wall of the IGCP unit. This increase in velocity and overall momentum (resulting from both increased mass flow and velocity) will cause the fluid to strike the wall slightly upstream of the normal position, thereby achieving the necessary wash off of any concretion.

Usually, increasing the scrubbing fluid flow rate increases the gas phase pressure drop across the unit. Therefore, an increase in the scrubbing fluid flow rate to a group of units will normally cause some of the gas flow to re-direct itself automatically to the other units. The resultant reduced gas flow to the units which are being washed will therefore assist the process.

It should be remembered, however, that with particularly reactive dusts, gas flow stopping may be necessary for each wash off, or after a small number of washes from one of the above styles of "flow adjustment" washes.

If the inlet gas temperature is at, near or below its dew point then this design option may not be appropriate. However, for all other circumstances it would normally be the preferred design because of its constructional simplicity and because of its ability to handle low scrubbing fluid volumes with minimal potential for blockage or mal-distribution.

b) An arrangement which functions in a very similar manner to that of the previous design but which uses a standard hollow cone spray nozzle with a wide spray angle to create the initial radial flow of scrubbing fluid. Preferably, the nozzle should have a relatively low feed pressure and should use a tangential inlet feature to create the hollow cone spray, as these styles tend to produce less occasional droplets outside the main cone. This system has the advantage that it is possible to change the cone spray angle slightly by varying the scrubbing fluid feed pressure, thereby avoiding the need for frequent gas flow adjustment or stoppages in order to effect the wash off of any concretions.

However, most styles of hollow cone nozzle will produce occasional droplets which are outside the normal spray pattern and the outlet of the nozzle is normally subject to concretion build up which can have a pronounced effect upon the uniformity and shape of the spray pattern. Once the spray pattern becomes distorted, then concretion problems around the circular inlet cowl will be more likely.

Despite this potential draw back, this inlet style for the scrubbing fluid has many advantages, especially when it is difficult for the gas feed to be stopped on individual or groups of IGCP units, or when concretion is not too severe.

c) An arrangement with a single or multiple tangential feed arrangement which feeds tangentially into an annular flow channel which is located just upstream of the entry to the annular flow profile of the IGCP unit. This style of scrubbing fluid inlet is only really suitable for IGCP units that are arranged with a vertical or near vertical axis.

The tangential feed(s) should enter the annular flow channel from either the top (or the bottom) near the perimeter of the flow channel or from the perimeter of the flow channel in such a way as to minimize the potential for splashing. The flow channel should have a horizontal or near horizontal floor (i.e. within the range of about + or −30° relative to the horizontal) and this floor should continue radially inwards from the channel. Once it is clear of the annular channel this floor should preferably slope downwards. This slope should be preferably in the range of 20 to 70° from the horizontal, but angles greater or lesser than this range can be used, depending upon the nature of the scrubbing fluid, the volumetric flow of scrubbing fluid relative to the gas flow and the size of the IGCP unit.

Gas would enter the IGCP unit from above this conically sloping surface, accelerating as it moves down the cone. At a point where the gas velocity has risen to a high enough level (typically to around 0.3 to 1.3 times the average velocity within the annular profile of the IGCP unit) then the conical surface should change abruptly to a co-axial (or near co-axial) cylindrical hole which should direct the combined flow of gas and scrubbing fluid down onto the top of the core of the IGCP unit. This top should preferably be co-axial or near co-axial with respect to the cylindrical hole and it should have a domed top, or should be finished with a torrispherical or some other form of rounded conical or otherwise pointed end. This end should have a uniformly symmetrical profile with respect to any orientation about the axis of the IGCP unit, so as to shed all the scrubbing fluid which lands on this top end of the core of the IGCP unit, uniformly around its perimeter.

The top of the core should be positioned low enough with respect to the conical section such that at least some of the fluid flowing down the conical section will routinely cross the centre line of the cylindrical section before it reaches the top of the core. Additionally, or alternatively, especially where the conical section has a relatively steep slope, the slope of the last part of the conical section just before the cylindrical section can be reduced so as to impart a greater radial component to the velocity of the scrubbing fluid as it leaves the end of the conical section. In this way the fluid will not only wet uniformly the walls of the cylindrical part of the entry but will also wet the top of the core and as a result it will uniformly distribute the scrubbing fluid over the walls of the core below it.

The essential part of this design is the design of the dust shrouding over the tangential inlet and the annular flow channel especially at the water exit from that channel on to the surface of the conical section. Any splashing which occurs within the annular flow channel must be contained by this shrouding and must be returned to the annular flow of scrubbing fluid, together with any condensation that may occur within that area.

The method of return is also critical. As the scrubbing fluid emerges from beneath the dust shrouding, the edge of the shrouding should be arranged so that the incoming gas flow carries all the dust with it as it proceeds down the cone and into the IGCP unit. Turbulent back eddies at the edge of the shroud have to be minimized. Also, this lower edge of the shroud must remain dry at all times. The design which has been developed achieves as smooth a profile as is practical for the gas flow (with minimal potential for back eddies) and has a system for the collection of all splash and condensate and a dedicated drip edge to keep all such scrubbing fluid clear of the inner diameter and lower edge of the dust shrouding.

The design also includes for the leading face (gas side) of the shroud to be a separate piece relative to the splash and condensate cover for the annular flow channel. Whilst this makes the shroud more complex, it creates an insulating gas filled gap between the incoming gas and the wall of the annular flow channel. This reduces the heat transfer between the incoming gas and the scrubbing fluid and thereby reduces condensation if the gas is cooler than the scrubbing fluid and also (when the gases are hotter than the scrubbing fluid) it reduces evaporation and crystallisation of any splash derived droplets that may stick to the upper surfaces of the flow channel. This will prevent the build up of any resultant crystals that could affect the performance of this annular flow channel.

By having this outer piece separate, then it is possible to lift it clear and remove any concretions that may have built up under the inner drip edge whilst the system is working. This easy access significantly simplifies and speeds up any necessary maintenance.

The above described tangential feed arrangement probably represents the ultimate in long term avoidance of concretion problems, especially when gas shut off as in a) above is not an appropriate option. However, it is not possible to reduce the scrubbing fluid flow to such a low level as can be achieved with option a) or b) whilst at the same time maintaining a sufficiently robust total wetting of the inlet conical section to enable it to always rinse off any concretions that can occur during a process upset or as a result of an agglomerate of dust (which, for example, could have fallen off ductwork, or wherever, upstream of the unit) landing on the surface of the conical section. In addition, in order to minimize back eddies in the gas flow at the inner and lower edge of the shroud, the gap through which the scrubbing fluid must flow must be kept as small as possible. This in turn requires good upstream debris removal to be arranged within the scrubbing fluid feed.

d) The fourth arrangement is basically a combination of options a) and c). This option is more compact (as the top of the core can be much higher up in relation to the position of the tangential inlet) and it lends itself to situations where larger diameter IGCP units are being used.

This option has similar reliability to that of option c) and does not need to have regular gas or scrubbing fluid flow alternations or gas stoppages in order to enable it to keep itself clear of concretions.

However, higher scrubbing fluid flows are needed per unit of gas volume flow, because of the two feed systems.

It was found that where the problem of concretion is not expected to occur, options a) and b) are the preferred choice of scrubber fluid inlet.

3.2 Scrubber Fluid Droplet Rotation

In addition to the droplet forming effect of the intense interaction resulting from the velocity difference between the gas and the film of scrubbing fluid that exists immediately down stream of the launch point, the design of the launch point introduces a second rotational effect. The shear forces within the film of scrubbing fluid just upstream of the launch point cause the outer surface of the scrubbing fluid to be moving much more quickly than the inner surface. As a result, when the scrubbing fluid film leaves the solid surface at the launch point (stepped edge) the different velocities of the inner and outer surfaces of the film not only assist the break up of the film into droplets, but also cause the resultant droplets to have a high rotational velocity.

The rotation of the droplets results in the following:
a) Large droplets immediately break up into smaller droplets, increasing the surface area of scrubbing fluid droplets for a given volume flow of scrubbing fluid;
b) The smaller droplets tend to create a relatively closely sized dispersion of droplets;
c) The boundary layer around each droplet is markedly changed from that which would be normally expected. The shape of the boundary layer, the position of the break away of the peripheral vortices and the orientation of the final wake are all changed significantly as a result of the droplet rotation relative to those that would be associated with the simple trajectory of a hardly rotating droplet through a gas flow.
d) In addition, the plane of rotation for each droplet is parallel to the local flow profile of the gas.

It is clear that items a) and b) above will significantly enhance the interaction between the scrubbing fluid and the gas, and between the scrubbing fluid and the particulates or other droplets in the gas. It is also clear that as a result of the relatively small and closely sized scrubbing fluid droplets there will be a considerably larger number of droplets relative to the number that would be formed by the "drip off" mechanism referred to above. Also, the close size range will ensure that the shape of the flow profiles can be arranged to achieve optimum "flight" of these droplets through the gas, following each launch. Further, the shape of the flow profiles can be arranged to achieve optimum recombination (or landing) of the droplets onto the outer surface of the flow profile ready to create the next layer of scrubbing fluid, ahead of the next launch.

The benefit of c) and d) is somewhat more technical and becomes more relevant as the particle size of the dust (or fine droplets) which are to be removed from the gas stream get smaller. The benefit of c) and d) also becomes increasingly relevant when simple gas to liquid (or liquid or dissolved component to gas) diffusional type processes need to be intensified. The boundary layer changes that will create this improvement to diffusional type processes will become clear as the dust (or fine droplet) situation is explained.

3.3 Uniformity of Gas Velocity

As a result of the pressure drop over the IGCP unit the pressure of the outlet gas is lower than that of the inlet gas. The actual volume flow of gas at the outlet is therefore greater than at the inlet (assuming there is no significant temperature change or gas absorption/desorption over the length of the unit).

With this type of equipment, in order to achieve optimum energy consumption for a given degree of dust or mist removal for a particular dust or mist particle size, it can be shown that the basic relationships between gas velocity, droplet size and droplet velocity need to remain essentially constant over the length of the unit. The flow profile, therefore, has to be adapted progressively throughout the length of the unit in order to achieve this. This maintenance of the essential velocity profiles has the added bonus that abrasion, which would normally be much more severe at the outlet end of the unit than at the beginning, can be made to be essentially uniform over the whole of the unit. This has a marked benefit on the operational on-line time between necessary maintenance. In this regard, it should be noted that the type of wear which will result on the profile surfaces of the IGCP unit will be mostly derived from droplet impingement and general slurry velocity in the surface films of scrubbing fluid. This sort of wear is typically a function of slurry impingement velocity and of surface velocity, each raised to a power x and y respectively where x and y have values of between about 3 and 5, depending upon the specific circumstances.

In a typical situation where the actual exit volume flow of gas from the IGCP unit is about 15% more than the inlet volume flow, wear at the outlet end could be in the region of almost twice that at the inlet. Therefore, by arranging the gas velocity to remain as constant as possible throughout the IGCP unit, not only is energy being saved for a given degree of dust removal, but also the equipment life between essential maintenance is almost doubled.

3.4 Maintenance of the Scrubber Fluid Droplet to Gas Relative Velocity in the Inner Annulus Ii is envisaged that for the actual gas velocity to remain constant in both the inner annulus and the outer annulus, the width of the inner annulus must be significantly greater than that for the outer annulus. This will require that the "flight path" for the droplets to be substantially longer within the inner annulus than within the outer annulus. Simple viscous drag however will ensure that the relative velocities between the scrubbing fluid and the gas will be substantially lower at the end of its flight path relative to those at the beginning.

As the relative velocities decline, so the ability of the scrubbing fluid droplets to remove fine dust and other particulates declines much more rapidly. A combination of different launch angles and different gas velocities down the inner and outer parts of the flow profile are therefore required to maintain the dust/particulates removal efficiently per scrubbing fluid launch, while the resultant increase in wear and energy consumption need to be minimized.

An increased launch angle of between about 3° and 10° relative to that which is used for the outer annulus together with an increased gas velocity down the inner annulus of between about 5 and 25% relative to that down the outer annulus has been found to be effective in restoring the dust and mist removal efficiency per launch of the inner annulus to that of the outer annulus. It is envisaged that the finer the dust or mist particle that is to be removed, the greater the difference that is needed for optimal removal efficiency.

It is envisaged that the although the gas velocity down the inner annulus could require raising, the bend that gathers the scrubbing fluid ready for launching into the outer annulus could be configured and dimensioned such that the scrubbing fluid droplet impingement and film velocity on this bend and at the subsequent launch point are no more severe than for that at the equivalent point in the outer annulus.

It is further envisaged that suitable configuration and dimensioning of the flow profile leading from each inner annular zone to the respective following outer annular zone could optimize recovery of the extra velocity energy in the inner annulus area back to pressure energy at the outer annulus, such as by shaping the profile downstream of the landing zone for most of the droplets so that the flow area increases steadily and progressively whilst maintaining a relatively constant flow direction and achieving the full flow area of the outer annulus prior to the outer annulus launch point and prior to the associated change in direction of the gas flow.

Figure 27:
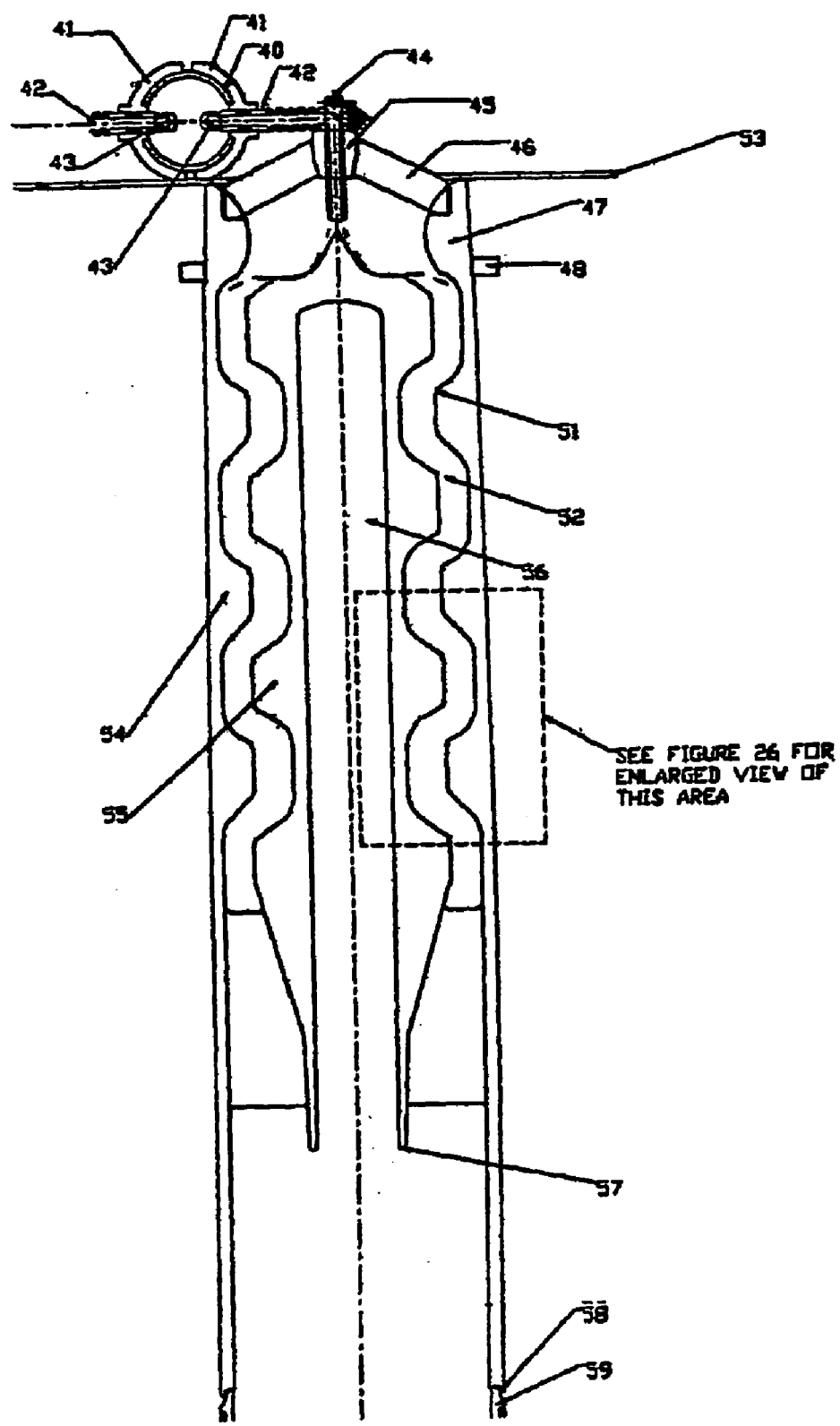
FIGS. 27, 28, 29, 30, 31 and 32 are representative drawings of various aspects of the equipment above, additional equipment and the equipment for the manufacture of the above equipment
Figure 28:
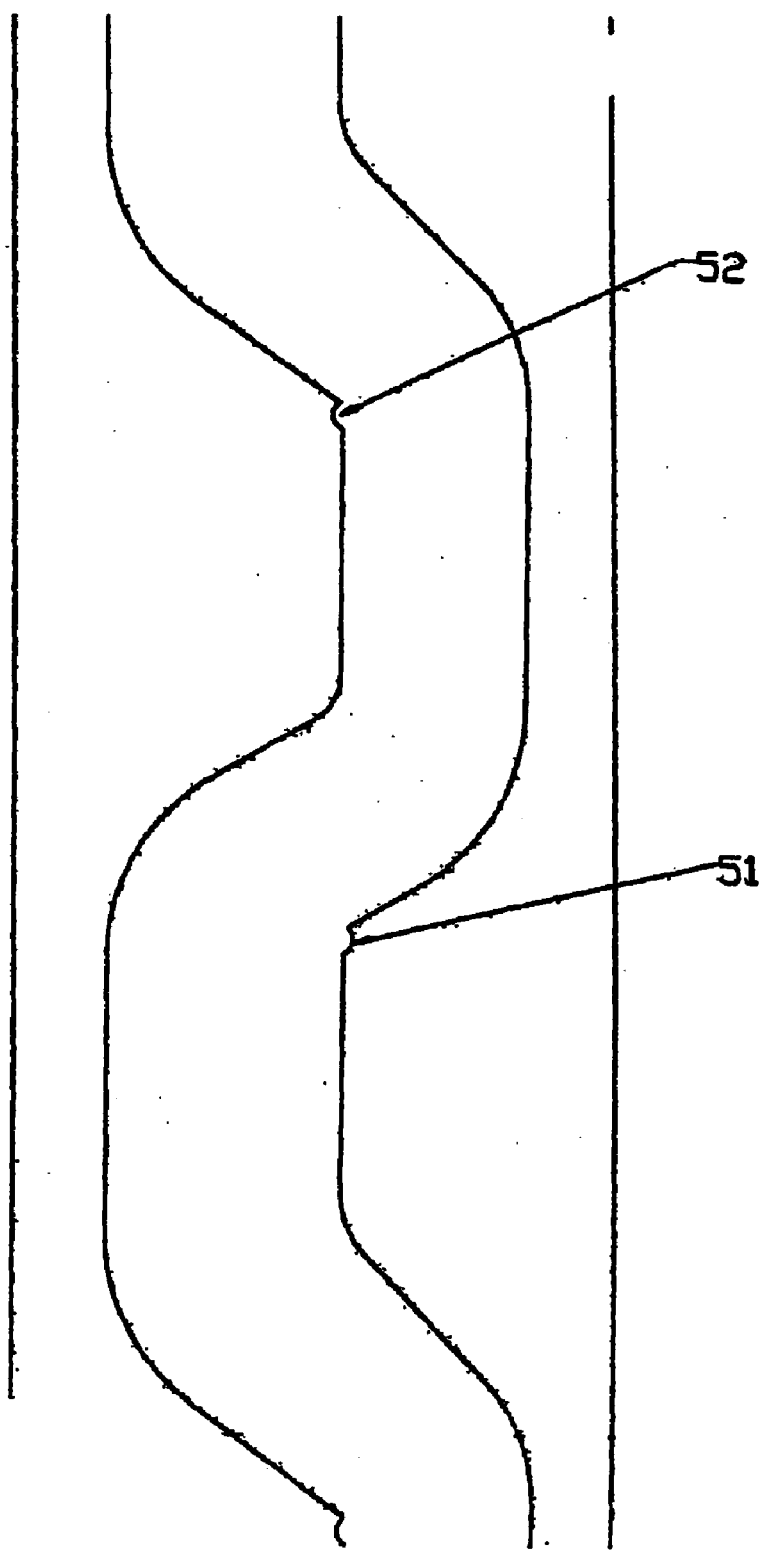
Figure 29:
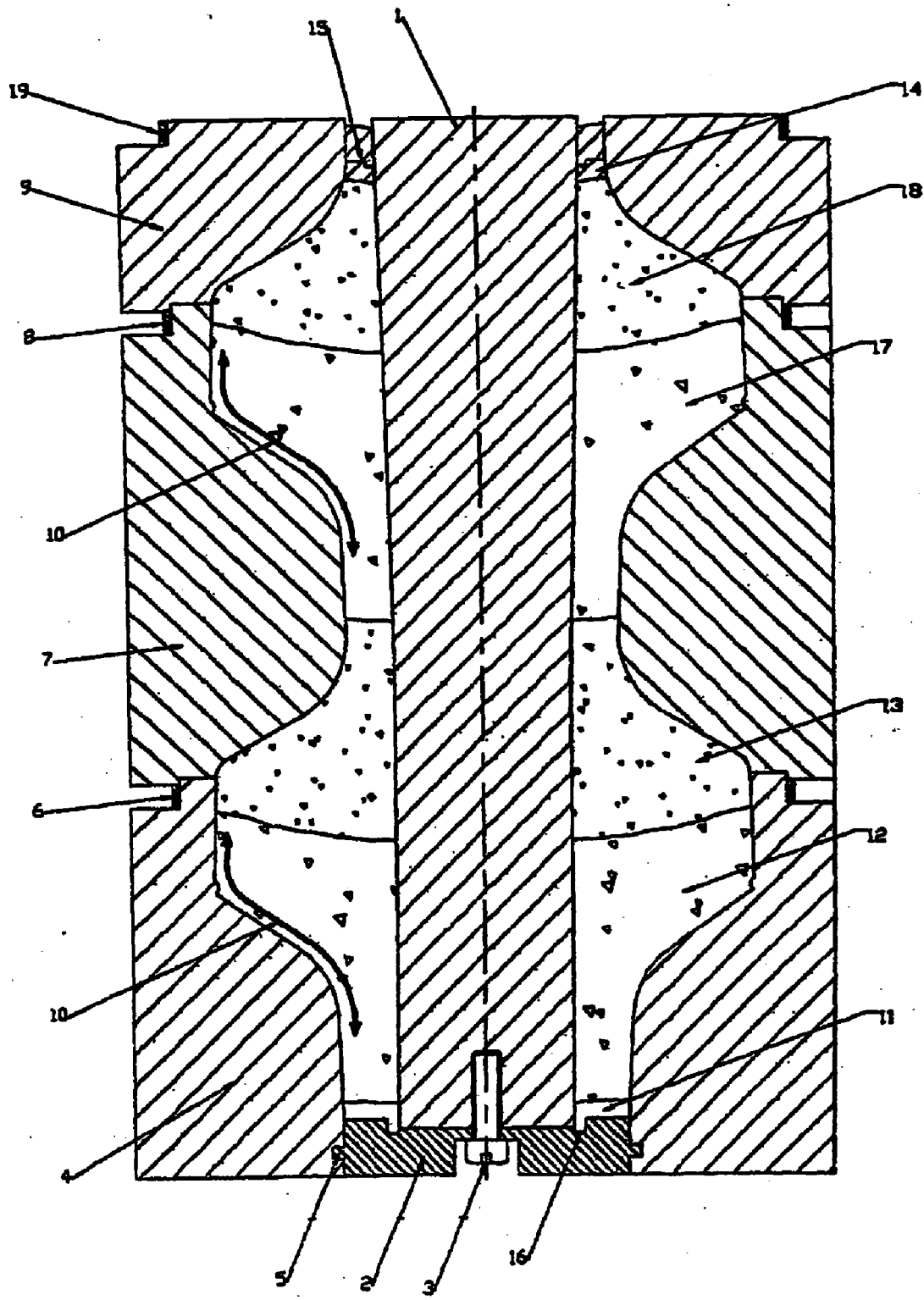

In FIGS. 3, 3a, 4 and 32, the profile, which is shown, is of the type that maintains a constant gas velocity throughout the flow profile. FIGS. 27, 28 and 29 show a profile that has been adapted to create a more uniform dust removal efficiency per launch whilst maintaining relatively uniform wear throughout the unit 3.5 Other Uses for the Feed Boss Support Spokes As drawn in FIG. 9, the feed boss support spokes (101 in FIG. 9) have their major axis in line with the gas flow into the IGCP unit. A further feature of the development is to improve the functionality of the unit, especially as regards the quenching of hot inlet gases and assisting the uniformity of scrubber fluid distribution around the whole perimeter of the annulus, is to angle these spokes so as to impart a circulatory spin to the gas as it enters. Preferably, for energy conservation reasons, the gases should be spun in the same direction as the spinner section will direct them. However, spin in either direction will enable the improvements to the quench and to scrubber fluid distribution to be achieved.

4. Separation of the Gas from the Scrubbing Fluid 4.1 General Overview

In general, the gas and scrubbing fluid will be flowing along an annular flow path as they exit the contacting profile. It is envisaged that whilst the prior art MSPR are typically applied to almost any arrangement for the contacting profile, the generally convenient and easy to construct and operate form typically would utilise an annular form.

In the present invention, the separation of the scrubbing fluid from the scrubbed gas is carried out with a cyclonic section. It is envisaged that the cyclonic section, could be followed, if necessary, by some form of further mist elimination. The scrubbing fluid is recycled (following chemical treatment, as necessary, and the removal of suspended solids.

The cyclonic section fits within the same cylindrical profile as the annular body of the mixer section. This cyclonic section is arranged to enable the maximum gas flow and scrubbing fluid flow that can be accommodated within the mixer section to be separated with high efficiency. In addition, the outlet for the scrubbing fluid is connected in an axial direction and also within the same overall cylindrical profile.

As a result of all these components being within the same overall cylindrical profile, then multiple units can be arranged side by side in a very compact array, so as to be able to handle whatever gas flow that is required using the appropriate number of standard IGCP units.

For a given degree of removal of a particular size of dust or fine droplets, there is an optimum width of flow profile and hence a reasonably optimal diameter for the overall annular profile. For high removal efficiencies of very small particles, the annular gap has to be relatively small, e.g. no more than about 30 to 50 mm for >90% removal of 0.03 micron dust. Larger particles can be removed using similar or larger gaps. Smaller particles are best removed using smaller gaps.

4.2 Typical Details of the Cyclonic Section

The gas and scrubbing fluid mixture typically exits in an axial direction from either the inner or the outer diameter section of the varying diameter annular profile of the mixer section. As a result of the position of the last launch point and the subsequent profile of the annular flow path, most of the scrubbing fluid will be on the outside wall of the last bend as the mixture enters the cyclonic section, with only splash and fine droplets remaining within the bulk gas flow.

Initially, this annular flow is put through a spinner section, having a set of angled blades, so as to impart a circulatory motion to the mixture. The width of the annulus in the spinner section is increased radially, so that the cross sectional area for the flow is maintained relatively constant as the flow direction changes, thus retaining exit velocities substantially similar to the entry velocities.

It is envisaged that higher or lower exit velocities from the spinner section could be obtained with specific blade design. More particularly, it is envisaged that a reduced velocity would enable good velocity recovery and hence pressure recovery but with reduced removal efficiency of any fine droplets of scrubbing fluid within the subsequent cyclonic section. Similarly, it is envisaged that higher exit velocities would result in better removal efficiency of the fine droplets of scrubbing fluid but with relatively higher overall pressure drop and wear rate on the walls of the cyclonic section and the spinner section.

In this preferred embodiment, the spinner section exit velocities are generally of the same order of magnitude as the entry velocity into the spinner section.

In order to minimize the potential for blockages as a result of debris, etc, the spinner section is configured and dimensioned so that any object that can pass through the main mixer section can also pass through the spinner section. It is envisaged that although larger numbers of smaller blades generally provide a more efficient and more compact arrangement, the efficiency can be retained with a smaller number of blades, by fitting a suitably designed trailing edge to each blade which overlaps that of the next blade so as to create a substantially parallel sided exit slot for the gases.

The gases and scrubbing fluid flow from the spinner section through a short annular portion where the bulk of any residual turbulence from the spinner blades is calmed, and thereafter through a relatively simple cylindrical pipe portion. Typically, the end of the inner profile of this annular portion accumulates droplets of scrubbing fluid that tend to drip off and join the central vortex of scrubbed gases. These gases in the vortex would be effectively free of scrubbing fluid droplets, other than for those that could drip off the end of this surface.

With no effective means within the core of the vortex of causing the dripped off droplets to be accelerated radially out of the core, the droplets contaminate the scrubbed and cycloned product gases. In order to prevent contamination, the inner profile of the annulus is hollow with a deep cylindrical recess and with either a conical or a domed inner end to the hollow recess in order to remove any droplets of scrubbing fluid from that portion of the gas which inevitably moves around the stationary surface at the top of the cyclonic section to join the small central vortex which will form down the centre of this cyclonic section. In effect, this small volume of gas is forced to flow through its own mini cyclone as it travels towards the central core. The collected scrubbing fluid from this mini cyclone is then arranged to flow back, normally by gravity, to the end of the annular portion below the spinner section and to join the main flow of gas down the main cylindrical body of the cyclonic section.

At the exit end of the cyclonic section, there is a vortex finder that ducts away the main spinning core (or vortex) of gas that is now free of fine droplets of scrubbing fluid. The vortex finder also gathers the scrubbing fluid, off the wall of the cyclonic section, into an essentially gas free fluid and pipes it out of the bottom of the section.

In order to achieve this, the clean gas is passed into a centrally orientated pipe, which will typically have a diameter of about 70 to 90% of that of the cyclonic section. The larger the diameter of the cyclonic section, the larger this percentage can be. The annular gap between the centrally orientated pipe and the cyclonic section comparison is wide enough to pass any debris that could access the unit and wider than the typical maximum splash or spray layer that would accompany the scrubbing fluid as it runs down the walls of the cyclonic section.

It must be noted that typical industrial cyclonic separators operate with maximum tangential velocities of around 20 to 25 meters per second with some designs of wet systems getting up to around 30 to 35 meters per second. This limit enables. In this design, due to relatively high maximum tangential velocities of around 20 to 35 meters per second, reducing the ease with which the droplets and the particulates are to be collected and flow reasonably smoothly down the walls of the cyclonic section without excessive re-entrainment as a result of splashing, bouncing etc, the minimum width of the annular gap at the vortex finder is based on the concept of capturing all such bounce and splash into this annular area.

At the bottom of the annular gap there are two part ring pieces each covering about 140° of rotation with a gap of about 40° of rotation between each ring. The function of these ring pieces is to provide a perpendicular end to the annular passage outside the clean gas outlet whilst enabling sufficient flow area through this end for the scrubbing fluid, together with some entrained gas, to enter the space beyond the rings and for this entrained gas to pass back out again into the annulus once it has been mostly separated from the scrubbing fluid.

The annulus extends beyond the two ring pieces where radial baffles within the annulus stop the rotation of the gas and scrubbing fluid and allow the liquid to fall by gravity towards the scrubbing fluid outlet and for the gas to disengage itself from the scrubbing fluid and to be free to flow back out through the gaps between the ring pieces. Because of centrifugal force, the scrubbing fluid will flow through the gaps predominantly in the area towards the outer radius of the annulus and the disengaged gas will flow back out of the gaps in the area towards the inner radius of the annulus.

As this disengaged gas is displaced back up the annulus it will gather rotational speed as a result of viscous drag from the scrubbing fluid and entrained gas rotating in the outer part of the annulus. As the disengaged gas increases in rotational speed, any fine droplets of scrubbing fluid contained within it will be spun to the outside and returned to below the two ring pieces. The length of the annular gap between the rings and the clean gas outlet is determined by the need to spin all such fine droplets of scrubbing fluid out of this return flow of gas before the gas reaches the clean gas outlet. Typically, the necessary length of this annulus is within the range of 60 to 100% of the diameter of the cyclonic section.

Normally, the clean gas outlet is conveniently curved slightly (usually radially) to one side so as to make more room in the baffled area beyond the two ring pieces for the piped outlet for the scrubbing fluid to be connected, without unduly restricting the size of this outlet.

Whilst the above text refers to two rings, the ideal design from the point of view of the separation of the scrubbing fluid would use more than two rings and appropriately smaller gaps. However, except for the larger potential sizes, the practical issues of blockage prevention and economics of construction relative to complexity and ideality point towards two rings. Typically, for a two-ring arrangement, the rings need to occupy about 100° to 160° out of the 180° with the remainder being open. When the ring exceeds 160°, there is not normally enough space for debris and for gas and scrubbing fluid interchange. When the ring covers less than 100°, too much turbulence tends to get past the rings into the baffled part of the annulus and, as a result the separation performance of the vortex finder as a whole is impaired.

Where the clean gas outlet is bent away from the overall centre line in order to facilitate a larger outlet connection for the scrubber fluid (within the same overall cylindrical profile), it is necessary to utilise two rings and an extension to the baffling so as to prevent the changing annulus beyond the rings from causing too variable a flow of gas back out of the gap between the rings. The use of two ring pieces represents a good compromise in this instance, otherwise one ring section could be suitable for the smaller diameter cyclonic sections.

In the preferred embodiment, the gas outlet is arranged through a sloped side plate and uses the side plate as means of closing off the annulus beyond the rings and of supporting the outlet pipe for the scrubbing fluid, whilst at the same time forming part of the necessary baffling.

In view of the high gas inlet velocities relative to those typically found within industrial cyclone separators, a relatively long cyclonic section is used in order to keep the radial velocity component of the gas flow within the cyclone body low enough to get the degree of separation of scrubbing fluid droplets that is normally required before the gases is safely discharged to atmosphere, alternatively, to the next process stage within the overall production process. The optimum length between the spinner section and the top of the "vortex finder" section (the top of the clean gas outlet) was found to be between 5 and 10 times the diameter of the cyclonic section. At lengths below 5 times the diameter, too many fine droplets remain in the clean gas and further mist elimination is needed, while at lengths in excess of 10 times the diameter, the rotational velocity is so reduced as a result of the wall friction that there is a rapidly declining economic benefit associated with further length increases. It is envisaged that if a greater degree of removal of scrubbing fluid is required, it would be more beneficial to add a second spinner section and cyclonic section or to add a further IGCP unit.

With a cyclonic section with a length of about 2 meters and a diameter of about 0.3 meters together with appropriately designed spinner section blades, the removal efficiency of a clean water scrubbing fluid exceeded 98% removal of 20 micron droplets.

5. Other Specific Features and Their Application 5.1 General Equipment Manufacturing Details The following features and other general assembly details have been developed or optimised as part of the IGCP unit and its associated process equipment.

The IGCP unit consists of an arrangement that is easy to cast and easy to assemble, and which do not require specialist tooling, jigs or other high quality technology or quality control arrangements in order to assemble them. The shapes of the components are such as to enable them to be cast of mixtures of suitably corrosion, abrasion and temperature resistant resins, plastics and elastomeric compounds with suitably abrasion resistant and thermally stabilizing fillers.

In particular, the spinner section is such as to enable the casting of substantially the entire IGCP unit as a single integral unit.

The scrubbing fluid inlet arrangements have also been arranged to be created from standard as cast or as machined components which are jig mounted and resin bonded into standard constructions and which can enable the most corrosive of environments to be accommodated with relative ease.

5.1.1 Scrubbing of Sinter Process Off-Gases

The off-gases from the Sinter Process have a temperature of around 150° C., with a short duration maximum of around 180° C. to 200° C. The gases contain the products of a carbon fuelled combustion process with a relatively large amount of excess air. The gases also contain dust, products of incomplete combustion (including dibenzo-furans, PCB's and related compounds), acid gases (derived from sulphur and other impurities in the feed stocks) and condensed fumes. These fumes contain condensed alkali and other metal salts (usually chlorides) and condensed silica compounds with other similarly sized fine particulates resulting from decrepitation and other processes that occur within the sintering process.

It is envisaged that careful control of the pH of the scrubbing fluid would enable the precise control of the removal of the acid gases. This precise control results from the relatively high mass transfer performance of the IGCP unit relative to that typically achieved within typical wet electrostatic precipitator ("WESP") systems.

In addition, the whole IGCP unit based system is constructed in suitably reinforced plastics and resins. This avoids all the pH, wet metal temperature and high chloride limitations that are implicit with the necessary metallic components within WESP's, as well as enables the scrubbing fluid to be maintained at a relatively acidic condition. By keeping the scrubbing fluid acidic, acidic gases can be removed selectively in accordance with specific environmental compliance (with consequent savings in reagent consumption and residue disposal volumes). Also, the issues associated with concretion are much more easily controlled when the pH is kept low.

5.1.2 The Removal of PCB and Related Compounds from Sinter Process Off-Gases

The dibenzo furan, PCB and other related compounds typically chemisorb on to the fine particulates that are present in the Sinter off-gasses. This chemisorption process is favoured by low temperature and maximum contact efficiency between the fine particles and the gases before the fine particles are wetted with the scrubbing fluid. The design of the scrubbing fluid inlet arrangements to each IGCP unit and the dust removal efficiency of the first stage of the IGCP unit have been adapted so as to exploit this situation.

The scrubbing fluid inlet is arranged to create good so-called adiabatic quenching of the gases, to a temperature, which is typically within the range of 30 to 50° C. This temperature depends upon the moisture content and temperature of the off-gases leaving the combustion process. Also, the scrubbing fluid inlet is arranged such that much of the scrubbing fluid remains in a relatively large droplet form and has a relatively low launch velocity with respect to the droplet sizes and launch velocities that will apply to the successive stages within the IGCP unit. This means that the gas travelling through the first stage of the unit and approaching the second launch point will be virtually unchanged as regards its fine dust content, but it will be almost fully cooled. The high centrifugal forces both at the bend which is just upstream of the second launch point and at the next bend which forces the gases through the scrubbing fluid that has been launched from the second launch point will cause the fine and still dry dust particles to cross and re-cross through the gas stream, greatly increasing the mass transfer and chemisorption of the dibenzo furan, PCB and related vapours onto the dust.

Obviously, with only partial removal of the dust at each subsequent launch, this enhanced mass transfer will continue through each stage. However, this mass transfer process will be to steadily decreasing amounts of dust. It is therefore envisaged that further fine dust can be added upstream of the IGCP unit (preferably, a dust which is much more effective at removing these vapours).

5.1.3 Application to Other Off-Gases and Dust Emissions

The application of the IGCP unit with other off-gases and dust emissions is obvious to persons skilled in these areas. However, what may not be so obvious is the range of opportunities for cost reduction and problem solving which emanate from the major size reduction embodied within the IGCP units in relation to equivalent capacity alternative technologies, which have equivalent dust removal or gas cleaning capabilities.

In particular, especially within the iron, steel and other furnace and kiln related industries, the size enables the dust and other contaminant removal equipment to be brought close to each individual source rather than for it to be sited at the end of a sequence of collection ductwork or other infrastructure. This can enable major savings to be made on extraction and ventilation systems.

5.2 Formulation of the Abrasion Resistant Composite

5.2.1. Introduction

Silicon Carbide was chosen in this application because of its thermal conductivity, its availability, its uniformity, its chemical resistance and its virtually unsurpassed abrasion resistance. Silicon Carbide coarser than 10 mesh tended to break down and crumble within itself when it was subject to severe impact. The uniformity and aspect ratio of the material was also important and specifically selected sources were chosen so as to obtain particles which had relatively equal dimensions in each of their three characteristic dimensions and which had relatively closely defined size distributions within their commercially available and marketed size ranges. It was found that particles that are elongated in one or more directions were significantly less resistant to impact and could not be compacted to achieve the necessarily low resin to filler volumetric ratios. This reduced compaction resulted in the wear properties not being able to be exploited to the full.

Silane pre-treatment of silicon carbide however improved the wetting of the particles, with the resin. This results in improved abrasion resistance of the material, improved impact resistance of individual silicon carbide particles within the product, improved tensile strength and it helps to reduce the strength loss and other problems which result from the hydrolysis of the resins during use.

In order to obtain optimum results, the silane was diluted and pre-hydrolysed for about 1 hour. The optimum solution composition for this process was 1.5% by weight in a 9:1 blend of alcohol and distilled water. For optimum results, it was found that the silane concentration should not exceed 5%. The silane solution had to be prepared just prior to use because on standing there is an unwanted formation of siloxane in solution. The silane loading for optimum composite properties was determined experimentally and the optimum was found to be as follows per 100 kg of silicon carbide.

| Mesh SiC | Water (liter) | Ethanol (liter) | Silane (liter) |
|---|---|---|---|
| 10 | 0.80 | 7.20 | 0.4 |
| 24 | 1.00 | 9.00 | 0.55 |
| 60 | 1.44 | 12.96 | 0.72 |

A key feature of the development process for these optimum silane pre-treatment solutions was the creation of a solution that did not cause the silicon carbide particles to agglomerate as they were dried. Water is necessary to assist the bonding process between the silane and the silicon groups in the silicon carbide. Surface tension and other properties of the solution result in agglomerates forming during the pre-treatment process especially with the finer particles. The development process created solution formulations and product agitation methods during the drying process which successfully overcomes the problems of agglomerated fine filler particles within the final resin and filler mix, whilst at the same time achieving optimum strength and uniformity of bonding between the filler and the resin.

5.2.2. Particle Size and Size Distribution for the Silicon Carbide

In essence, the mesh size can be converted into micron size. Based on this micron size, the optimum ratio of particle sizes for maximum input of filler per unit total volume of composite will be in ratios of seven based on the micron size. Both bimodal and trimodal systems were assessed. The trimodal system had large amounts of fines that made mixing and application of the composite very difficult. The bimodal system was therefore chosen for most of the mixtures.

The 8 mesh silicon carbide is a relatively large particle that is difficult to support adequately in order to prevent it from cracking when it is impacted. The original formulations were based on a combination of 10 and 24 mesh (which is a formulation which is close to the theoretically ideal for packing of 7 to 1 size ratio). However, moving to a combination of 10 and 60 mesh gave significant advantages as regards both abrasion and impact resistance. This improvement would appear to result from improved cushioning around each 10 mesh particle as a result of the finer infill particles.

Optimum packing density was researched using measuring cylinders and the results were used to identify a mixture with good mixing and flow properties and which had a near maximum input of solids. Mixtures of 10 mesh solids with 60 mesh solids were found to be optimal. With mesh sizes where the respective mesh numbers were larger than 10 and larger than 60 (i.e. smaller micron sizes) the resin and solids slurry was difficult to work.

5.2.3. Resin Selection

Dow manufactures vinyl ester resins that are well known for their chemical resistance qualities. For the Sinter Process gas scrubbing a material that can operate at 160-180° C. was needed. Dow produce Derakane 470 Turbo which meets both the temperature requirements and the chemical resistance requirements.

A component made, using this resin and maximum loading of silicon carbide filler (using the above referred silane pre-treatment and the 10 plus 60 mesh mixture of particle sizes) was subjected to thermal shock testing (six cycles of heating it to 180° C. and immediately dropping it into a container full of cold water). The material did not show any signs of cracking or other forms of degradation and the silicon carbide remained fully bonded. It was also noted that the material has different mechanical properties at elevated temperatures relative to when it is at ambient temperatures. At high temperatures, it is slightly elastic which will assist the overall abrasion resistance.

The following technique was developed to further improve the apparent elasticity of the resin and hence the overall abrasion resistance. This was to include within the overall mixture or within specific parts of the product moulding where the properties are appropriate or preferable, hollow or sponge like fine particles so as to impart a degree of elasticity and overall sponginess to the resin. These particles need to have sufficient chemical resistance so as not to be degraded by the environment and they need to be small relative to at least the larger filler particles and preferably they should be small relative to the smaller (80 mesh) filler particles. Suitable hollow and sponge like particles include hollow glass spheres and both hollow and sponge like kaolin particles.

The purpose of these compressible inclusions is to create a more cushioned surround for the hard abrasion resistant fillers which will help to prevent them becoming cracked as a result of impact.

In most of the reported high temperature experience using Derakane 470 Turbo, especially for those applications where ducting and containment systems carried gases where their bulk temperature was in excess of 220° C., the performance of the resin was improved by incorporating about 20% by weight of graphite into the corrosion barrier layer of the ducting or container. This graphite greatly increases the thermal conductivity of this layer and thereby prevented a significant temperature gradient and hence thermal expansion derived stress gradient across this layer. By removing this stress from the surface, the normal early failure mechanisms of blistering and cracking which result from distress and failure in the resin itself can be avoided/greatly delayed, thereby enabling good service life to be achieved.

Silicon Carbide has a similar thermal conductivity and expansion coefficient to those of graphite and with silane pre-treatment it has superior wetting and bonding. With the greater filler content and the benefit of the smaller 60 mesh rather than 24 mesh fine component the benefits that can be derived from the graphite inclusion can be at least replicated and in general improved using silicon carbide. Where trimodal system is used, where the third component would be about one eighth to one tenth of the size of the 60 mesh, even better results are achieved.

This is a most important feature especially in the feed area of the IGCP unit where cool liquid splash on to hot surfaces will be an issue, especially in the area where the scrubbing fluid first hits the outer wall of the unit.

5.2.4 Further Refinements

It is envisaged that as a further refinement and where abrasion, impact and/or tensile as well as temperature properties are required, hollow glass, kaolin or other micro particles could be substituted or part substituted for the fine third component in a trimodal mix or can be added as needed to a bimodal mix. Here the thermal conductivity of the glass, kaolin or other micro material will in general be less than that of silicon carbide of graphite, but its inclusion will enable the necessary additional cushioning to be achieved around the larger abrasion resistant filler particles. Also, because these hollow particles are generally smooth and reasonably spherical in shape, they should proved good lubricity between the other filler particles, thereby improving the flow properties for given filler content. This in turn means that more filler could be added for a given workability.

It is envisaged that this latter feature would be important if the tensile properties are important in that part of the moulded product. Typically trimodal systems would be needed if the tensile properties need to be enhanced without reducing the impact, compression and abrasion properties. However, trimodal systems are generally more difficult to work. Adding spherical or near spherical micro solids would assist the resolution of this workability constraint without significantly affecting the temperature and thermal shock issues.

As a result of all the test work and development, it is clear that for realistic mixing and transfer of the mixed composite to the mould, the optimum impact and abrasion resistance for a hard resin system such as Derakane occurs at the maximum bulk density on a bimodal system where the particle size is sufficiently different such that the micron size of the larger particles is divided by that of the smaller particles and produces a ratio of around 9 to 10 whereas the theoretical ratio for maximum packing density is from between 6 and 8, preferably 7. The preferred mixture utilised 10 mesh with 60 mesh, which are approximately 1950 micron and 200 micron respectively. These grades are approximately 9.5 times different in size. This difference in preferred sizes for optimum mixing, transfer, moulding, impact resistance and abrasion resistance, relative to the theoretical optimum for maximum packing density is an important feature which is critical to both the manufacturing process and to the product's performance. The benefit of this 9.5 ratio has been clearly demonstrated by the almost 50% improvement to the wear life for a polyurethane and silicon carbide component where the ratio was adjusted from about 7 to 9.5.

Similarly, the benefit of optimally conducted silane pre-treatment of the silicon carbide prior to its inclusion creates a similar level of improvement to the impact and wear life.

In addition, it was found that approximately equal quantities by mass of 10, 24 and 60 mesh silicon carbide or other mixes of 10 mesh and 60 mesh silicon carbide with much finer particles of silicon carbide or hollow micro particles within both Derakane 470 Turbo and Polyurethane constitutes a trimodal system which has proven improvements to the tensile properties whilst retaining abrasion and impact resistance. It is envisaged that this mixture could be used in areas that are not under such severe abrasion but need the tensile strength and impact capability from longer debris or objects in areas such as for support arms and fins, blades or hub spokes.

6. Detailed Description of the Equipment and its Applications

The preferred embodiment and application will be described, indicating how the carrier vessel and its contents can form part of an overall process system, with reference to the accompanying drawings.

Figure 2:
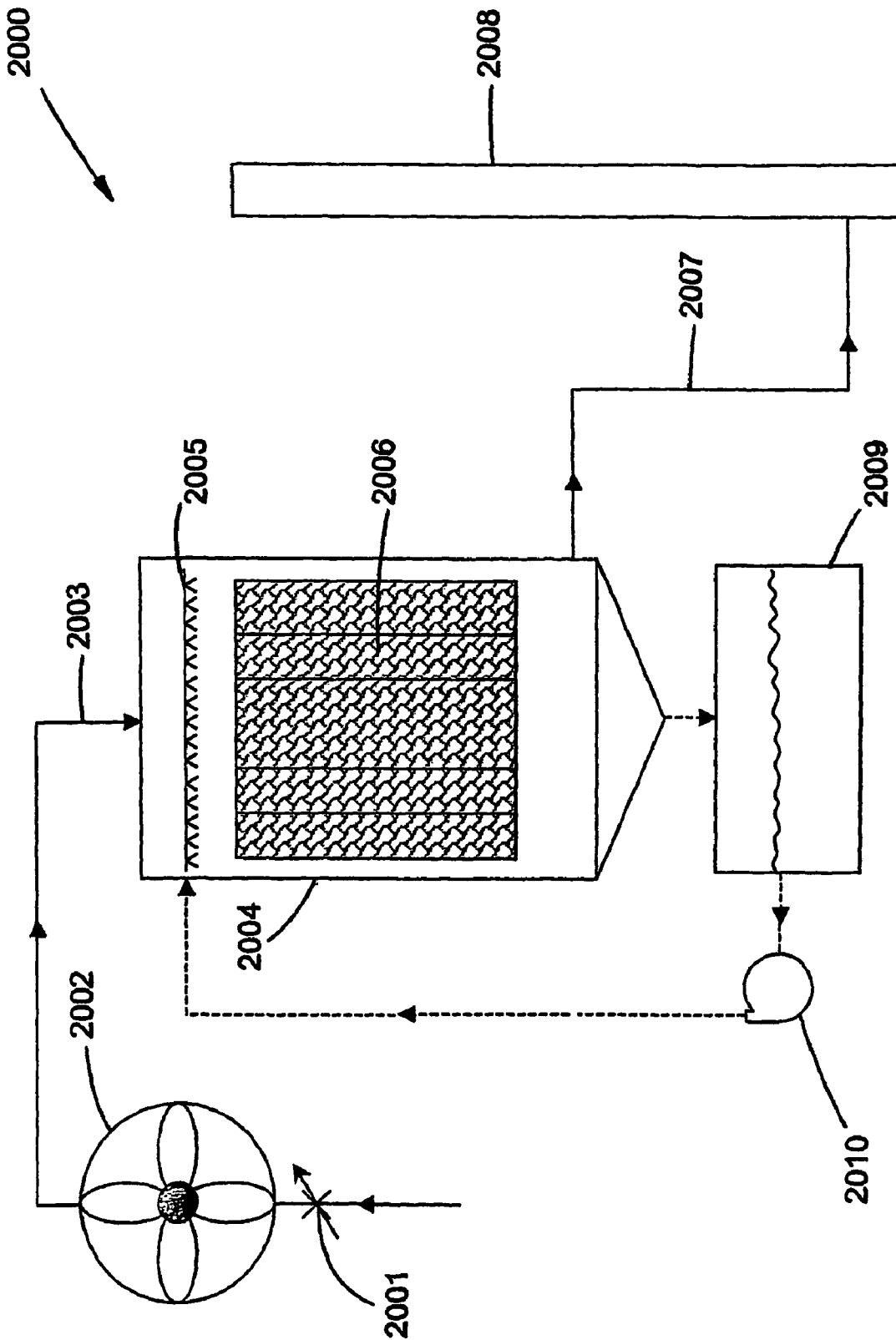
FIG. 2 is a diagrammatic layout of a 25% throughput pilot part incorporating a set of IGCP units.

FIGS. 1 and 2 illustrate diagrammatically 1% and 25% throughput pilot plants while FIGS. 3 to 32 illustrate in technical detail the IGCP unit and its various components and related equipment.

FIG. 1 illustrates a 1% throughput pilot plant incorporating an IGCP unit in accordance with the invention. The pilot plant 1000 incorporates a dirty gas stream feed line 1001 feeding into a scrubber vessel 1002, having water nozzles 1003 providing spray water onto a turbulence creator 1004 located within the scrubber vessel. The water is fed to the water nozzles 1003 via a water pump 1008 feeding water from a water tank 1005.

The scrubbed gas is fed through a liquid ring vacuum 1006 to a stack 1007 from where it is released to atmosphere.

FIG. 2 illustrates a 25% throughput pilot plant incorporating a set of IGCP units in accordance with the invention. The dirty gas stream 2003 is fed through a flow control valve 2001 via a fan 2002 to the scrubber vessel 2004. Water is pumped from a water tank 2009 by means of a water pump 2010 to the scrubber vessel 2004. The water is sprayed via water nozzles 2005 onto a set of multiple turbulence creators 2006 in for the form of the IGCP units.

The scrubbed gas 2007 is released to atmosphere via a stack 2008.

Figure 3:
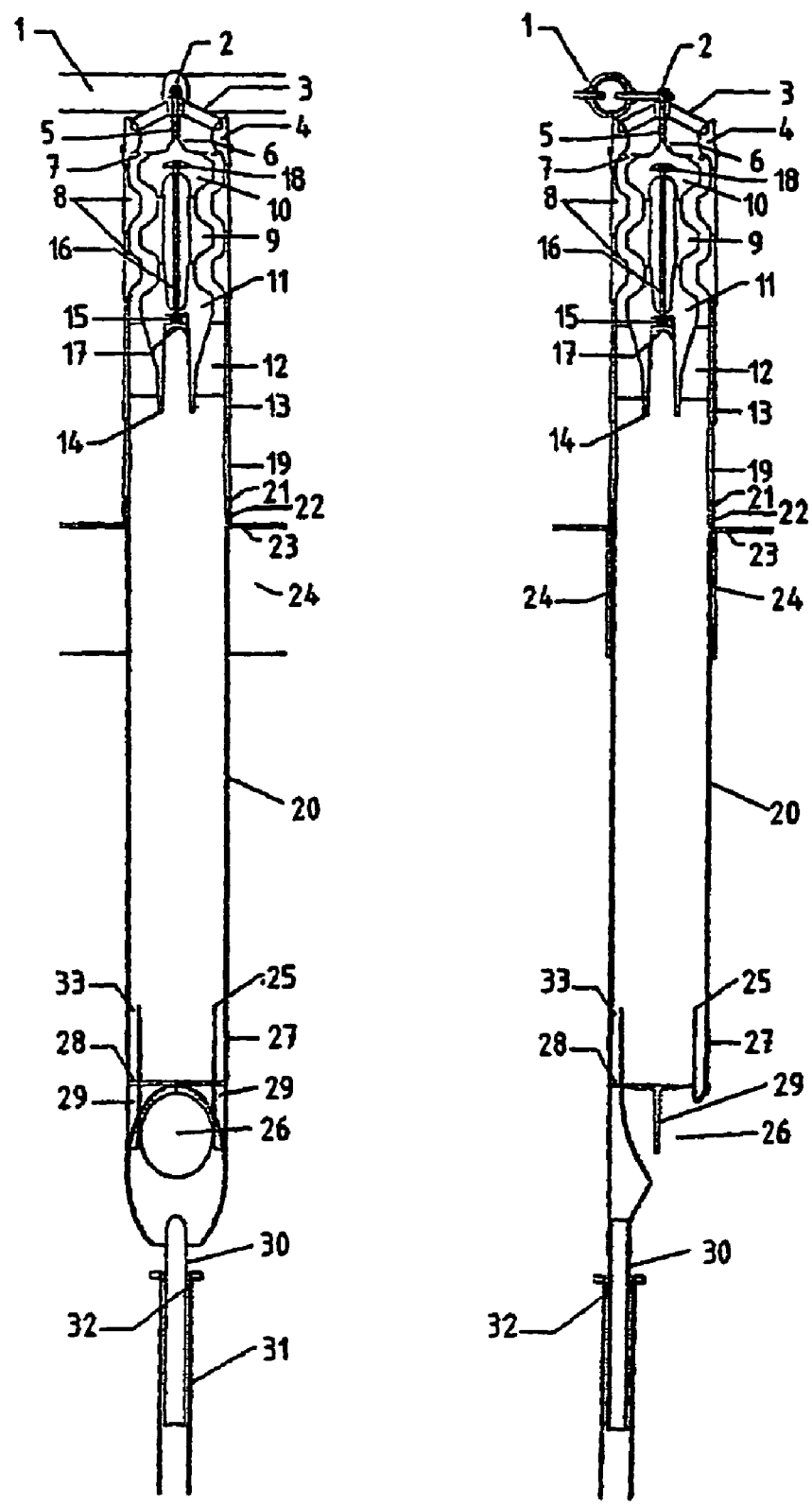
FIG. 3 is a cross-sectional view of an IGCP unit, showing a centrally arranged scrubber fluid feed.

FIG. 3 illustrates equipment associated with one IGCP unit in accordance with the invention and with a centrally arranged scrubber fluid feed.

Scrubbing fluid enters the equipment via a header 1. The fluid is drawn off the header 1 at each IGCP unit through a standard moulded and located off take fitting 2. There is one fitting 2 per IGCP unit Each header 1 typically services two rows of IGCP units.

Feed to each IGCP unit turns through 90° and is directed downwards on to a centre feed distributor 6. A centre feed pipe 5 is centred, using a spoked hub 3, which in turn is held in place by an outer ring 4.

Scrubber fluid flow is directed radially outwards by the conically topped, centre feed distributor 6. The shape of the feed distributor 6 is such that providing the feed pipe is located reasonably centrally with respect to the distributor 6, it will distribute the scrubbing fluid uniformly around the perimeter of the distributor.

Lines 7 show the approximate profile of the scrubbing unit fluid as it flows across an annular gap. The upper straight line represents the flow of scrubbing fluid when the gas flow has been turned off (i.e. during the rinse off of any concretion) and the lower curved line shows the normal curved flow with the gas flow on.

An annular flow profile is made up in this instance of 5 launch points, the first one being from the distributor 6. It is envisaged that more or less points can be arranged by using more or less of the following style of components.

Typically, but not necessarily, the outer casing ring pieces 8 are identical, thus simplifying component manufacture.

An inner core piece 9 has a similar profile to that of the remaining section 10 of the distributor 6. It is envisaged that, for simplicity of manufacture, the profile for part or all of the unit can be the same. However, in order to maintain a steadily enlarging flow profile so as to maintain a uniform gas velocity through the unit, the detailed dimensions of piece 9 do differ slightly from those of section 10. It is envisaged that, in an alternative arrangement, the profiles on the piece 9 and the section 10 can be identical and the casing rings 8 can be adjusted so as to be able to create the steadily enlarging profile, which is ideal. This option is illustrated in FIG. 32 where the right hand side of the figure shows the multi-component style for the casing rings 8 and an optional single component casing 34 which the combination of the tapering profile and the casting techniques (referred to in section 5.3 above) makes possible. The tapered profile, in most instances, enables the casing rings to pass over the core pieces. In some applications, it may be more important to have a larger axial overlap between successive core and casing launch points and it may not be possible to assemble or withdraw item 34. In these circumstances a different casting and/or assembly technique will be needed, such as that shown in FIG. 3 or FIG. 31.

It is envisaged that, below piece 9 in FIG. 3, one or more further pairs of core and casing rings could be inserted in order to create more launch points per unit. In this embodiment, only one item 9 is shown, located on top of the core piece 11, which makes up the centre of the spinner section. This section includes in this embodiment six spinner blades 12 which in turn are contained within the outer casing 13. The whole of 11, 12 and 13 are cast as a single component, but it is envisaged that they can be made separately and assembled and bonded or jointed together from the individual components. It is further envisaged that item 11 can be made from more than one piece and either assembled into a single component or the individual pieces can be 'O' ring or otherwise jointed together. Alternatively, the casting technique discussed in section 5.3 can be exploited to create a single component unit as shown in FIG. 27, or separate groups of components could be made and assembled.

At the bottom of the spinner there is an inner skirt piece and hollow recess 14 which serves to create the annular calming zone for the gas and scrubbing fluid flow as it emerges from the spinner blades 12. The hollow recess prevents scrubbing fluid from accessing the central vortex and thereby accessing the gas outlet, as well as houses the bolting arrangement and its cover, which in turn holds the whole of the core assembly together, by means of a nut 15.

The nut 15 has a loose anchor plate and a number of Bellville washers, alternatively, equivalent means of maintaining a steady tension on the tie bar 16 so as to maintain pressure on the "O" ring or equivalent seals between the core pieces during warm up and cool down. A dome shaped cap 17, which is sealed into the hollow end of 14, covers the nut 15. In this instance, the cap 17 is held in place by an "O" ring, which is secured by a light coil spring. This coil spring is arranged outside the nut and washers 15, but it could be between the nut and the cap 17.

The other end of the tie bar 16 is located in the top core piece 10 using a nut welded to an anchor plate 18. The top of the plate 18 has a domed cap fitted to it so as to prevent the resin mixture from fully encasing the anchor plate and nut, thus enabling the effects of differential expansion to be absorbed without putting excessive tensile forces into the internal structure of the resin.

The outer casing of the spinner section, 13, extends below the spinner blades for a minimum distance so as to provide a suitable wear surface in the immediate high wear area, which occurs immediately beneath the spinner blades. This extension also ensures that the joint with the next wear ring 19 is kept clear of this high-wear area.

Wear ring 19 in turn sits on the top of the main cyclone body section 20. The top of this section has a shaped shoulder and locating lug 21, which sits on top of, and is O-ring sealed to the mounting ring 22. The mounting ring 22 is resin bonded onto and sealed to the punch plate 23 which is sealed into the main carrier vessel into which the IGCP units are mounted. This punch plate 23 is supported by support beams 24, which typically are arranged between each row of IGCP units.

At the bottom of the cyclone section 20, there is a vortex finder pipe 25, which delivers the clean gas to the clean gas outlet 26. The whole vortex finder assembly is spigot-and-socket mounted onto the end of the cyclone section 25, using the joint 27.

The part rings 28 at the bottom annulus 33 are arranged so that the baffles 29 are about 35% of the way around the underside of the respective ring in the direction of rotation.

The scrubbing fluid outlet 30 is drained by gravity into a collection pipe 31. The outside of pipe 30 is equipped with a vibration absorbing ring 32, thus preventing excessive wear on the outside of the pipe as a result of vibration at this end of the IGCP unit.

The whole arrangement of the collection pipe 31, the IGCP units, the punch plate and the drainage collection pipes are typically arranged into an overall carrier vessel with the dirty gas entering the top of the vessel and the clean gas extracted from the side of the vessel at a convenient point below the punch plate 23.

The lower part of the vessel receives the scrubbing fluid, which is drained via the collection pipes 31. This lower part of the vessel provides a suitable storage and recirculation vessel from which the fluid is pumped back to the scrubber fluid inlet header.

Such an arrangement is shown diagrammatically in FIG. 12 and is referred to in more detail when that Figure is discussed below.

Figure 3A:
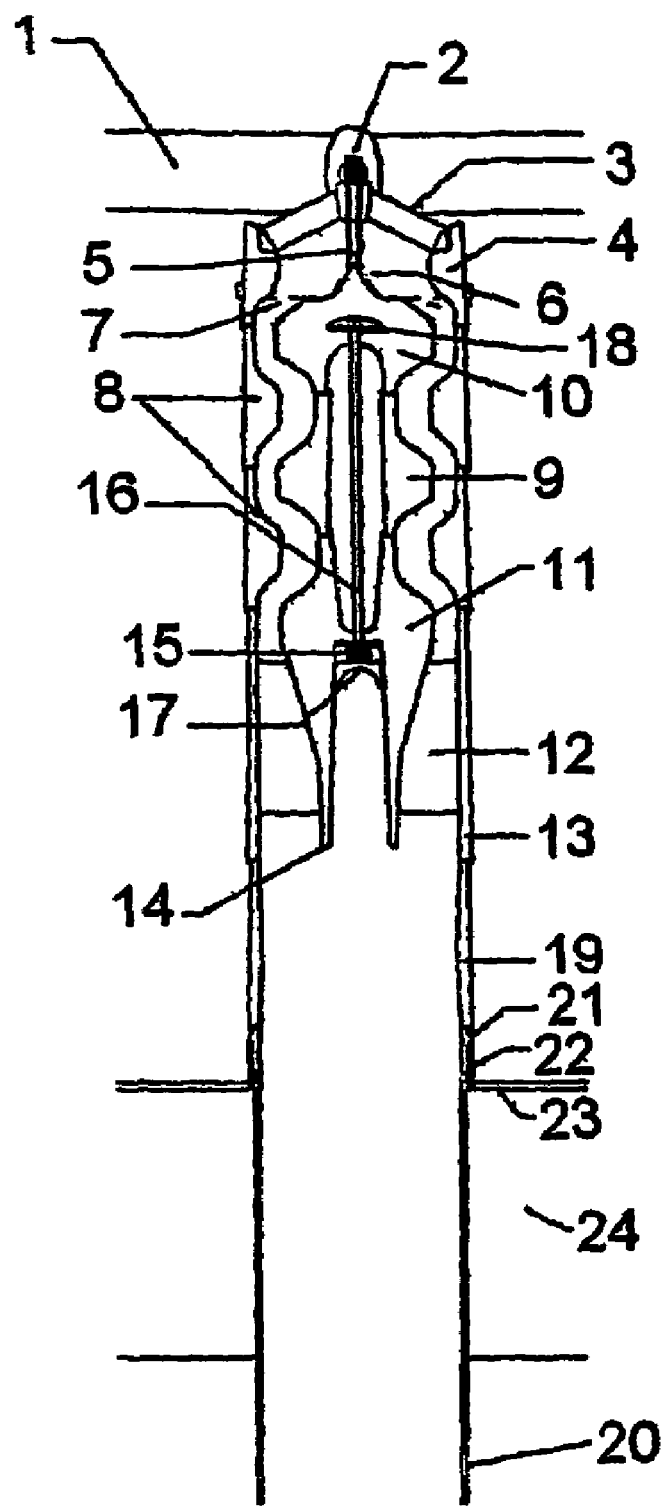
FIGS. 3a and 3b depict the same cross-sectional view of the IGCP unit, showing the centrally arranged scrubber fluid feed on a larger scale.
Figure 3B:
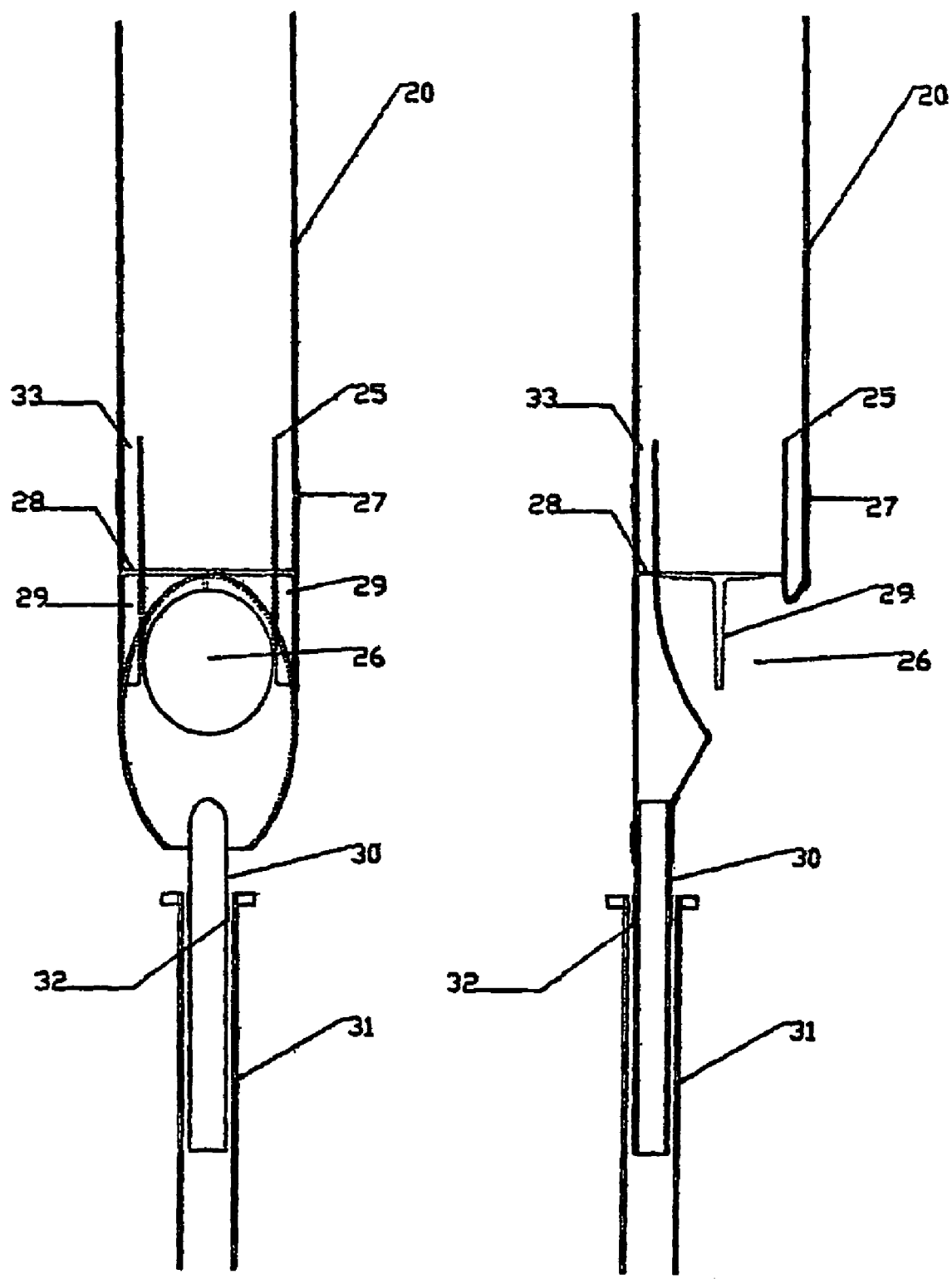

FIGS. 3*a* and 3*b* show the above details at a larger scale.

Figure 4:
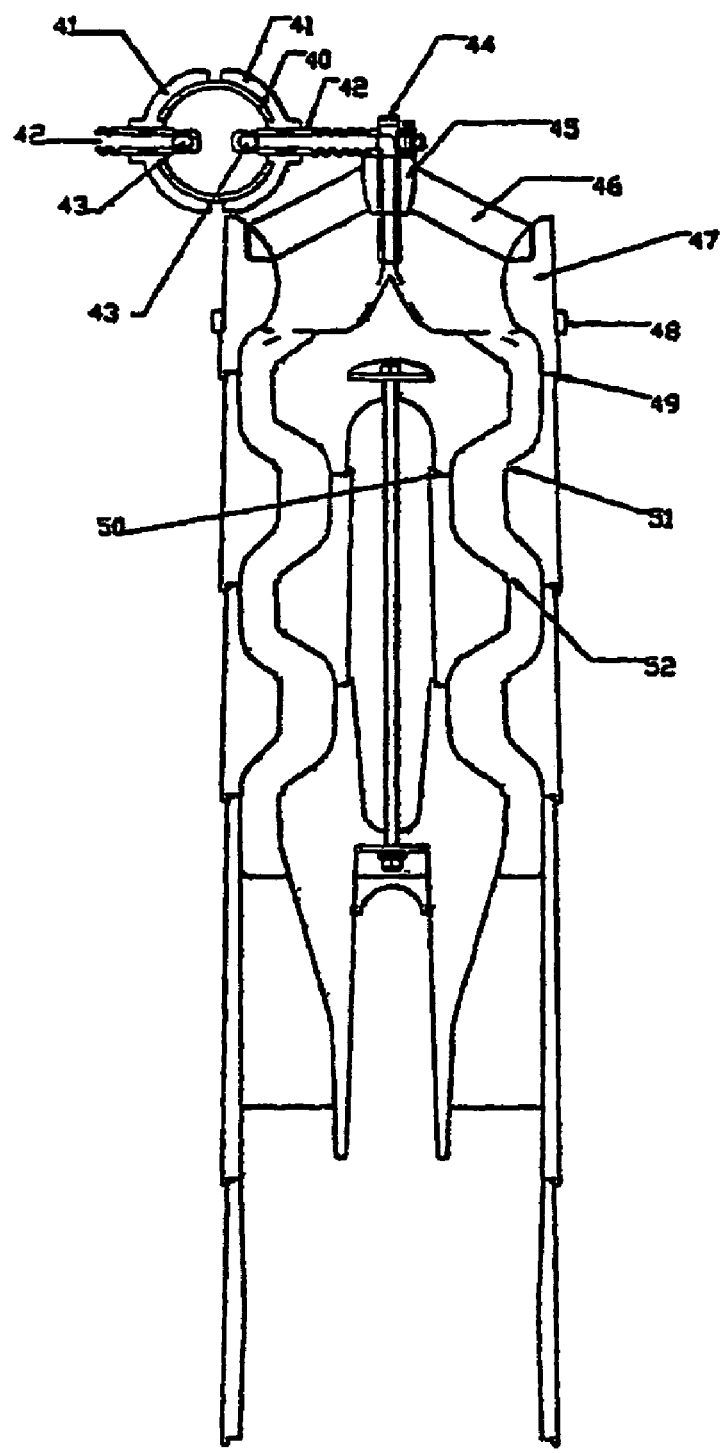

FIG. 4 shows a side elevation of the same details as are shown in FIG. 3*a* The scrubber fluid feed pipe is shown in section (40) with the off take saddles 41. The right hand off take saddle leads to the IGCP unit shown and the left hand one would lead to an IGCP unit (not shown), located to the left of the IGCP unit shown.

Figure 6:
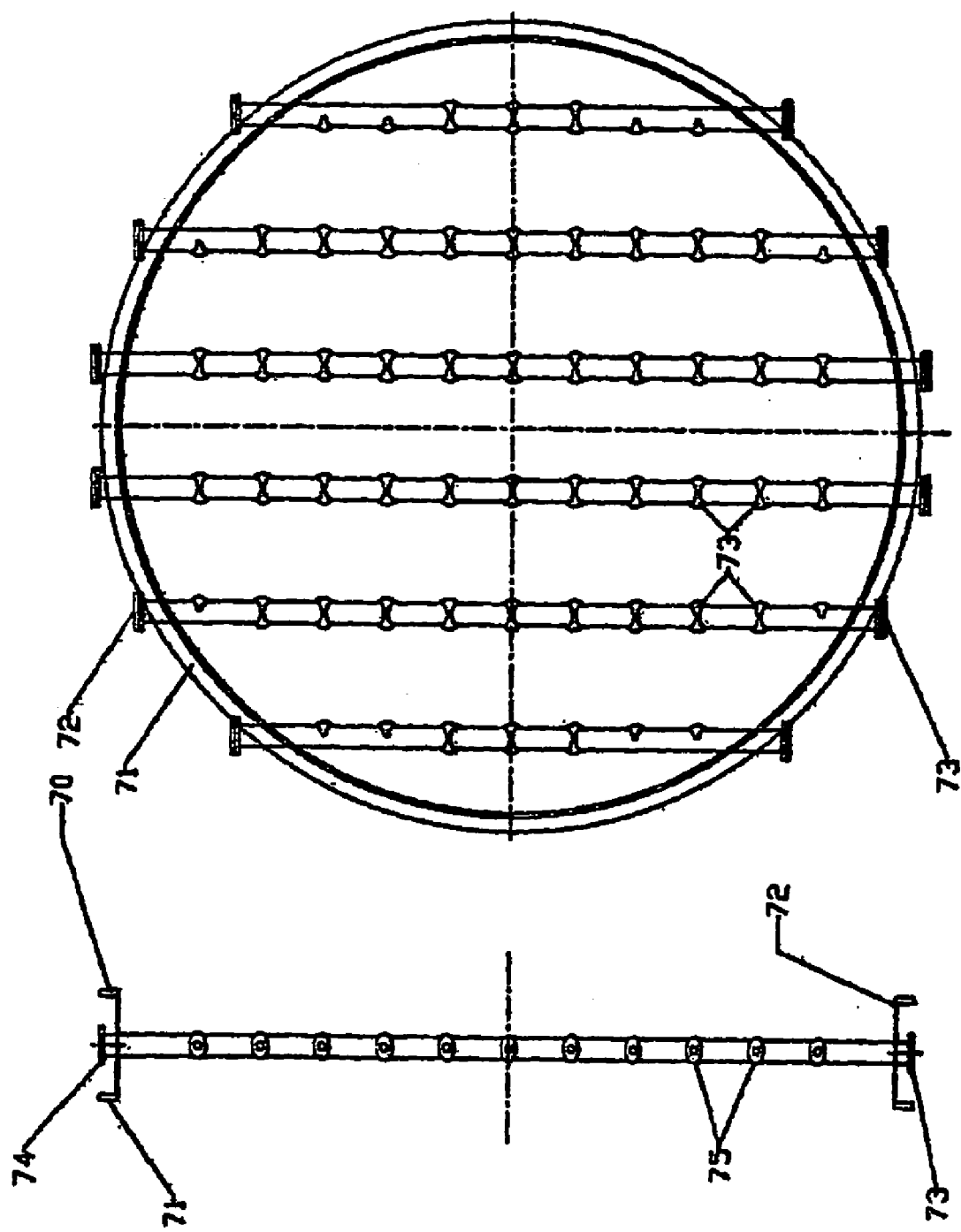
FIG. 6 is a detailed cross-section of an overall carrier vessel.
Figure 10:
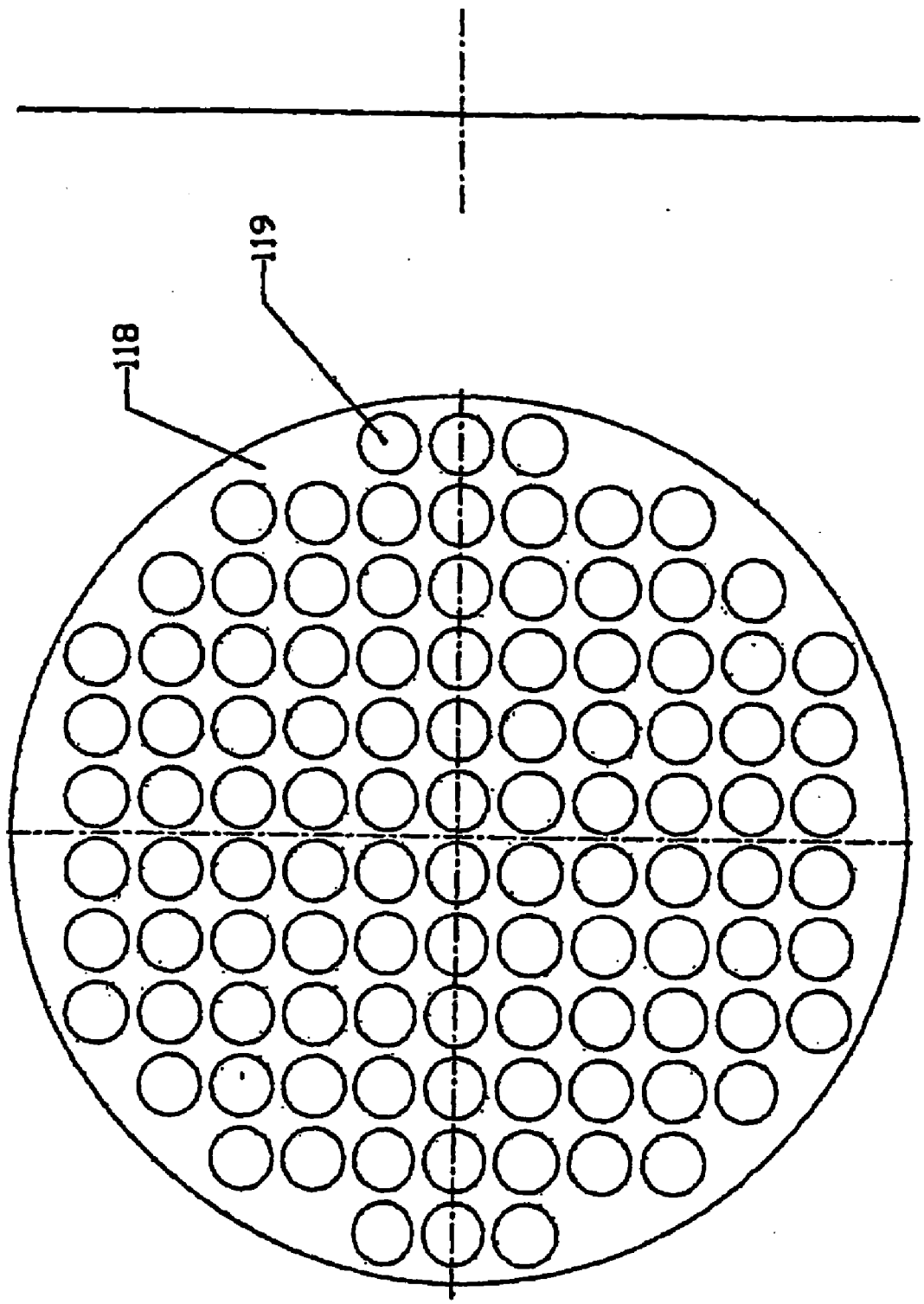
FIG. 10 is a plan view of a dust-cover to the IGCP unit.

Each saddle piece 41 has a chamfered flat area at the top and bottom. The lower chamfered area, in combination with that of its opposite neighbour forms a flat surface, which enables the scrubber feed liquor pipe 40 to rest on a loose fitting cover (not shown), which in turn rests on top of each ring 47. The dust cover has holes in it, the holes being aligned with and of a similar size to the entry diameter of the top of each ring 47 on the IGCP unit. A typical dust cover is shown in FIG. 10 and a typical arrangement for the feed pipes 40 and off take saddles 41, which would go with the dust cover arrangement, is shown in FIG. 6.

Inserted into each off take saddle 41 and "O" ring sealed to it is a feed pipe 42. The feed pipe 42 has a bellows arrangement within it to cater for any necessary movement or adjustment associated with differential expansion and other flexing or construction tolerance issues.

The feed pipe 42 has a side inlet 43, which is orientated such that its open end is directed towards the flow in pipe 40. This orientation ensures a uniform amount of fluid drawn off by each off-take, irrespective of the steady fall off in velocity along the header pipe from the header inlet to the last feed pipe in the row.

Figure 7:
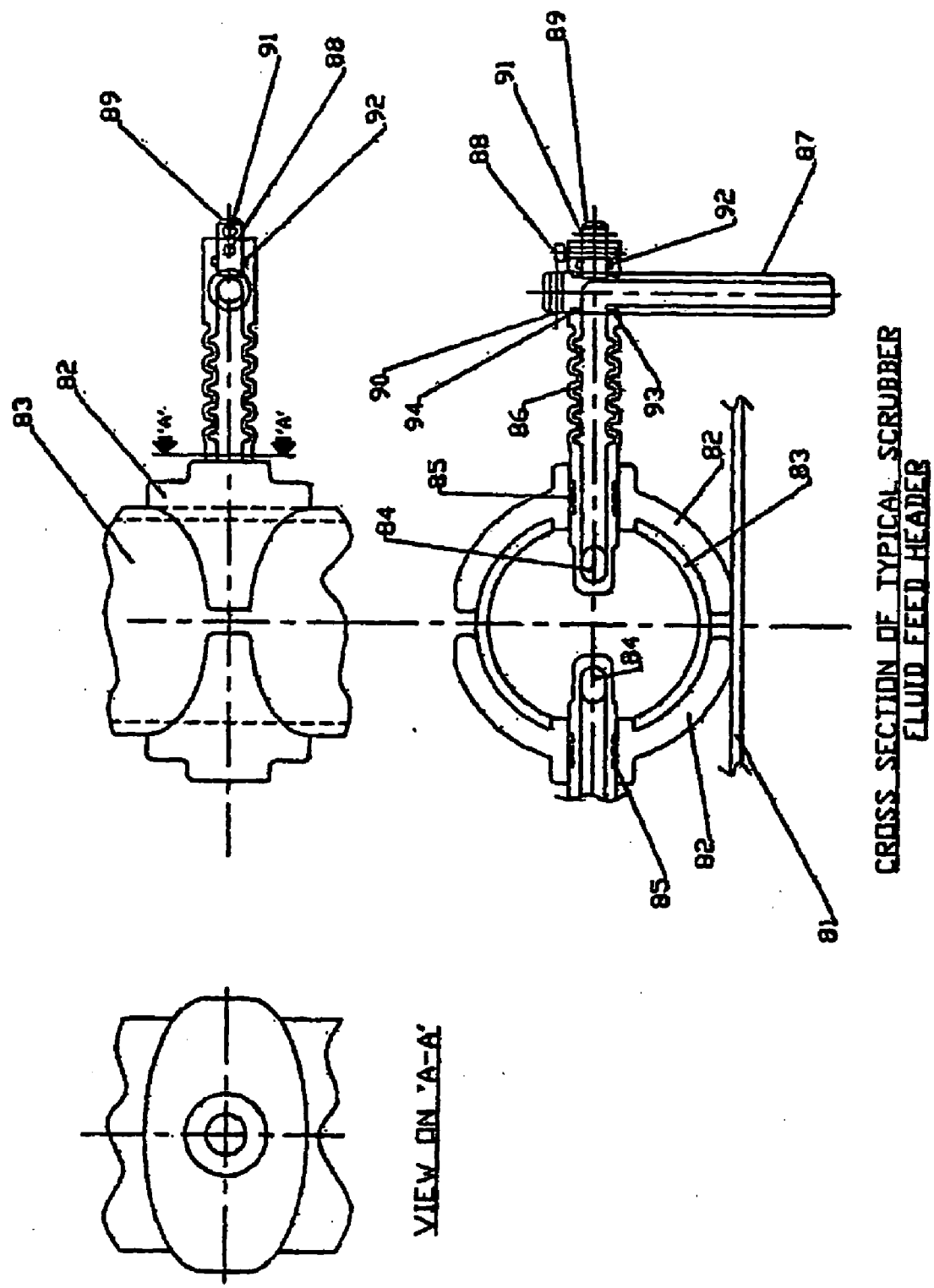
FIG. 7 is a cross-section of a typical scrubber fluid feed header for the IGCP unit.
Figure 8:
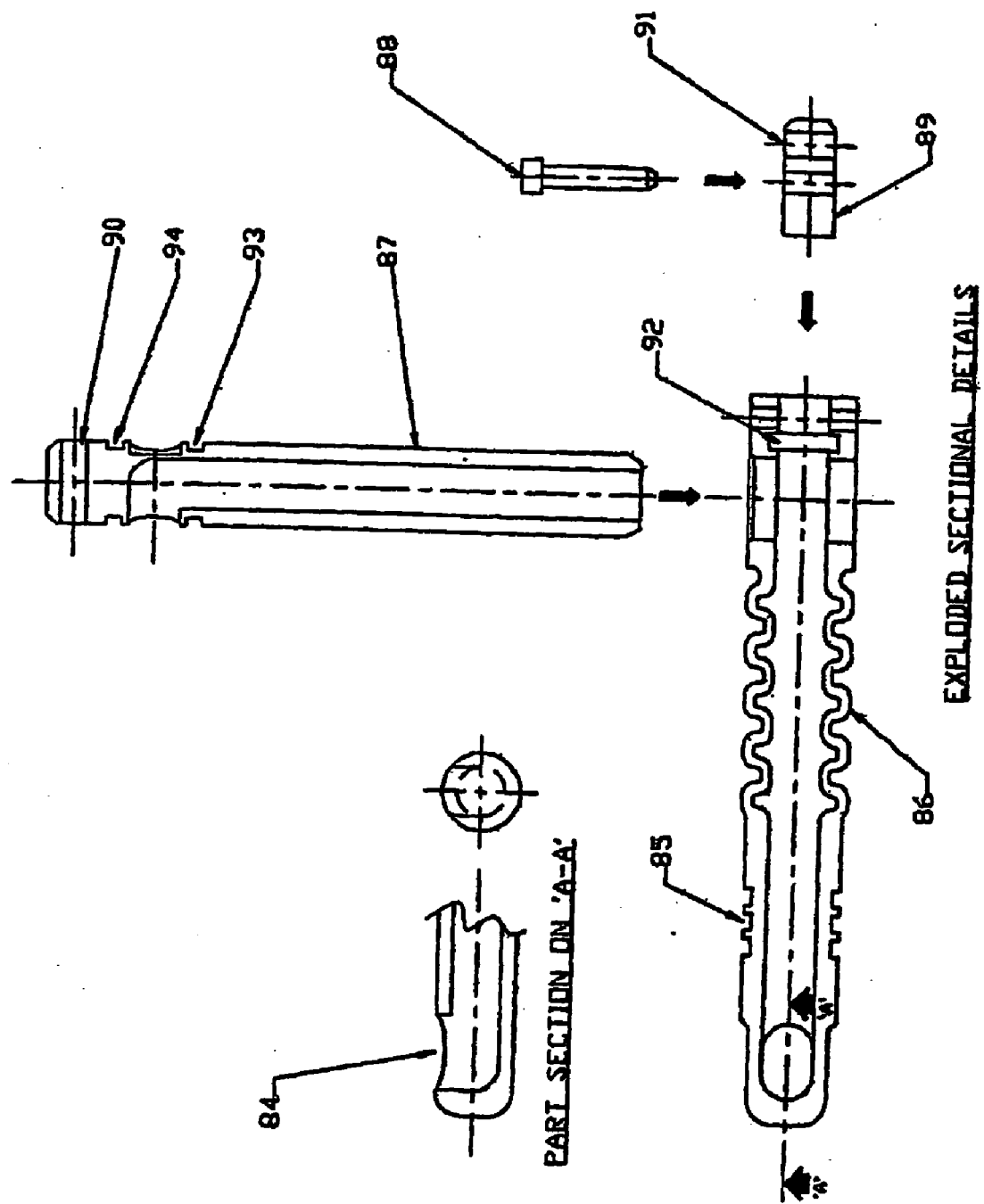
FIG. 8 is an exploded sectional view of a saddle and connection pieces for the IGCP unit fluid feed.

The feed pipe 42 is connected to the vertical feed to the IGCP unit 45, by the on site assembled and pegged joint 44, developed and machined from solid PTFE for on site assembly and disassembly without the need for threaded fixings. This design avoids the problems of thread binding and corrosion in corrosive and hot environments. FIG. 7 presents an enlarged view of the inlet arrangement and the joint 44. FIG. 8 presents an exploded view of joint 44.

The vertical feed pipe (87 in FIG. 8) is held upright and central by a centre feed boss 45 and its support spokes 46. The spokes 46 are mounted in a top casing ring 47, using a flexible arrangement that allows for differential movement between the spokes 46 and the ring 47 during warm up and cool down. This assembly is shown in greater detail in FIG. 9.

Mounted on a shoulder on the outside of ring 47, is a suitable temperature and corrosion resistant, flexible ring 48. Alternate IGCP units (not shown) are fitted with these rings and the ring fills the gap at the touch joints between each IGCP unit when they are arranged on their punch plate mounting. This ring 48 acts as an anti-vibration and separating packer between each unit.

Ring 47 rests on and locates itself with respect to the casing ring beneath it (item 8, FIG. 3) using a shoulder 49. The shoulder 49 incorporates a necessary sealing member, in the form of an O-ring. This arrangement is used to locate and seal each casing component on to the one beneath, all the way down to the top of the cyclone body piece (item 21, FIG. 3).

The core rings are also located on to and sealed to each other in a similar manner using a shoulder 50, which is the same or similar for each core piece.

Stepped edge launch points for the scrubbing fluid on the radially inwards launch 51 and the radially outwards launch 52 are also shown. The profile of the stepped edge is shown in more detail in FIG. 5 at item 60. The vertical face of the step has a slight taper to facilitate mould release when cast. The angled face of the stepped edge 60 has a similar angle as the upstream sloped face of the profiled core piece.

The equivalent stepped edge on the casing ring has similarly sloped faces.

The corner between these two sloped faces of each stepped edge has a fillet radius, for simplicity and robustness of casting as well as to ensure maximum effect from the swirl and scouring action from the back eddy, which is encouraged within the stepped edge.

The sizing of this stepped edge is somewhat of a compromise between the effectiveness of scouring action and making enough allowance for wear in this high abrasion area. Typically the step should have a similar depth and width and this should be between 0.5 and 2.5% of the outside diameter of the annulus.

Figure 5:
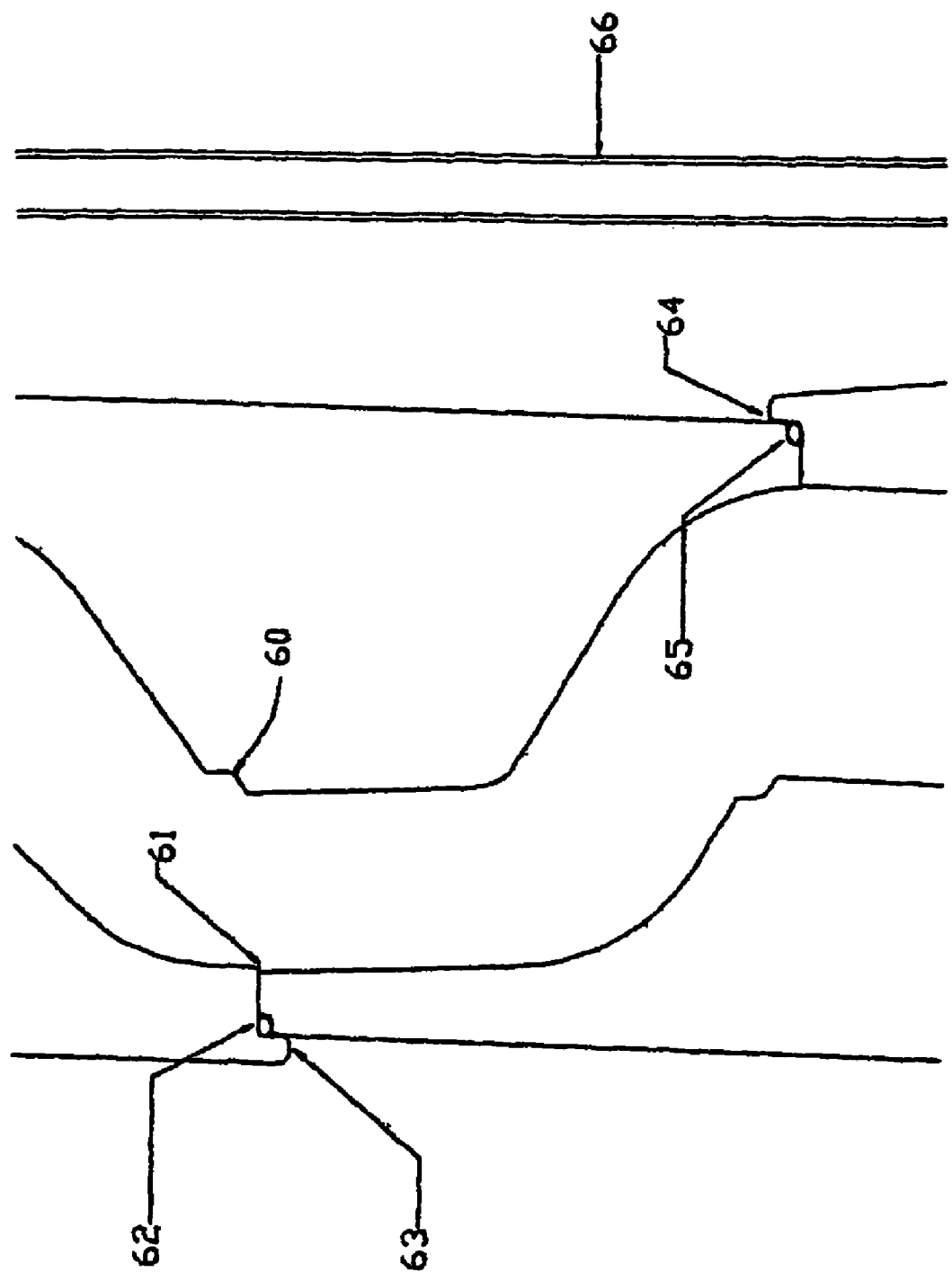
FIG. 5 is a profile of a stepped edge.

In addition to the optimal dimensions of the stepped launch edge, there are a number of distinct advantages which can be gained under specific conditions by changing the relative sharpness of the step. In FIG. 5, the stepped launch edge is shown as having a near vertical face (actually, it is sloped slightly for ease of moulding in this detail). However, for optimum functionality, the near vertical face should undercut the launch surface. From the perspective of achieving the minimum percentage of scrubbing fluid dribbling down the face, the angle between the face and the launch surface needs to be as acute as possible. From the perspective of robustness to accidental damage prior to component insertion, to impact from debris whilst in service and to general wear, the angle needs to be similar to that which is drawn in FIG. 5. Once the angle between the face of the step and the launch face exceeds about 150°, then the effectiveness of the step starts to become impaired.

The angle of the lower face of the step is less important, providing it has a similar slope to that of the launch face or it slopes further downwards (away from) the launch step. Once the angle between the launch face and this lower face exceeds about 15° upwards or about 30° downwards from the angle of the launch face, then the performance of the step starts to become significantly impaired.

The optimum value for the radius 60 is between 0.5 and 1.0 times what would be the length of the face of the step if there were no radius. At radii which are less than 0.5 times this length the performance of the step starts to become impaired. At radii which are more than about 0.9 times this length, there is not much room for wear to take place before the angle of the effective face starts to become significantly affected.

FIG. 28 shows a design of step which represents a practical compromise between all the above criteria. It also enables the launch edge to be as near to the corner of the flow profile as possible, a) to get maximum fluid velocity at the launch and b) to minimize the flight distance from the point of launch to the far side of the flow profile for a given width of annulus.

Also shown in FIG. 5 is the stepped or overlapped joint arrangement which is used to ensure minimal scouring of all the body joints between the casing and the core components. The width of this step or overlap is selected to suit the particular conditions that relate to that particular joint.

A typical "O" ring joint and component location details are shown at 62 and 65 respectively and at 63 and 64. It will be noted that there is a close tolerance fit between each component and the one beneath it so as to ensure proper alignment of the water distribution piece (item 6 in FIG. 3) at the top of the core pieces with the scrubber fluid inlet pipe (item 5 FIG. 3).

Item 66 is the centre tie bar (or threaded rod) which is used to hold the core assembly together.

FIG. 6 shows a typical detail for the scrubbing fluid distribution system together with the segment of the overall carrier vessel within which it is convenient to mount this pipework. It will be noted that the arrangement involves no bolted or other forms of clamped jointing within the vessel. This ensures that maintenance work cannot be delayed as a result of the binding of threads on bolts or other screwed fittings.

The vessel section 72 is jointed to the neighbouring vessel section via a flange or some other suitable form of connection 70, and to the inlet ducting for the incoming gas at the connection 71.

Each header pipe is arranged such that it has an outlet connection (such as a flanged connection) 74 and an inlet connection 73. Preferably, the outlet connection should be fitted with a restrictor plate clamped between the flanges (or other form of joint arrangement) and should be piped on back into the recirculation reservoir at the bottom of the carrier vessel. The restrictor plate should have small holes at both the top and the bottom of the pipe. The holes should be at least 2.0 times the largest aperture size in the screening device that should be fitted to the pumped re-circulation back to the IGCP unit inlets. This will effectively prevent all potential for blocking these holes.

The function of the top hole is to enable any gas, which gets into the header to be freely vented. The function of the bottom hole is to enable any solids, which accumulate on the bottom of the header pipe to be flushed clear on an ongoing basis rather than to accumulate and potentially concrete them together or to the pipe wall.

The individual pipes between the flanges 73 and 74 should be built into the vessel wall section 72 so as to ensure that they are always properly aligned with respect to the IGCP units.

The arrangement of saddle pieces 41 (FIG. 4) is shown at 75. This arrangement is appropriate to suit the arrangement of IGCP units shown on FIG. 10. Obviously the pack of IGCP units can be smaller or larger as suits the particular application.

FIG. 7 shows the arrangement of these saddle pieces and the connection, which fit into the saddles and feed each IGCP unit. For clarity, the numbering of these components is different to that in FIGS. 3 and 4.

In this detail, the position of the dust cover 81 is shown beneath the saddle pieces 82 which are bonded to the header pipe 83. The inlets 84 to each IGCP unit connector bellows piece 86 are shown, together with the three O rings 85 at the sealed joint between the saddle and the IGCP unit feed. The three O rings are arranged such that the connector can slide in and out of the header pipe saddles as necessary to absorb movement and differential expansion in the axial direction. The centre O ring is intended to provide the sealing, the outer O rings are there to prevent dust and grit ingress and to assist the centralising of the O ring arrangement whenever the bellows is under a bending strain as a result of movement in other than an axial direction.

The IGCP unit feed pipe 87 is arranged to be inserted down into the top of the IGCP unit feed boss (45 on FIG. 4) once the inlet to the connecting piece 84 has been inserted into the respective saddle 82. The lower and upper O rings 93 and 94 in the body of 87 seals the feed pipe 87 into the hub at the outer end of 86.

The feed pipe 87 has a radial feed machined or cast into it which is orientated (using peg 88 or another tool inserted into the hole 90) such that it is in line with the hole through 86. Opposite the inlet hole in 87 there is a blind socket into which fits the plug piece 89.

This plug piece serves two purposes. Firstly it closes the hole through which the bellows 86 and the inlet 84 were machined or cast. Secondly it locates with the blind socket in 87 to locate 87 both vertically and in orientation.

Plug 89 is then sealed using O ring 92 and held in place with the peg 88. There is a hole 91 in the rear of plug 89 which can be used to orientate the plug 89 such that the hole for peg 88 is correctly aligned.

During dismantling either peg 88 or a suitable tool (e.g. a thin bar or screw driver) can be used to pull plug 89 out using the hole 91 as the means of gripping the plug.

Similarly, the feed pipe 87 can then be withdrawn using the same technique, using hole 90.

For clarity, FIG. 8 shows in section an exploded view of the components making up the IGCP unit feed. The same numbering as in FIG. 7 is used.

Figure 9:
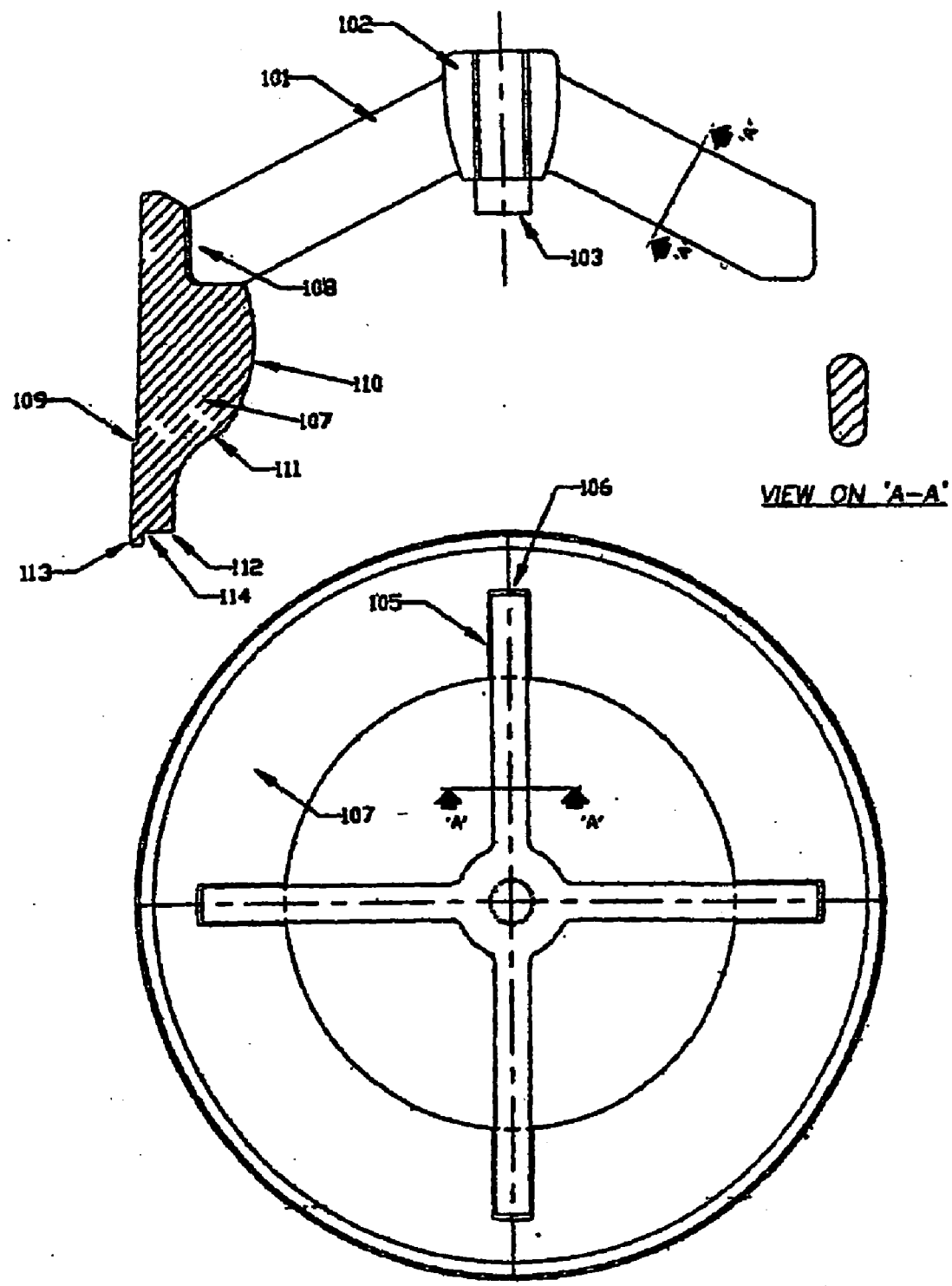
FIG. 9 is a cross-section of a feed boss inlet arrangement with its support ring.

FIG. 9 shows the preferred arrangement for the feed boss and its support ring (46 and 47 respectively on FIG. 4). For clarity, the reference numbers on FIG. 9 are as follows. The Feed Boss is made up of a central hub piece 102 on to which are cast (in this instance 4, but 2, 3 or more would be acceptable) spokes 101. These spokes are mounted into the ring 107 using slots 108.

These slots are arranged such that an elastomeric filler is inserted into the gap 105 in such a way that the radial gap 106 is not filled. The reason for not filling the gap 106 is to enable the elastomeric properties of the filler in gap 105 to allow the spokes to expand during start up and to shrink during cool down at a greater rate than that of the ring 107 without causing too much stress to be applied to 107. This feature is unnecessary when the IGCP unit is to be used in situations where the temperature of the incoming gas is relatively close to ambient. However, in situations such as with Sinter Off-Gases, this feature is considered to be important if relatively simple heat resistant mouldings or castings are to be utilised.

The curvature 110 of the ring 107 has been specifically arranged so as to provide optimum entry orientation for the gases around the centre hub and on to the scrubbing fluid distribution cone (6 in FIG. 3). Similarly, the shape of curve 111 has been arranged so as to create the necessary profile to receive the scrubbing fluid flow during the "gas off" condition and the normal running condition as described for the type a) feed arrangement.

The shoulder 109 is where the elastomeric spacer and vibration absorbing ring (48 on FIG. 4) is mounted.

The corner 112 is arranged to create the necessary abrasion resisting overlap on to the first casing ring (8 on FIG. 3). The spigot piece 113 is arranged to trap the O-ring seal (not shown here) between this piece and the first casing ring. This spigot also has a closely toleranced fit to the outside of the casing ring, so as to enable the whole IGCP unit to be aligned within it.

In order to enable the effects of differential casting shrinkage and heat treatment shrinkage to be overcome, the central hub 102 can be cast with a machinable insert 103 arranged in its centre. This enables the standard heat, chemical and wear resistant formulation to be used throughout the construction (except for 103) and once the elastomeric infill 105 has been inserted, then the hole for the feed pipe can be bored using the location face of the spigot 113 for its centering.

FIG. 10 shows a loose cover, which fits over all the IGCP units and serves to prevent as much dust as is reasonably possible from accessing the gaps between the IGCP units. This is to assist maintenance. The cover also serves to provide a flat surface upon which the scrubber fluid inlet header pipes can rest. The holes 119 in the cover 118 are arranged so that they align with the inlets to each IGCP unit.

Figure 11:
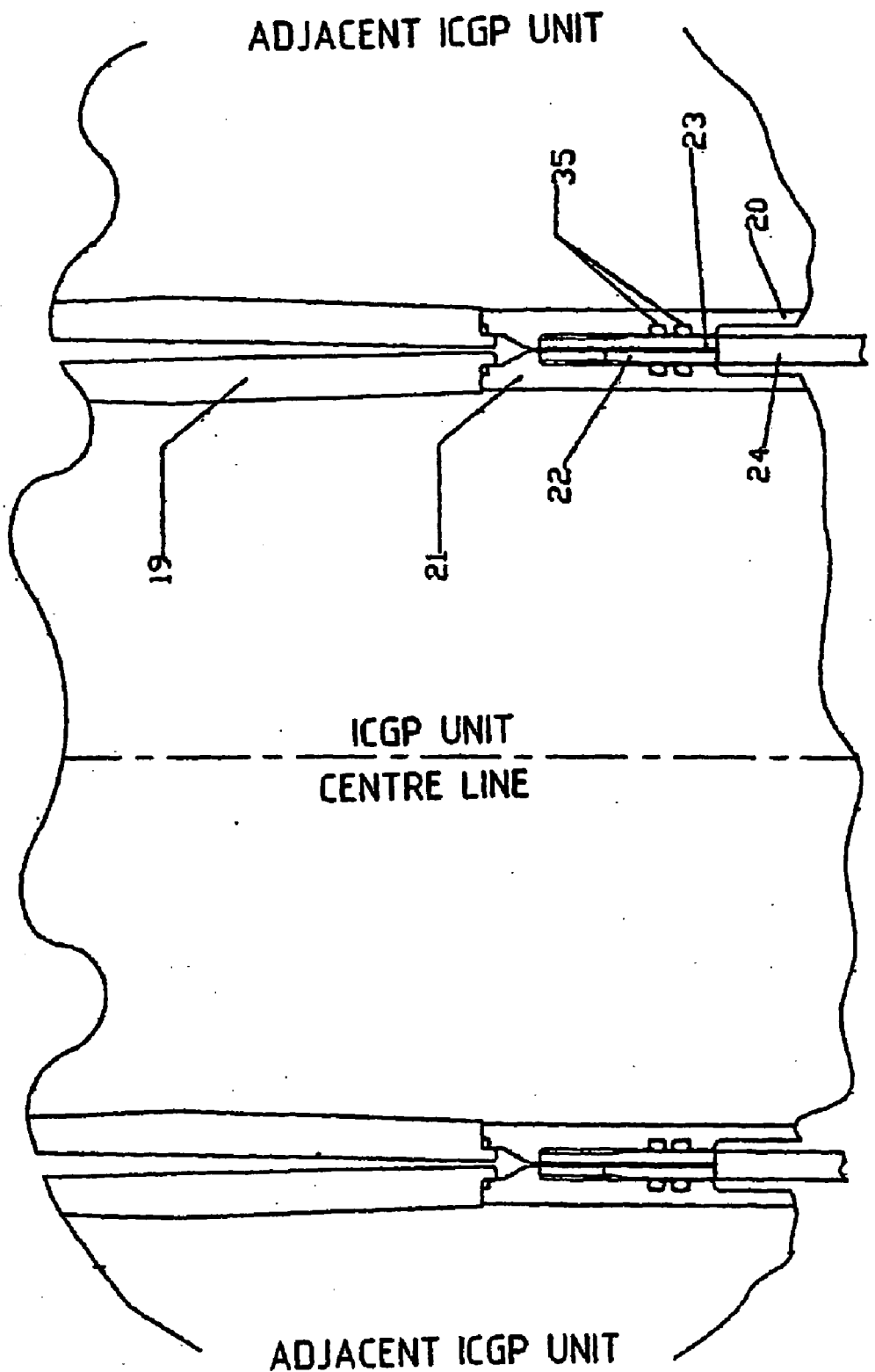
FIG. 11 is a front view of a punch plate mounted support ring.

FIG. 11 shows the punch plate mounted support rings which support each IGCP unit and which enable each IGCP unit to be sealed to the punch plate and hence into the main carrier vessel. The lower wear ring 19 of each IGCP unit sits on and is O ring sealed to the shaped end 21 of the cyclonic tail pipe body 20. This shaped end 21 is in turn sealed using two O rings 35 to the support ring 22. Each support ring is built into and sealed to the punch plate 23.

Figure 17:
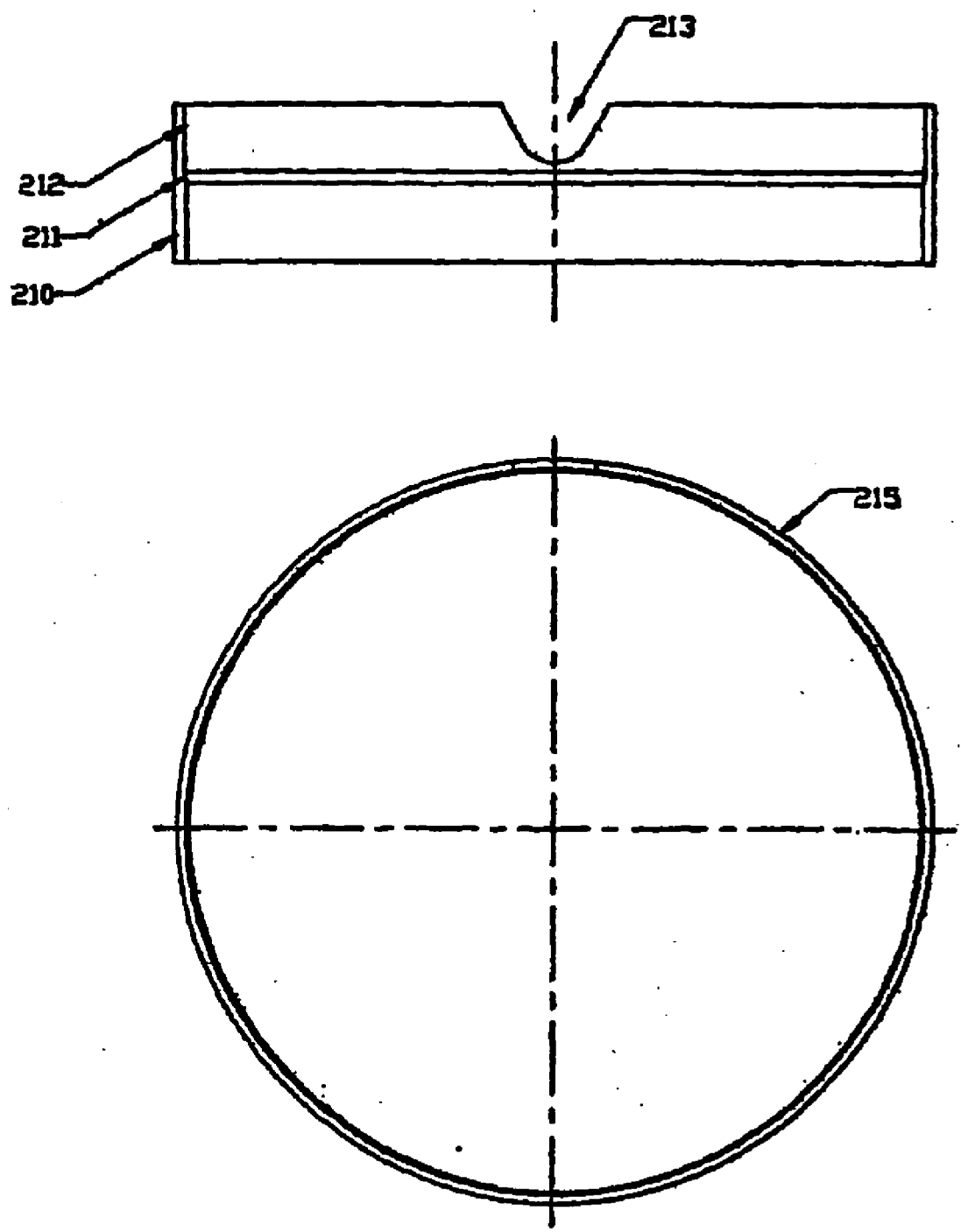
FIG. 17 depicts the support ring as a profile and in a front view.
Figure 18:
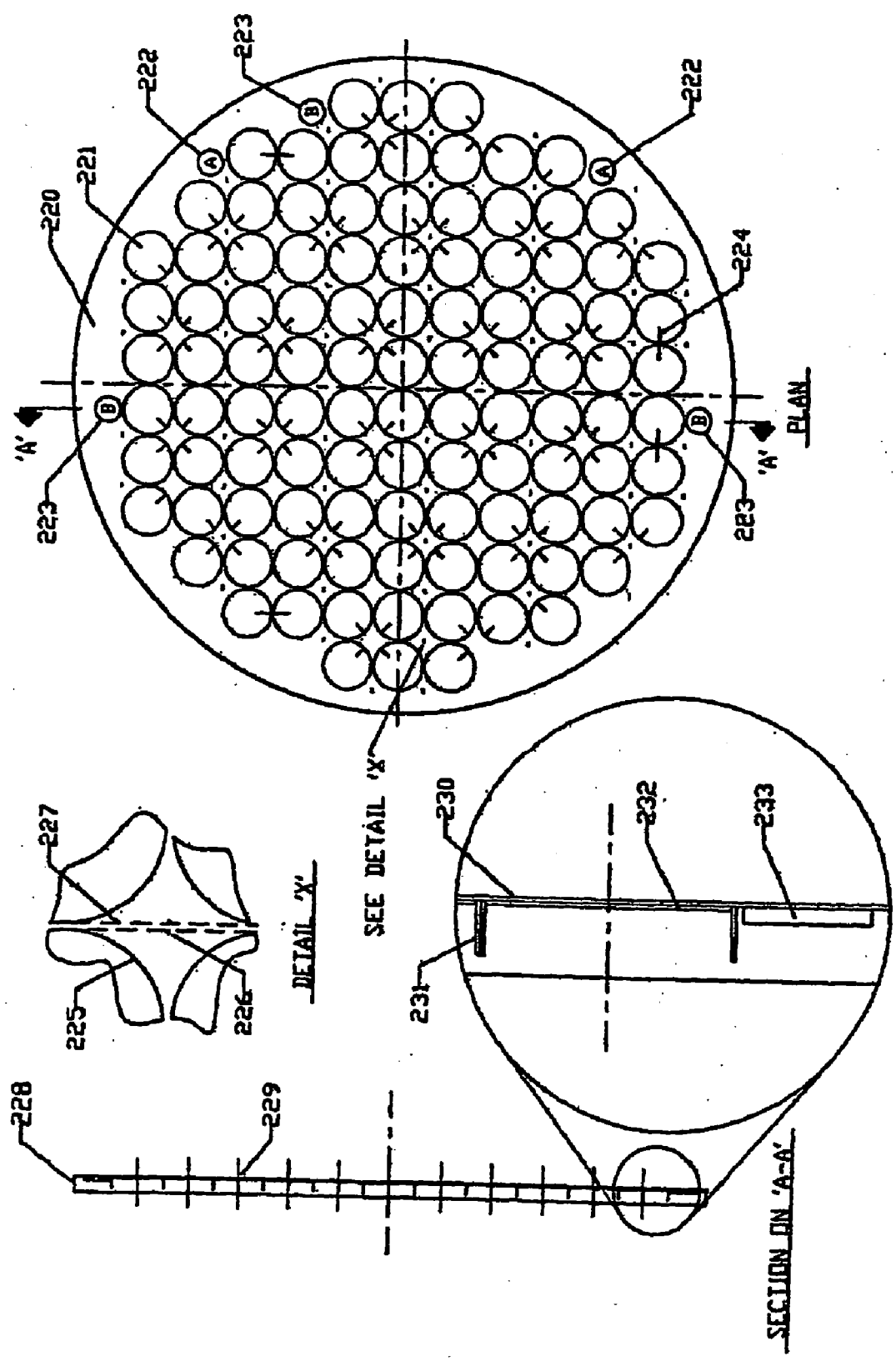
FIG. 18 depicts a sectioned and a detailed plan view of a jig arrangement for manufacturing a punch plate.

In this sectional view, the punch plate is very narrow, but it of course occupies the remainder of the floor area in between the individual circular support rings. The design and mounting of these rings into the punch plate is shown in FIGS. 17 and 18 respectively.

The punch plate is supported by support beams 24 which are built into the underside of the punch plate 23. The means of orientating these beams so as to enable the close tolerance construction of this whole punch plate and support ring assembly is shown in FIG. 18.

Figure 12:
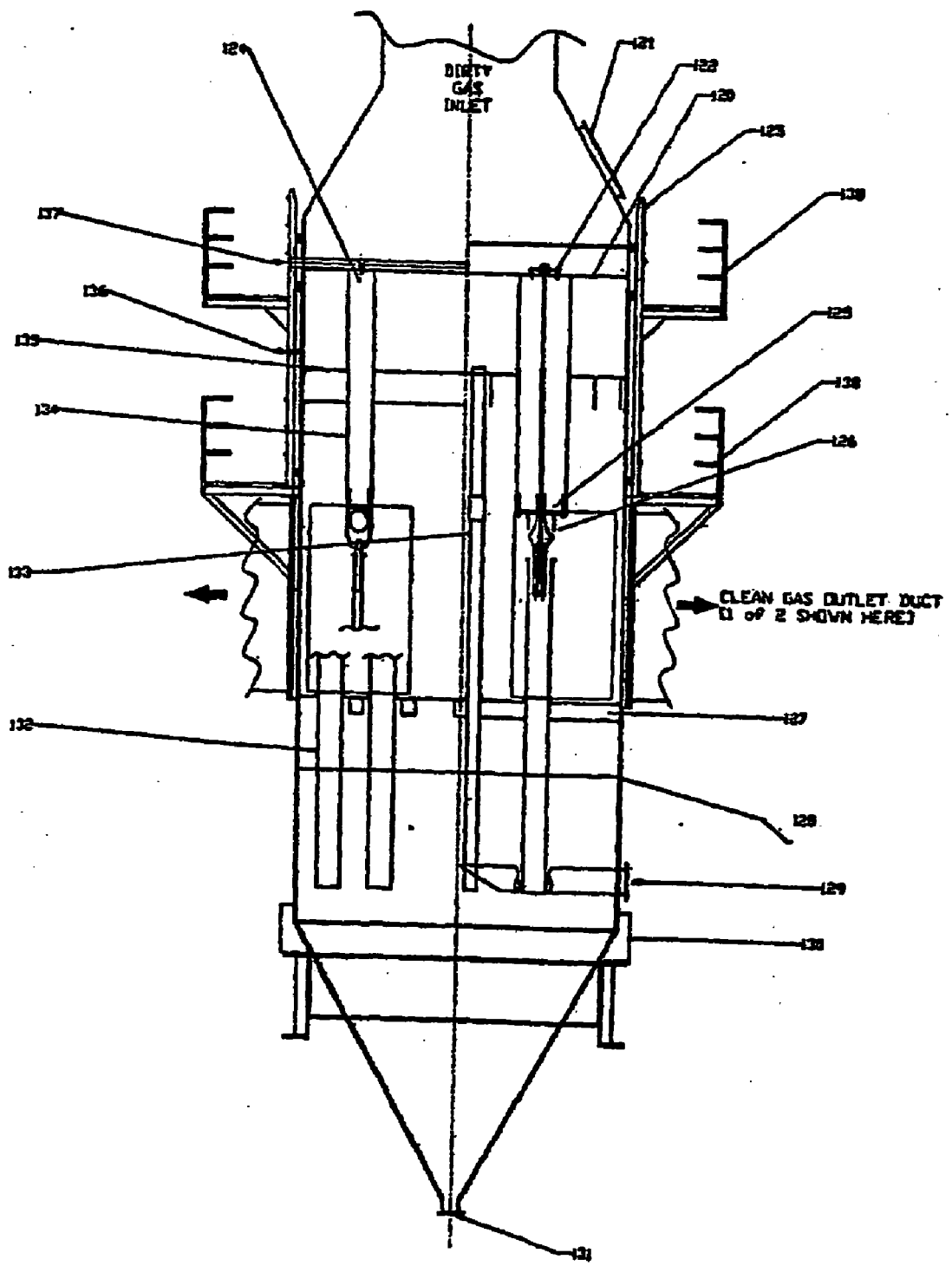
FIG. 12 is a cross-sectional view displaying components and equipment in arrangement within a carrier vessel.

FIG. 12 shows a diagrammatic sectional arrangement of all the components and equipment referred to in this specification within a carrier vessel. The position of the dust cover is shown at 120. 121 is an inspection and access cover within the main gas inlet duct. This duct is shown coming in from the top, but clearly it can be arranged to come in from the side if the overall plant layout so requires.

The scrubber fluid feed header and an individual feed pipe is shown at 122.

The carrier vessel is arranged such that the part of the vessel with the scrubbing fluid feed header (FIG. 6) and the next section down (FIG. 25) complete with the punch plate and a full set of IGCP units and punch plate drains (FIG. 23) can all be lifted out as a single unit and a replacement complete package can be lifted back in as a single assembly. In order to enable this single entity to be guided into its correct orientation with respect to the scrubbing fluid outlet connections from each tail pipe, guideposts 123 are arranged with a close fit to the connecting flanges (or other connecting arrangements) on the carrier vessel. There will also be location lugs on the outside of this one-piece assembly which will orientate the assembly with respect to the scrubbing fluid inlet pipework.

These guide posts or other means are also used as a means of supporting the upper and lower walkway accesses (138). This enables all the necessary connections to be made and removed without having to disturb any external pipework or infrastructure.

These same guideposts also serve to locate the gas inlet ductwork and expansion hood as that is replaced following such a lift out of the old and lift in of the replacement operation.

This whole mechanism and the integrated nature of this design has been arranged to enable down time to be minimized. It is estimated that the whole of a vessel's IGCP units should be able to be exchanged and for the whole vessel to be back on line again within less than a shift by using this arrangement.

The position of the gas and scrubbing fluid contacting part of one of the IGCP units is shown at 124 and the vortex finder area of another at 125, together with the gas outlet from that other unit at 126.

At 127 the floor support beams are shown which support the loose fitting floor plate (FIG. 22) which provides the access to and the support from the pipe drains 132 and punch plate drains 133 (FIG. 23) which drain the used scrubbing fluid from each IGCP unit tail pipe into the lower part of the carrier vessel.

The normal liquid level for the scrubbing fluid in this lower part of the vessel is shown at 128. The scrubbing fluid off take to the re-circulation pumps is shown at 129.

Typical vessel support arrangements are shown at 130, but there are a number of different methods of support which can be used.

The cyclonic section of one of the IGCP units is shown at 134 and the punch plate support for the IGCP units is shown at 135.

At 136 is shown the location for the entry of a supply of scrubbing fluid to flood the top of the punch plate.

This supply of cool scrubbing fluid performs a number of duties. Firstly it ensures a gas tight seal between all the IGCP units and their mounting into the punch plate support rings.

Secondly it keeps this area of the construction beneath the dust cover cool when hot gases are being scrubbed. This enables heat distortion problems within the punch plate and its support to be avoided. It also enables lower temperature capability resins to be used for the construction of these components. This can have a significant effect on costs.

At 137 is shown one of the scrubber fluid inlets to the feed headers.

Figure 13:
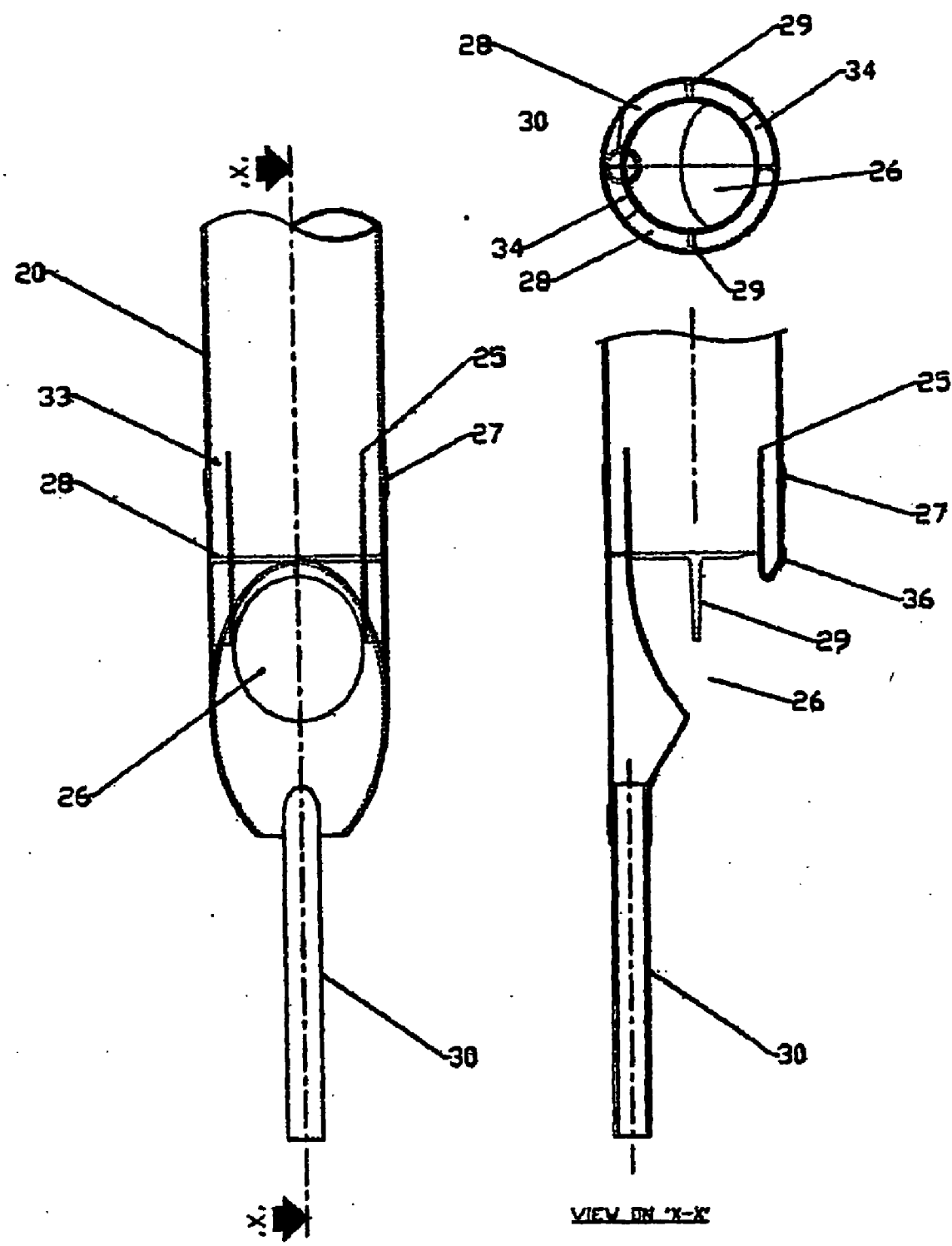
FIG. 13 is a longitudinal section of a tail pipe and vortex finder area.
Figure 14:
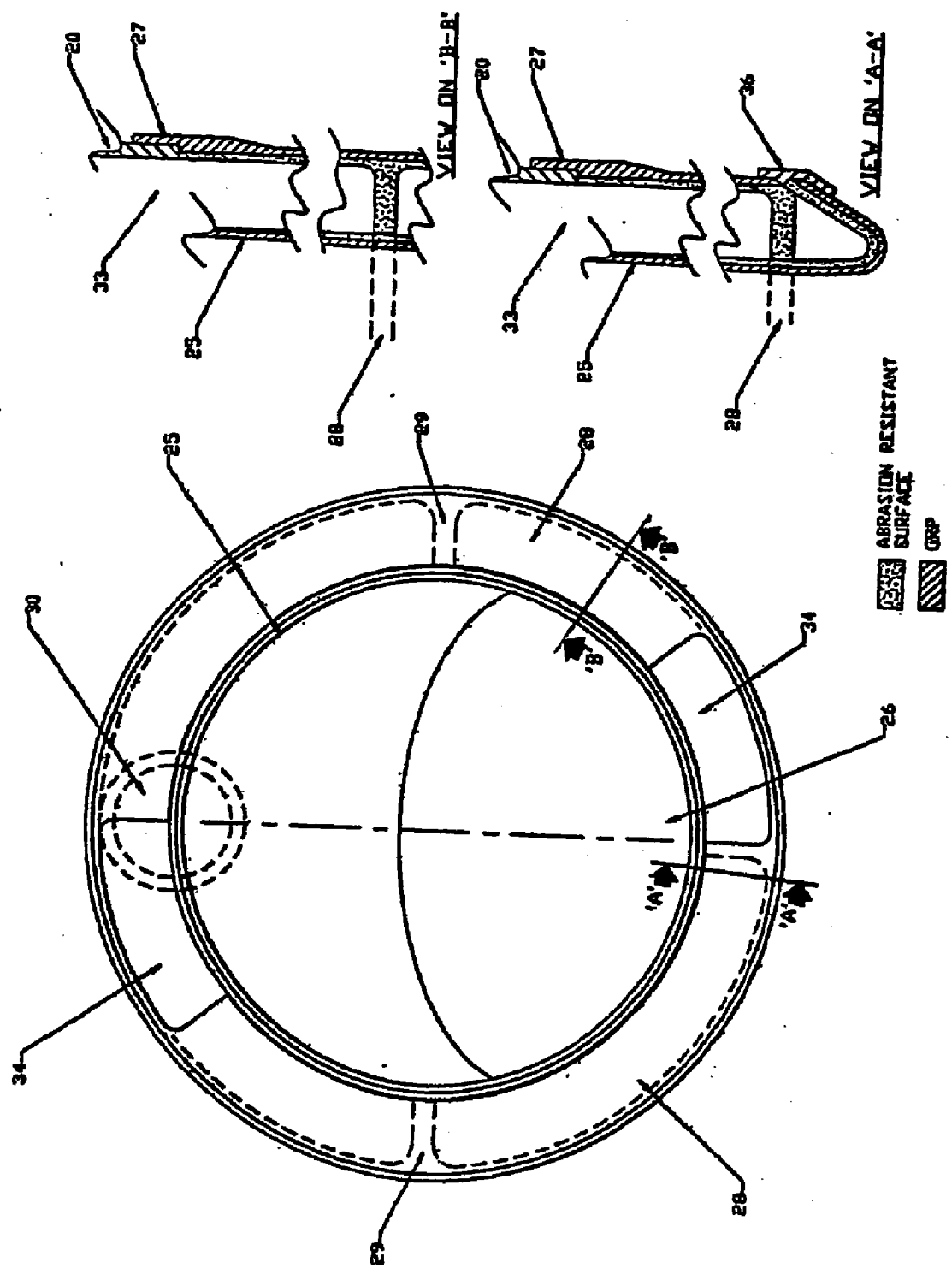
FIG. 14-15 are sectional views of the tail pipe and vortex finder area.
Figure 15:
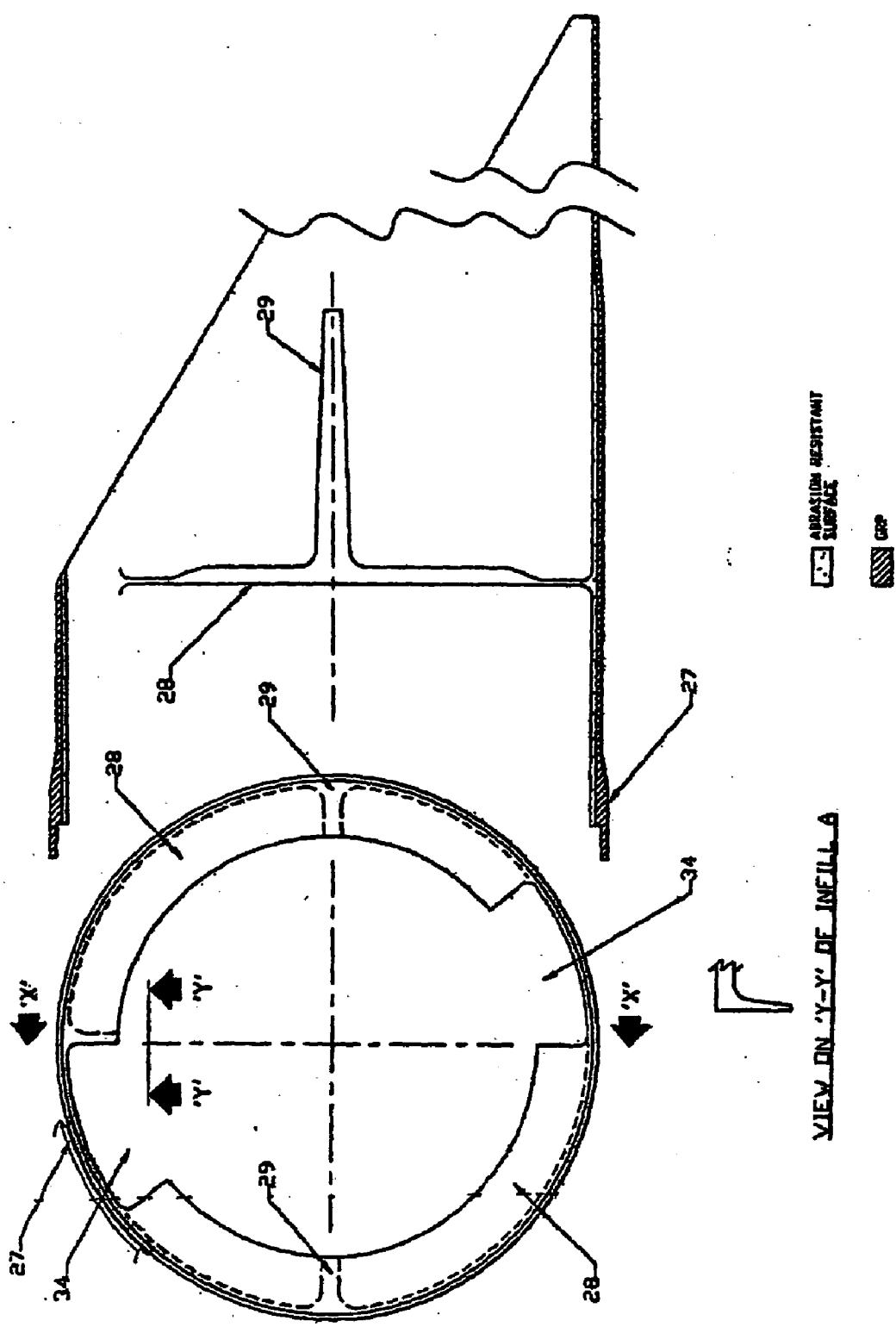

FIGS. 13, 14 and 15 show in more detail the construction and arrangement details for the tail pipe vortex finder area. These details also show the locations where abrasion resistant materials or finishes are required. The same component numbering is used for all three Figures.

The cyclonic section 20 is connected at spigot or other form of joint 27 to the vortex finder assembly. The vortex finder pipe 25 discharges through the partial bend at 26 and the gap between 25 and 20 forms the annular section 33. The rings 28 form a square end to this annular section which enables the used scrubbing fluid to be separated from the gas and discharged via pipe 30.

In order to achieve this separation, the scrubbing fluid with some entrained gas passes through the gaps 34 between the annular ring pieces 28 into the space below the rings. Here (and within the annular space beneath the rings) the radial baffles 29 (which project across the full width of the annulus below the ring pieces 28) stop the rotational movement of the scrubbing fluid and entrained gas. The scrubbing fluid falls to the bottom and exits via pipe 30.

Section AA on FIG. 14 shows a radial infill piece beneath the end of one of the ring pieces 28. This infill closes the gap between the top of the inclined end plate which is formed around the gas exit 26 to close off the annular gap below the ring pieces 28. This infill (as shown in section AA) prevents the non uniform annular space that is formed by the outlet 26 and the inclined end plate from upsetting the performance of the vortex finder.

Figure 16:
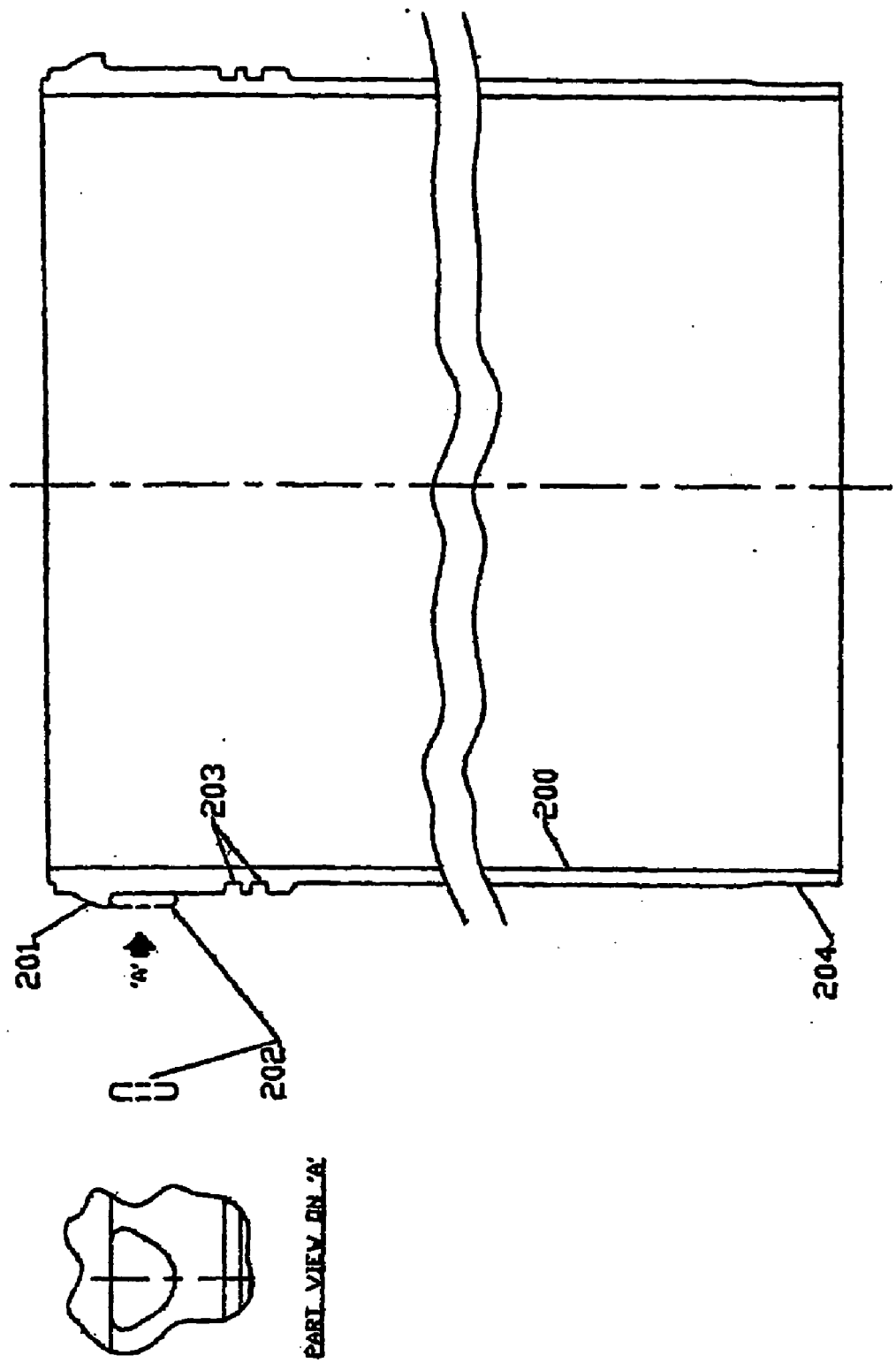
FIG. 16 is a detailed view of the body of the cyclonic section of the IGCP unit.

FIG. 16 shows a detail of the body of the cyclonic section of the IGCP unit (20 in FIG. 3). The body is referred to here as item 200, and the support and location shoulder is 201. On the left hand side of this shoulder is a triangular location piece 202, which in this design is shown as a piece which can be bonded on after moulding/machining. Other attachment mechanisms would be equally suitable. The function of this locating piece is for it to align with the scrubber fluid outlet pipe (30 in FIG. 13). This then aligns with the slot in the top of the support ring (213 on FIG. 17), which is mounted on the punch plate. FIG. 18 shows how each of these slots need to be orientated on the punch plate as a whole. As a result of this detailing, a standard IGCP units can be put into any location on the punch plate without any need to specifically orientate it and the outlet pipe for the scrubbing fluid will automatically align with its respective pipe drain.

At 204 on FIG. 16, the outside diameter of the body of the cyclonic section is shown as being machined/finished appropriately to enable it to be fitted to joint 27 (FIG. 13) without the outside diameter of joint 27 becoming too large for it to fit comfortably through the support ring (FIG. 17).

The support ring (FIG. 17) has its main thickened structural cylinder 210 finished on its inside surface suitably to create the required O ring seal. The tapered shoulder 211 provides a suitable lead in taper for the O-rings on the outside of the IGCP unit body to slide into the narrower bore of 210. The diameter at 212 is arranged to enable the IGCP unit to be entered easily into the support ring and for the O-rings not to be damaged as they pass the slot 213.

FIG. 18 shows a preferred arrangement for the jig that can be used to create the punch plate using the support rings (FIG.

17) and normal GRP lay up techniques. The jig has discs 221 (which are shown in the side view at 232) over which each ring 231 is placed. Each disc is marked (224) so as to identify the required orientation of the location slots (213 on FIG. 17). In addition to discs 232, there will be discs 222 and 223 for each style of punch plate drain. Drains A (222) are for normal level control and drains B (223) provide emergency drainage capacity in the event that, for example, a scrubber fluid feed header ruptures. These discs 222 and 223 may be thicker that discs 232 (as indicatively shown at 233 in the enlarged part of the side view) so as to enable a hole to be formed within the GRP lay up which will enable the pipe 280 (FIG. 23) to be inserted and then the flange 286 (FIG. 23) to be resin bonded into place.

The jig base plate 220 will have a circular ring around it 228 which will contain the GRP lay up and thereby create a circular plate which will fit snugly into the carrier vessel.

Detail X on FIG. 18 shows the mechanism by which the support beams can be accurately located and held in place whilst they are bonded on to the underside of the punch plate once it has been moulded and cured. At 225, the outlines of four carrier ring location discs are shown and at 227 is the relative position, which will be occupied by a support beam. The top of the surface of the jig on which the punch plate is moulded will have a sequence of short blind holes drilled into it at 226, one each side of the support beam position. These will create short pegs on the underside of the punch plate.

Once the plate has been formed and cured, the plate can be removed from the mould, inverted, and after the release agent has been removed in the area of each support beam, these pegs can be used to accurately locate each beam as the beam is bonded into place.

This detail enables very narrow beams to be used, which in turn enables the maximum number of IGCP units to be fitted into a given size of carrier vessel.

Figure 19:
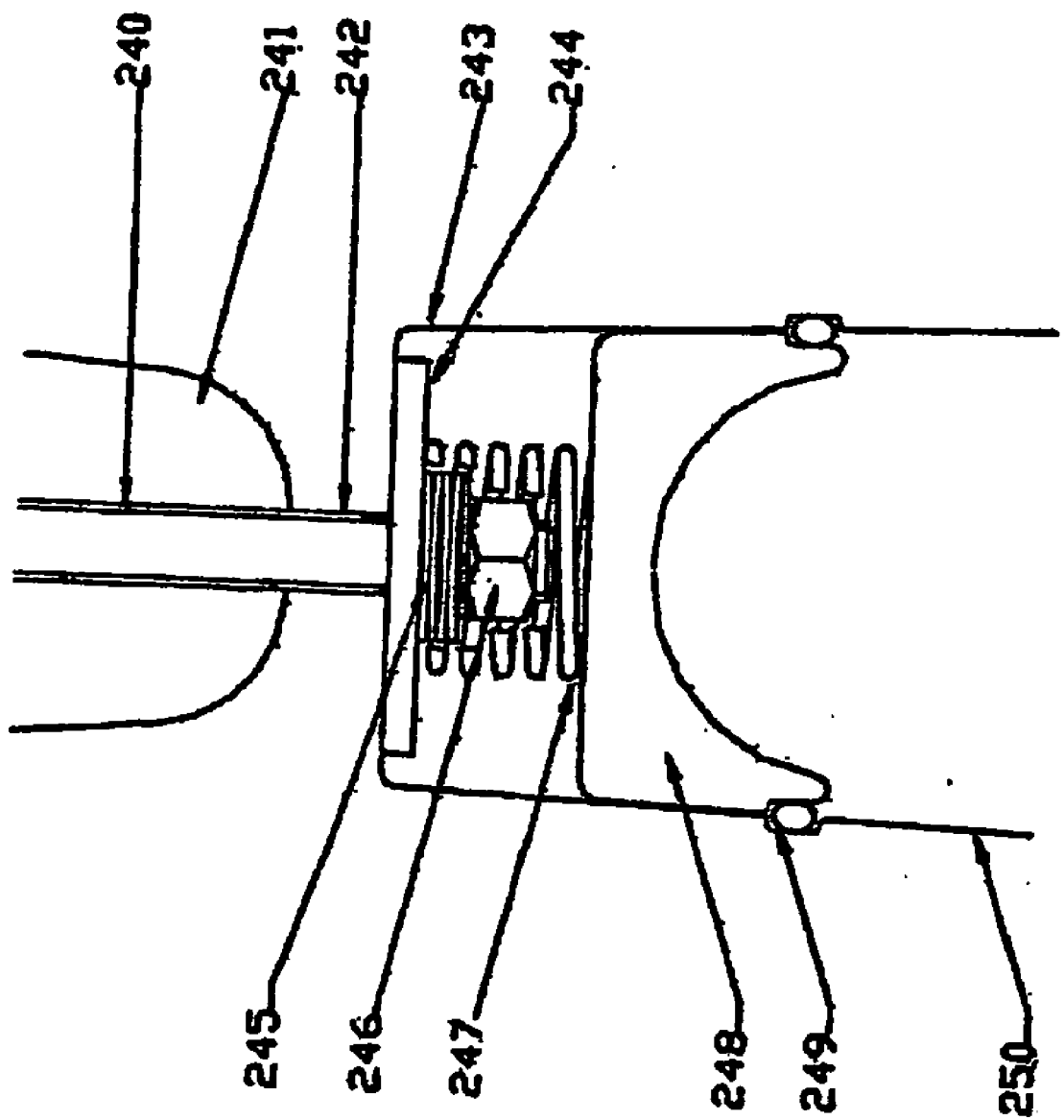
FIG. 19 is a longitudinal front sectional view of a tie rod arrangement with the core sections of the IGCP unit.

FIG. 19 shows the preferred arrangement for securing the tie rod, which holds the core sections of the IGCP unit in place when a multiple component assembly is used. In order to achieve the correct alignment of all the components, they are assembled upside down on a centralising jig. This jig will have a tube which will fit through the hole in the centre feed hub 102 (FIG. 9) and locate the hub and hence the ring 107 (FIG. 9). This tube will also locate and centre the end of the cone 6 (FIG. 3). All the other components will then be stacked one on another and then the plate 244 will be fitted over the tie rod following by an appropriate arrangement of Belleville washers (or equivalent) 245 and nut 246.

The cover piece 248 could be inserted on to the top of spring 247 and pushed down hard so as to allow O-ring 249 to be inserted. The cover can then be allowed to slide back so as to trap the O-ring and seal the inner end 243 of the hollow end 250 to the core of the spinner section.

Arrow 241 points to the hollow inner zone of the assembled core and 242 indicate a clearance hole in the spinner section core piece.

Once the nut is tight, the outer casing pieces can be strapped or otherwise clamped together using straps or clamps which are orientated such that they reside in the gaps between individual IGCP units once they are assembled.

These same clamps, or additional clamps should also be arranged to locate on to suitable fixings on the outside of each carrier ring (FIG. 17) so that each IGCP unit can be clamped into place and held upright on the punch-plate.

Figure 20:
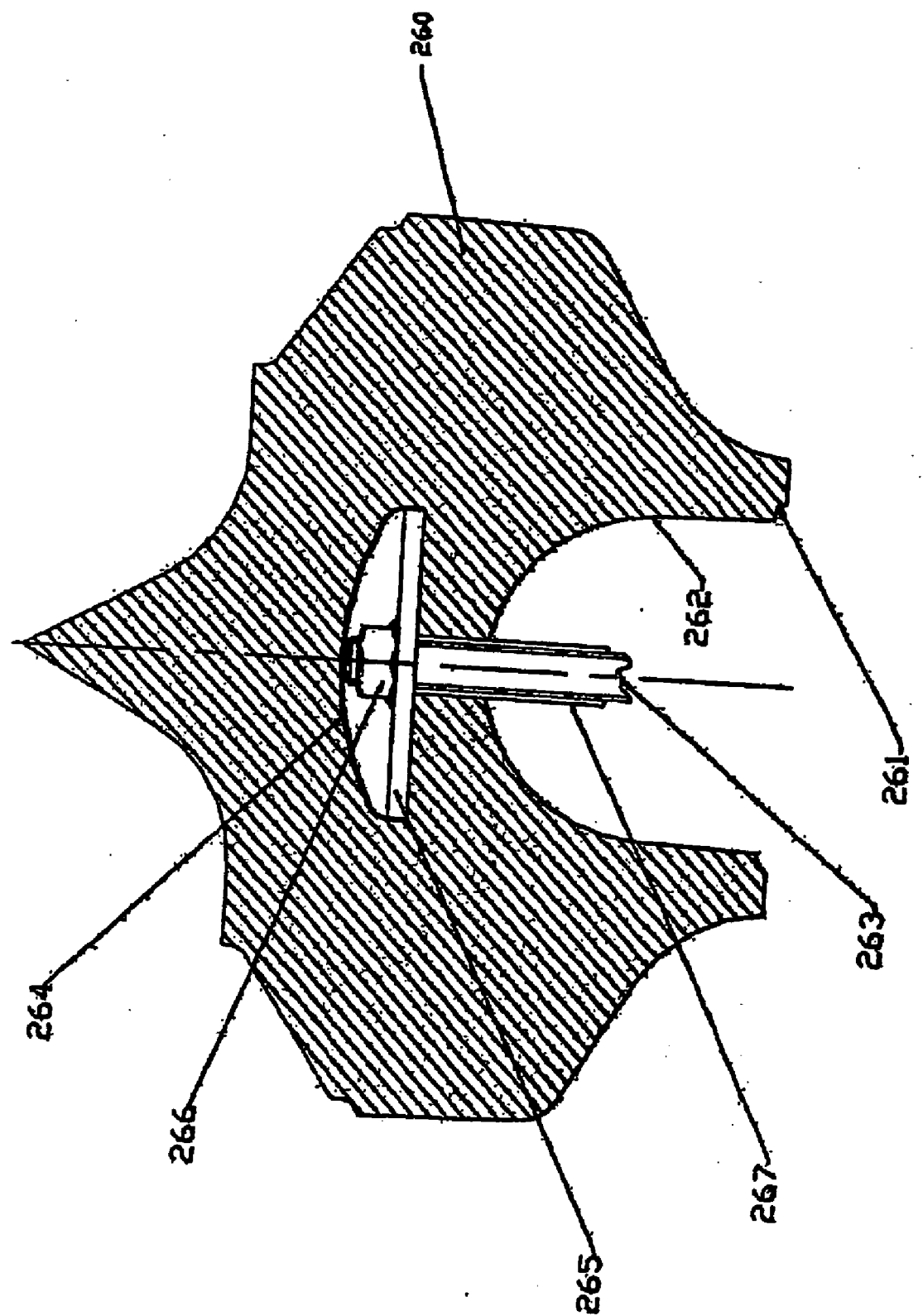
FIG. 20 is a partially sectioned front view of an attachment method for the upper end of the tie rod to the scrubber fluid distribution target piece.

FIG. 20 shows the preferred arrangement for securing the upper end of the tie rod 263. A nut 266 is welded to the plate 265 and a moulded cap 264 is fitted over it so as to create a gap above the nut and above the plate 265. A sleeve 267 is fitted around the tie rod and inserted into the mould component which will form the inner profile 262. The top core piece and scrubber fluid distributor 260 can then be cast, including the O ring seal groove and locating face 261.

When the mould is released, the sleeve 267 should be withdrawn and the tie rod loosened so as to create a clearance between it and the inside of cap 264. The tie rod should then be resin bonded to 260 using the gap left by sleeve 267.

Figure 21:
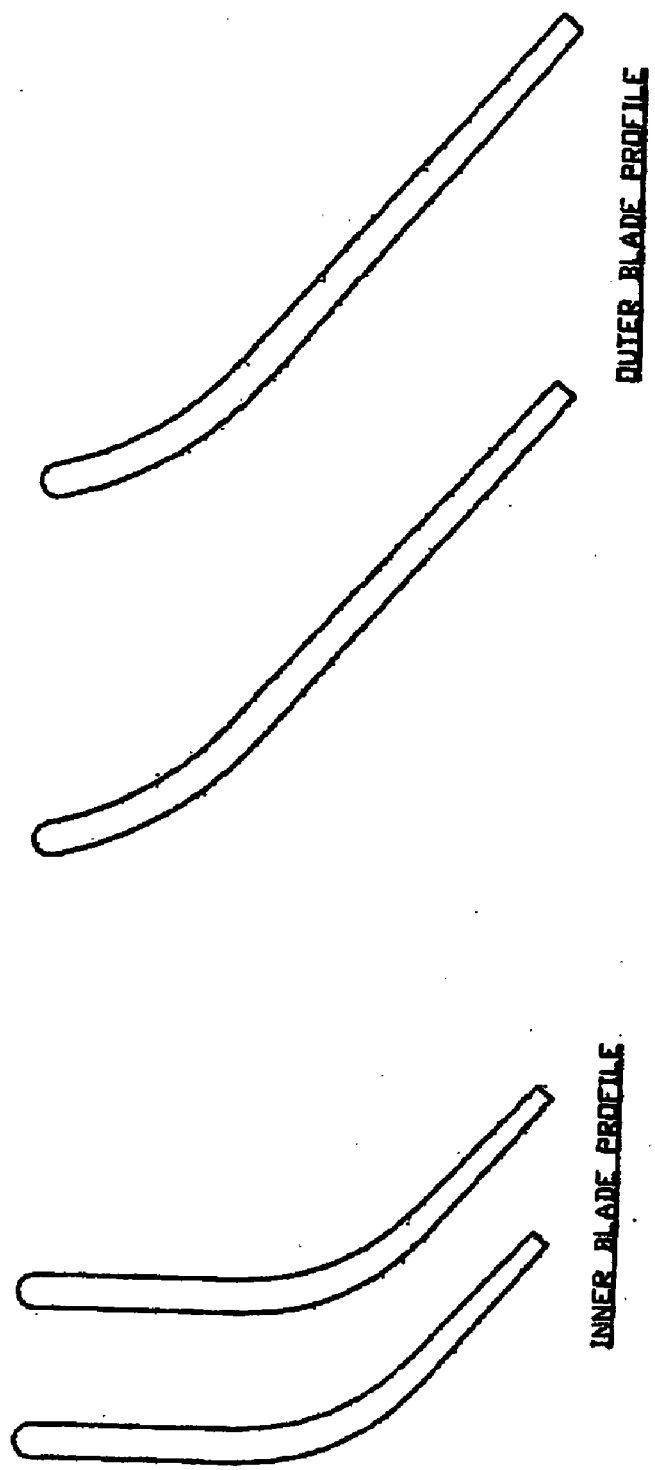
FIG. 21 depicts spinner blades in inner and outer profile.

FIG. 21 represents the inner and outer profiles of the style of spinner blade which achieves close to optimal spin whilst retaining good wear and mouldability characteristics.

Figure 22:
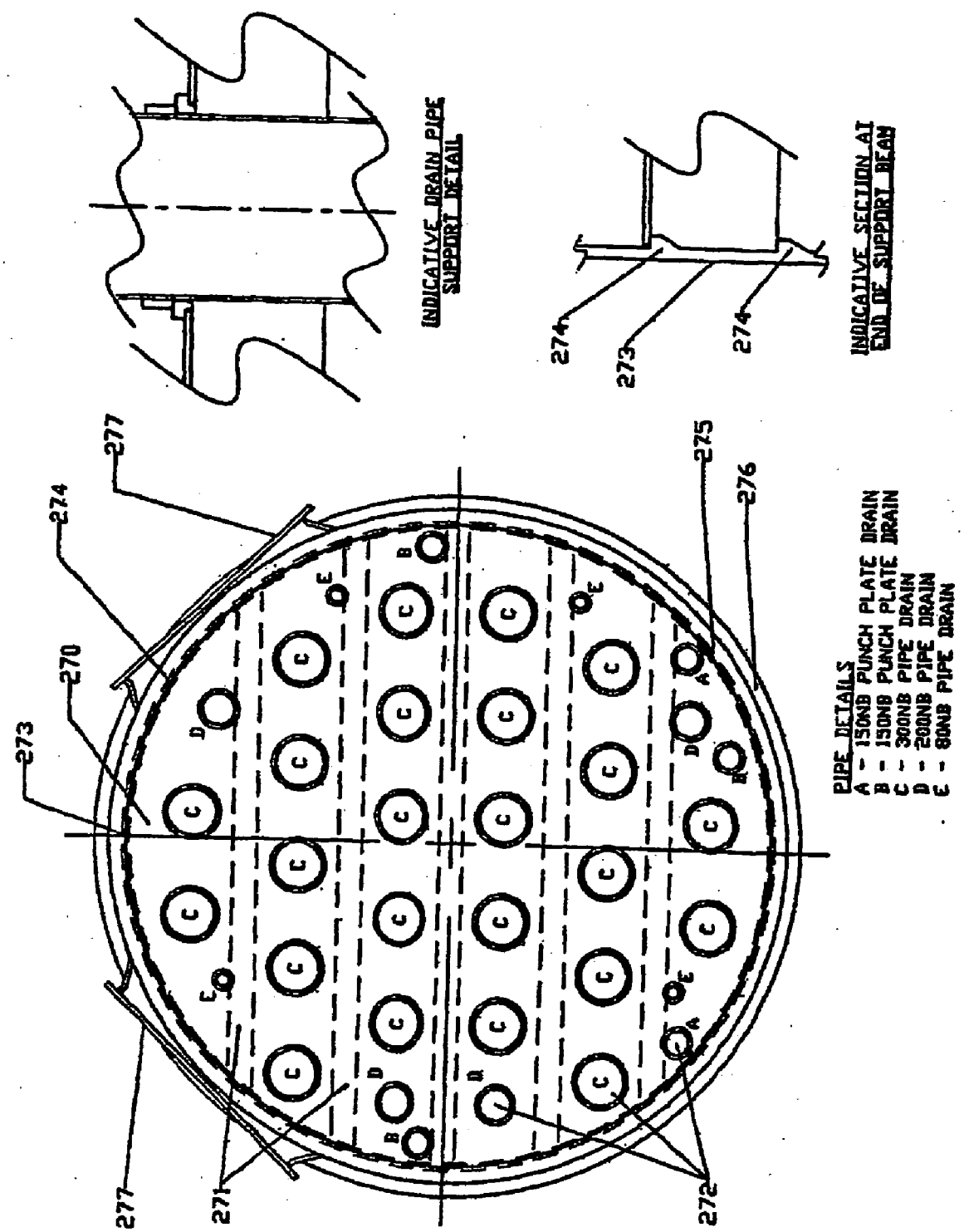
FIG. 22 depicts plan and cross-sectional views of a pipe drainage system, incorporating the floor plate, support beams, plate support ring and pipe supports.

FIG. 22 shows the arrangement of the floor plate and support beams from which the pipe drains and punch plate supports are assembled and supported. The plate 270 is loose fitting and covers the whole floor area. It is supported on beams 271 and has holes cut to suit the various sized drains 272 that need to pass through the floor. The sizes for these drains which are shown are indicative only and supply a nominal 4 meter diameter carrier vessel.

The plate and support beams are carried on the vessel wall 273 using normal moulded in support ring 274 or their equivalent. Arrow 275 points to the vessel connecting flange which connects this part of the vessel to the section which houses the IGCP units. 276 is an indication of the likely ring beam support for the vessel but other means of vessel support can be used. 277 identifies the gas outlet connections from this part of the vessel.

Figure 23:
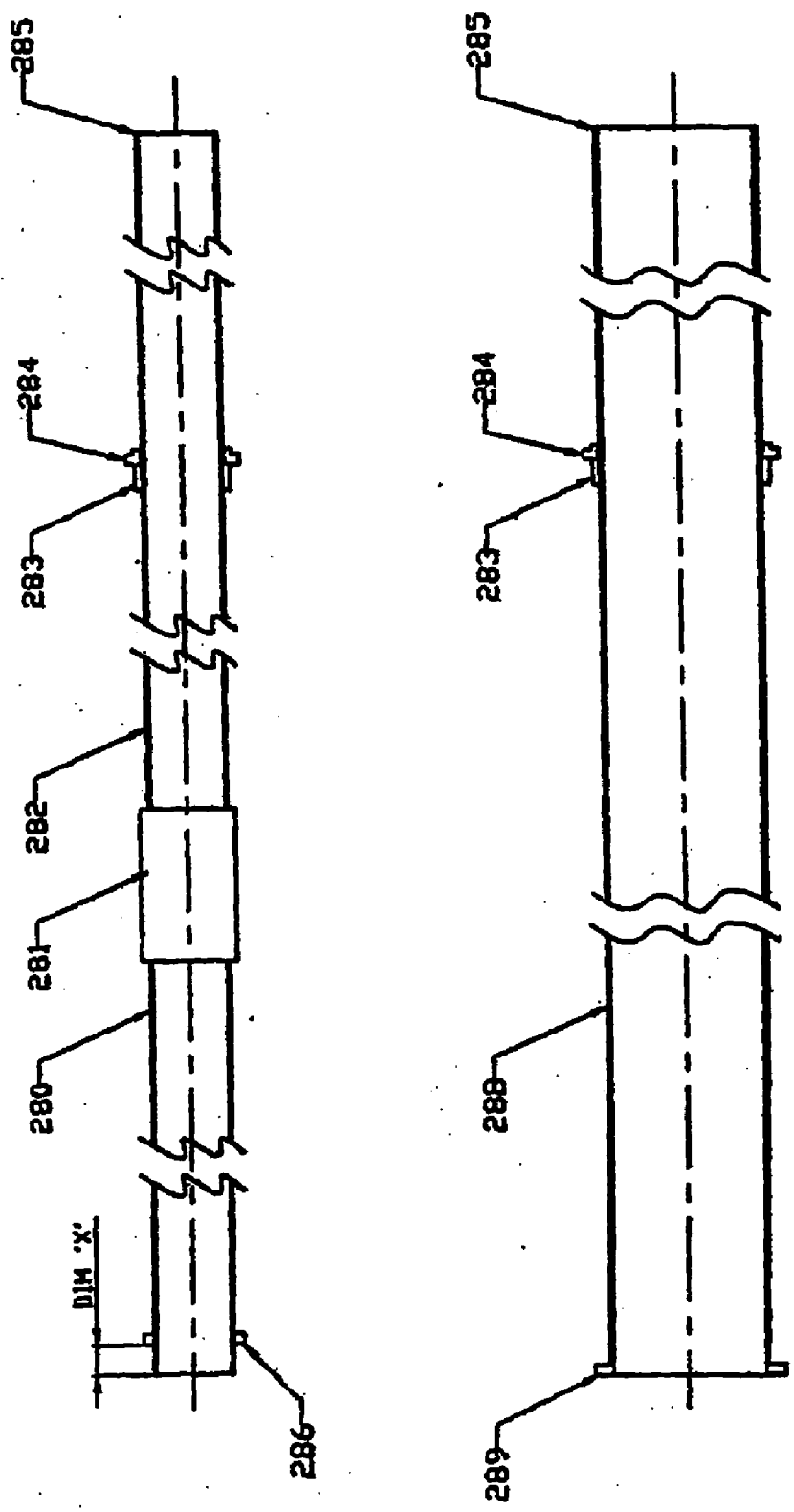
FIG. 23 depicts the two types of drains in partial cross-sectional view.

FIG. 23 shows the two styles of drains. Pipe 280 is fixed to and bonded to the punch-plate using flange 286. It has a coupler 281 attached to the lower section 282 and which O ring seals to the pipe 280.

Both types of drain have shoulder 283 built on to the pipe outside diameters in such a position that when collet pieces 284 are inserted into the holes in the plate 270 (FIG. 22), the pipes 282 and 288 are supported at the correct height with their open ends 285 submerged beneath the scrubber fluid at the bottom of the carrier vessel.

In the case of pipe 288, the flange 289 is provided purely to enable the pipe to be lowered down and rested on the floor whilst IGCP tail pipes are inspected, repaired, or whatever. A similar shoulder can be fitted to 282 if the coupler outside diameter is not large enough to provide a similar function.

Figure 24:
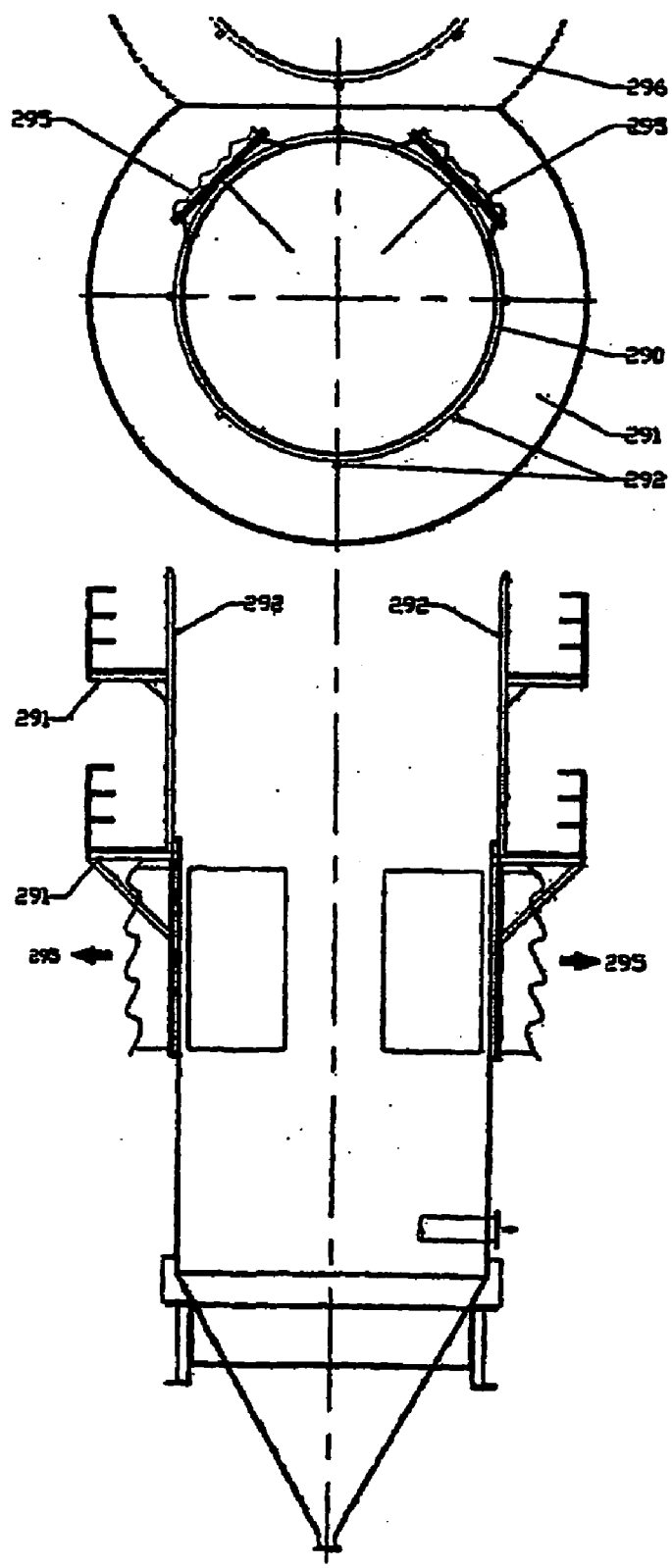
FIG. 24 is a front sectional view of the lower section of the a carrier vessel also showing walkways, guide posts, gas outlet ducts and an adjacent carrier vessel with interconnecting walkway.

FIG. 24 shows the lower section of the main carrier vessel 290, the walkways 291, guide posts 292, the gas outlet ducts 295 and the likely adjacent carrier vessel and its interconnecting walkway 296 when more than one carrier vessels are required for the specific duty.

Figure 25:
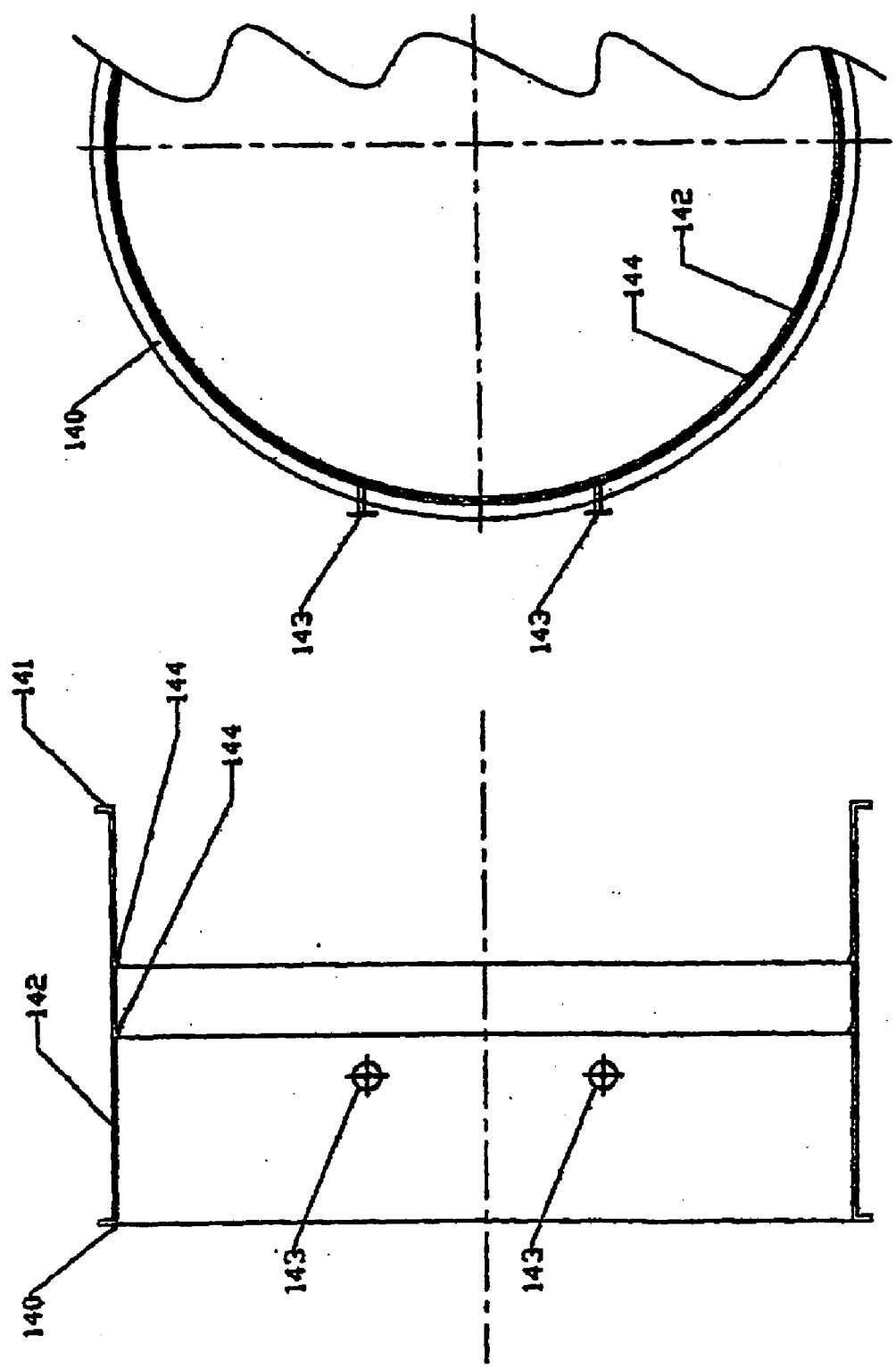
FIG. 25 depicts partial views of the carrier vessel in arrangement with the main punch plate support.

FIG. 25 shows the typical detail for the part of the carrier vessel into which the main punch plate support is built. The main vessel wall 142 has interconnecting flanges or other suitable jointing arrangements at 140 and 141. The input connections for flooding the punch-plate with scrubbing fluid are shown at 143 and the support rings for the punch-plate and its support beams are shown at 144. Whilst two inputs 143 are shown, this is not essential. All that is needed is to achieve a reasonably uniform flow of fluid across the plate to the drains which ideally should be diametrically opposite these feeds.

Figure 26:
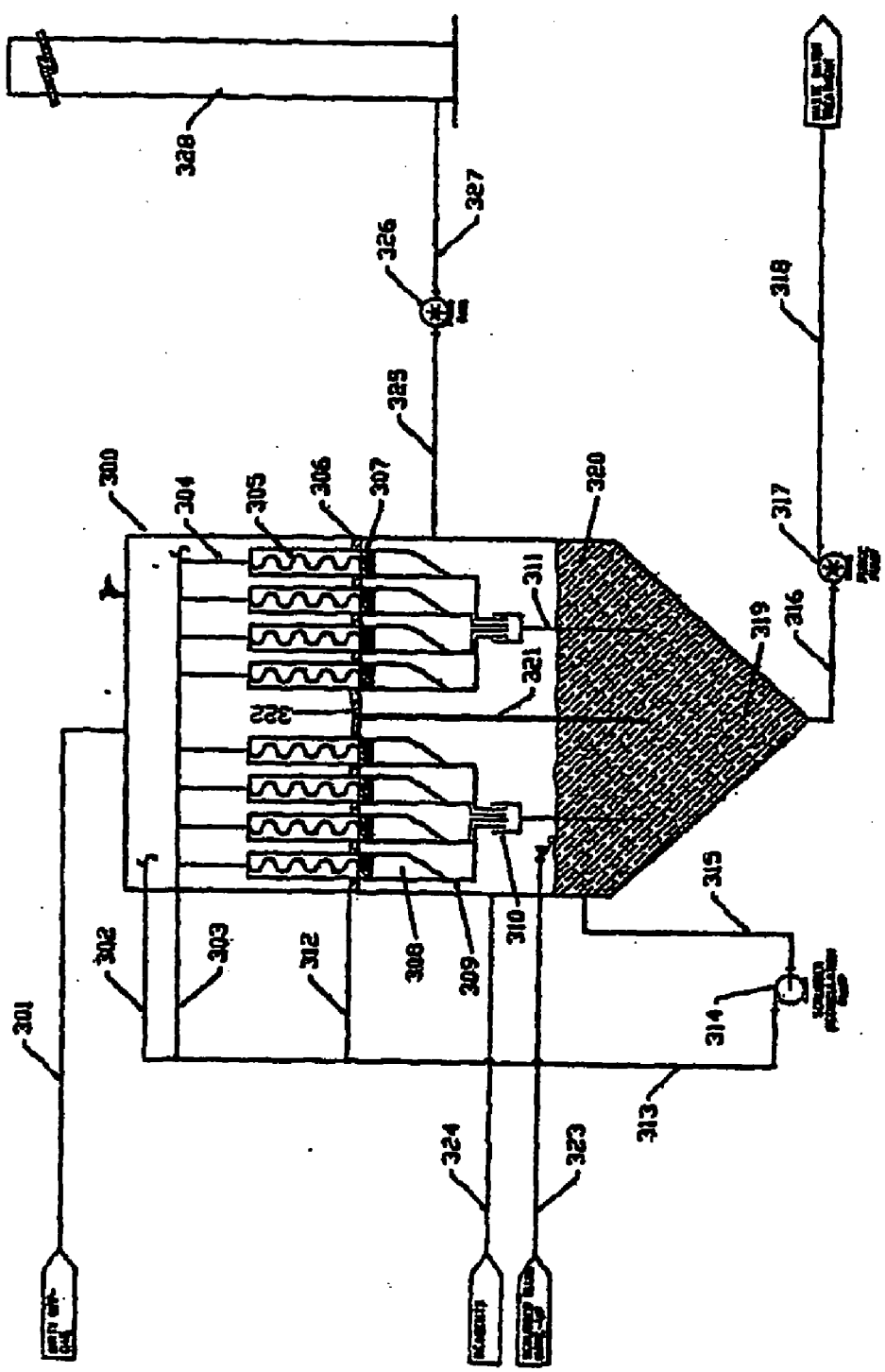
FIG. 26 is an indicative process flow diagram of the gas cleaning process.

FIG. 26 shows an indicative process flow diagram for a typical gas cleaning process. 301 represents the gas inlet duct, 302 provides an additional supply of quench or wash down spray liquor should this be needed. It should be noted that where dust concretion is a potential problem, this connection should not be used.

303 represents the main feed headers to the individual IGCP unit feeds 304. The IGCP units are shown diagrammatically at 305, mounted on a flooded punch plate 306. The spinner section of each IGCP unit is indicated at 307 with the tail pipe of the cyclonic section at 308 and vortex finder liquid drain at 309.

310 represents diagrammatically the typical four vortex finder drains into one pipe drain 311 leading into the recirculating water reservoir of scrubbing fluid 320. 312 represents the feed to the punch-plate flooding inlet, while 315 indicates the feed pipe to the recirculation pump 314, which in turn feeds the return header pipe 313.

Similarly, 316 refers to the feed pipe for the solids and salts laden purge from the carrier vessel which leads to pump 317 and hence along pipe 318 to the wastewater treatment or whatever downstream process is required. 319 refers to the solids thickening zone of the carrier vessel, while 321 shows one of the punch plate drain pipes from one of the drainage points 322 with 323 and 324 showing the scrubber fluid make-up and reagent input connections respectively.

The scrubbed gases leave via one or more ducts 325 to fan(s) 326 and outlet duct(s) 327 to the exhaust stack 328 or to wherever the scrubbed gases are to be forwarded.

FIG. 27 shows the equivalent detail to FIG. 4 but with the maximum exploitation of the potential benefit from the casting and moulding techniques referred to in section 5.3. The numbering refers to the same numbering that is used for FIG. 4 with additional numbers. 51 and 52 now point to a type of launch step which can be produced using these casting techniques and which cannot be reasonably produced when casting using normal re-usable moulds. These step details are shown in larger detail in FIG. 28.

Also shown in FIG. 27 is a single casing piece 54 which incorporates the essential profiles of the top ring 47 all the way down to the O ring joint and location spigot detail 58 which fits on to the top of the cyclonic section shown here as 59.

In this arrangement, this whole casing section 54 is joined through the spinner blades (12 on FIG. 3) to a single core piece and liquid feed distributor 55. As a result of creating this core piece as a single integral casting, none of the tie bolting is required and the hollow core inside skirt 57 can now extend all of the way up through the unit at 56, to virtually the underside of the liquid distributor. This not only greatly simplifies on site activities, it also ensures that all alignment issues between the core and the casings are completely resolved and fixed permanently during casting.

It is also obvious that this construction, whilst more complex to cast removes a great number of specific and essential tolerance areas as well as creating a somewhat lighter product.

In FIG. 29, the same structural concept as is shown in FIG. 27 is shown except that the reasonably maximum amount of thick sections within the moulding have been removed. This makes the mould formation a little more complex, as well as the casting process but it does create an even lighter construction and a product which is more resistant to thermal cycling.

Figure 30:
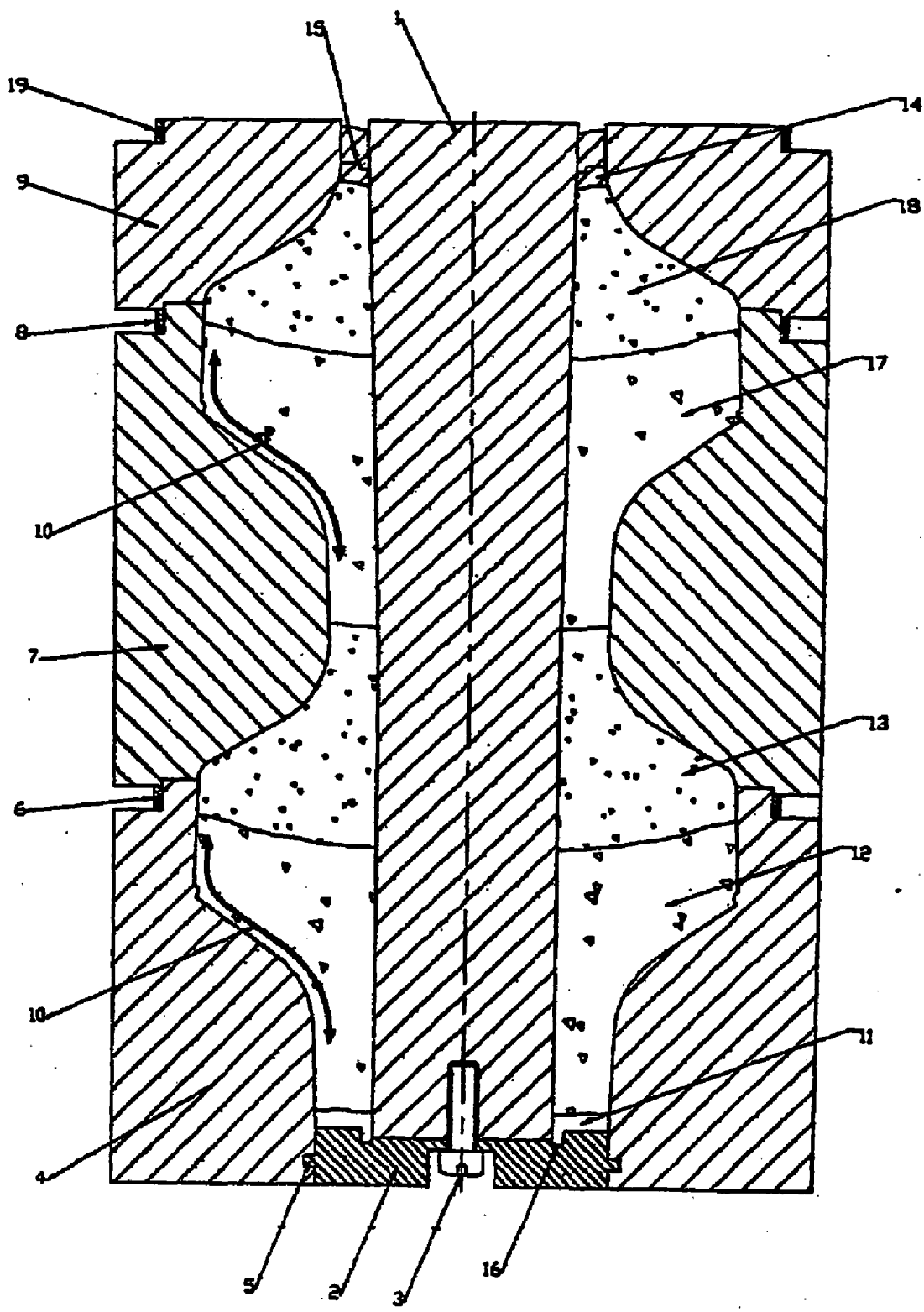

FIG. 30 shows a typical two launch points core component and the type of mould arrangements that would be employed in order to cast it. The component is cast upside down so that the main wear areas (indicated by the arrows marked 10) face downwards and outwards.

The typical locating spigots, sockets and O ring faces which enable this component to locate to and seal to its adjacent components when it is sealed into an IGCP unit are shown at 15 and 16. Both of these areas require high precision and a high quality surface finish.

The central core of the casting 1 can be sleeved in plastic film (applied as a tape) or using a thin film of shrink wrapped plastic. Alternatively but less preferably normal mould release agents can be applied.

This central core would be attached to a circular bottom plate 2 into which the detail for face 16 has been machined. In this illustration a socket head screw 3 is used for the location and fixing, but any suitable arrangement can be used.

The plate 2 will have a spigot ring or other robust and rigid attachment arrangement 5 by which it can be located and held within a two piece or more piece mould body 4. This mould body would be keyed together for alignment and secured using a strap or ring 6.

At this level of assembly, a resin rich and fine filler mix would be applied at 11 to create the necessary fine detail 16. Then a maximum abrasion and impact resistant mix would be inserted in layers into area 12 and compacted to create a good surface finish and to expel all air bubbles.

At some point towards the top of mould 4, the feeding of this mix 12 would be stopped, the top of the mould would be cleaned off and the next section of the mould 7 would be added and secured using the strap or ring 8. Mould 7 would be located to mould 4 using a spigot and socket arrangement such as is shown in FIG. 14 or some other suitable arrangement.

The next area of the casting (13) has a much reduced abrasion and impact duty. It also has a relatively flat and poorly sloped top surface which will hinder the escape of air bubbles. The mix for zone 13 can therefore have a lower abrasion resistance and greater workability. This can be achieved using either a greater resin content or a different blend of course to fine fillers. A higher resin content would be the normal solution, however, these components will be subject to heat cycling and the material in 13 must behave in a similar manner to that in 12, and it must conduct heat at a similar rate to that in 12.

A compromise mix for 13 is therefore required, having a high filler content similar to that of 12 with sufficient workability to create a reasonable surface finish and air exclusion.

Once in the narrow section the mix and its application for 17 will change again to the same mix as was used at 12.

Then mould 9 would be applied and held in place with ring 19 in the same way as for mould 7 and ring 8. Then area 18 would be filled using the same mix and technique as was used for 13.

Mix 18 would be applied up to a level of 1-5 mm short of the top of the product core piece 15. At this point, a new formulation 14 would need to be applied which could be post machined in order to create the profile 15. Mix 14 would be applied to a level of at least 3 to 4 mm above the profile 15 so as to ensure that any air bubbles which may rise following filling will rise to a point just above profile 15.

The above description applies to a normal moulding technique. However "Lost Wax" types of techniques can also be employed. This technique can be used to create much more complex shapes and would in general be needed for the spinner section.

In the above example, the stepped edge to the launch point is able to be cast using a split outer mould. However, for an equivalent casing ring or group of casing rings, this profile will require either the use of a separate mould insert, a collapsible core or a lost wax technique. In this environment, collapsible cores are unlikely to have a tool life which can justify their cost. The lost wax process would therefore appear to be the optimum.

Derakane 470 Turbo resins require high temperature post cure and this needs to be carried out at successive stages.

Particularly at the first stage, the dimensional stability of the moulded product is not good, but with conventional release agents, migration of the release agent during post curing is common. This leads to mould release problems if the product is post cured in/on the mould. The choice of a "wax" which does not melt until the part is heated to the second and final post cure stage will enable the product to be kept in shape during the critical (from a shape point of view) first post cure.

This concept then enables the whole IGCP unit to be created as a single casting using the above methodology and a sequence of lost wax components as well as a sequence of external split moulds.

Figure 31:
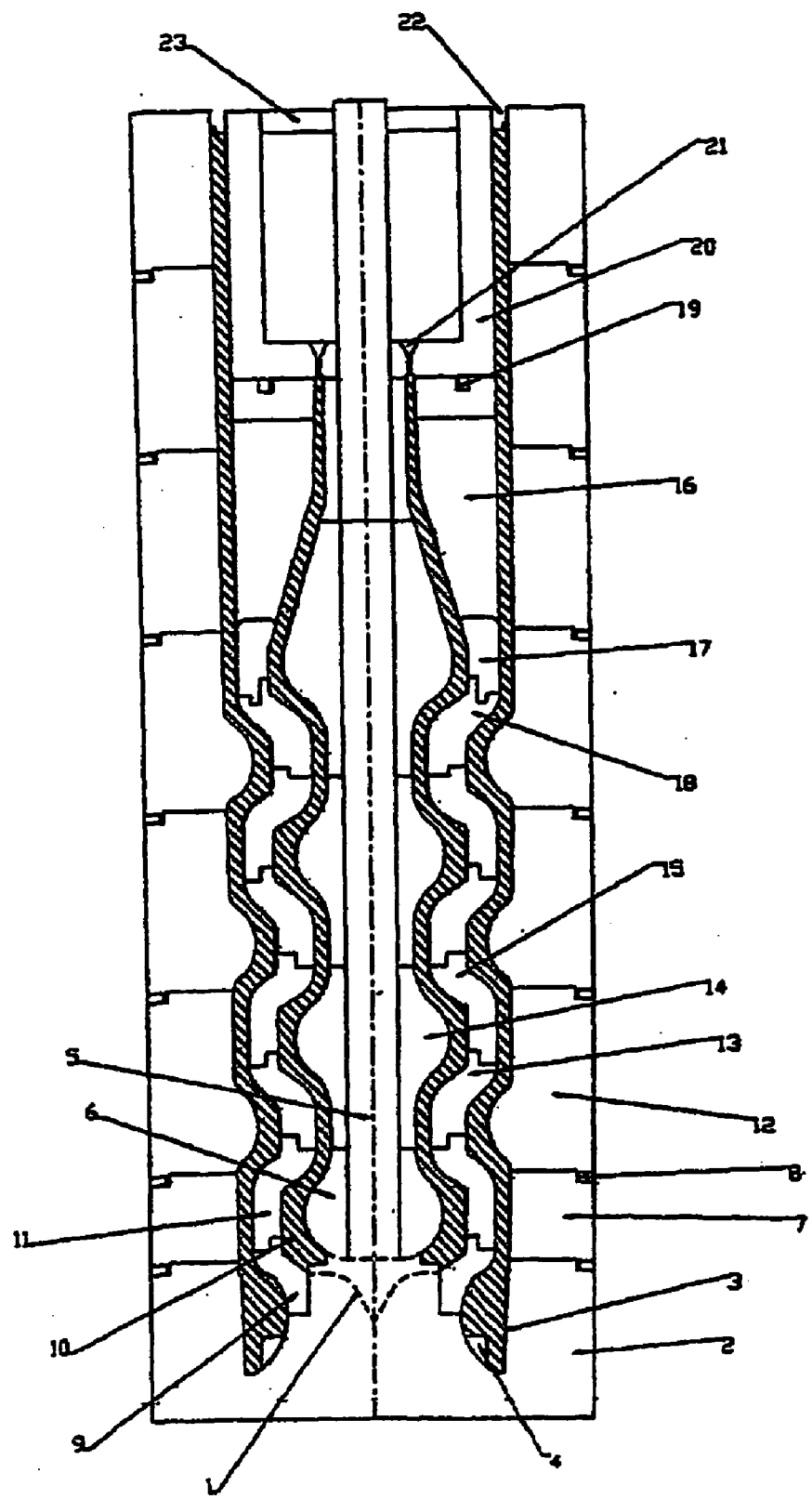
Figure 32:
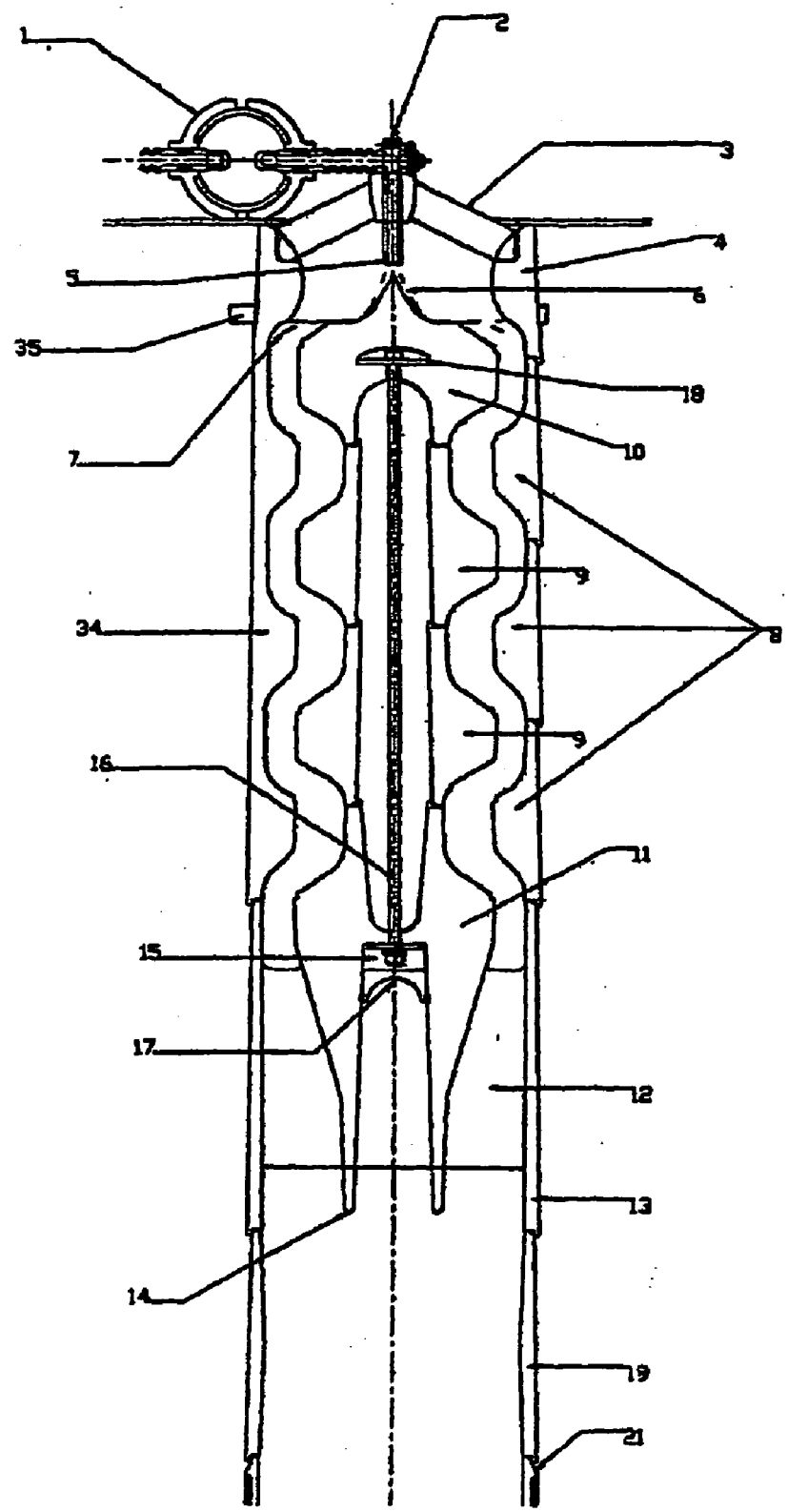

FIG. 31 shows a potential way by which this can be achieved.

The whole IGCP unit would be cast upside down with the centre feed distributor cone 1 omitted. This feature would be necessary to enable any post cure distortions to be accommodated such that the point of the cone is central and the launch step on this feed distributor aligns correctly with the inner receiving radius of the casing section 3. This feed distributor 1 would be cast separately (as would the feed boss and its spokes) and located accurately and resin bonded in place once the full post cure has taken place.

The moulds would be supported on a suitable base 2 into which would be machined the top profile of the casing 3 including notches 4 for the spokes of the feed boss. Rigidly mounted on the base 2 would be a centre bar 5 upon which the whole assembly would be centred.

Moulding would proceed basically as described for FIG. 30 with the first lost wax piece 9 being inserted once area 3 was part full. In this instance, there is no specific seal or other faces to be created and therefore a resin and fines rich input (11 on FIG. 30) would not be needed.

Then as mould filling progresses, the outer casing split mould 7 would be added and secured by the tie or ring 8. This would be followed by the lost wax piece 6.

Filling would then commence on the core section as well as the casing section.

Then the lost wax piece 11 would be added, followed by the split mould 12 followed by lost wax piece 13 and then by core piece 14 followed by 15.

The procedure would then continue in the same way up to the start of the spinner section. The 6 or 8 blades 16 will be created by assembling 6 or 8 lost wax infill pieces 17 between each blade. These would slot into the top of the last annulus lost wax piece 18 so as to locate them and they would be secured above the trailing edge of the spinner blades with a tie or ring 19.

Once the spinner blades are completed, the inside of the wear ring section and the top of the annular skirt lost wax piece 20 would be inserted. This could have a number of small tundish feeds and vent holes 21 to enable the top edge of the skirt to be created using a resin rich material.

The outside wear skirt would then continue to be cast up to the top and the O ring face 22 would be overcast in the same way as was described for face 15 in FIG. 30.

Disc 23 would serve to locate the top of the lost wax piece 20.

Once initial curing has occurred the outer split casing can be removed and then the whole unit can then be post cured. This post cure would be firstly at a temperature below the melting point of the wax and then once it is fully cured at this temperature, at about 180° C. or as required. During this second cure, the wax would melt out leaving ring 19 free to be removed and reused.

FIG. 32 shows, for comparison, a single removable casing piece 34 on the left hand side of the Figure, relative to a multiple stacked casing ring assembly 8 on the right Also, on the left, the necessary tapered flow profile is created by keeping the core piece (9) profiles constant over the height of the unit and tapering in the casing 34. The amount of taper which can be created on the outside of the unit is clearly demonstrated by the width of the elastomeric ring 35 on the left relative to that which would be needed for the right hand arrangement.

On the right hand side of FIG. 32, the necessary taper is created by keeping the casing rings 8 constant and having variable sized core pieces 9 and 10. With this right handed arrangement, the IGCP units have to be assembled and taken apart on the basis of one core, one casing ring, one core, one casing ring, etc. However in this detail, the single casing 34 can be slid over the central core. This enables cleaning, scale removal and wear assessment to be simplified.

Whilst it is not shown here when the casting techniques referred to in section 5.3 are exploited, the wear ring 19 can be made integral with the spinner skirt section 13.

It will be appreciated that many variations in detail are possible without departing from the scope or spirit of the invention as claimed in the claims herein after, such as the application of the method and equipment to other off-gases and dust emissions.

The invention claimed is:

1. Equipment for use in the removal of at least one of relatively fine particulates and components from a first substance, using a second substance, the equipment including a static, co-current contacting mixer section having a plurality of stages defining a flow path, with a flow profile, for the first and the second substance, at least one stage being shaped to define a substantially curved flow path section having an effective centre of curvature located to one side of the flow path, an outside surface and an inside surface between the outside surface and the centre of curvature; at least one immediately adjacent stage being shaped to define an oppositely curved flow path section having a centre of curvature on an opposite side of the flow path, an outside surface and an inside surface between the outside surface and the centre of curvature whereby, as the first and second substances flow through the mixer section, the second substance and particles present in the first substance migrate through the first substance, first in one direction relative to a general flow direction and then in a substantially opposite direction to promote interphasic interaction, the flow path characterised in being provided with an edge formation in a region between said adjacent stages so as to enhance launch of the second substance on the outside surface of the curved flow path section of said at least one stage towards the outside surface of the oppositely curved flow path section of the immediately adjacent stage, thus increasing the interphasic interaction.

2. Equipment as claimed in claim 1 wherein the first substance is a gas and the second substance is a scrubbing fluid.

3. Equipment as claimed in claim 2 wherein the edge formation is stepped, with a substantially perpendicular face relative to the edge formation to enhance the launch of the scrubbing fluid.

4. Equipment as claimed in claim 3 wherein the stepped edge formation is provided with a ledge subsequent to the step to define a first and a second step, the first and the second step being arranged so as to encourage a small back eddy of gas immediately beneath the first step that deflects any downwards dribble of scrubbing fluid around the stepped edge back up into an underside of the main fluid flow as it leaves the first step so as to enhance the contact between the launched fluid and the gas.

5. Equipment as claimed in claim 4 wherein the edge formation defines a fillet radius between the perpendicular face and the ledge to ensure maximum effect from the back eddy.

6. Equipment as claimed in claim 4 or claim 5 wherein the length of the perpendicular face is similar to the length of the ledge.

7. Equipment as claimed in claim 1 wherein the mixer comprises a plurality of adjacent stages with oppositely curved flow path sections and wherein an edge formation is provided between each of such adjacent stages.

8. Equipment as claimed in claim 7 wherein the flow path is configured and dimensioned to orientate both the angle and the position of each launch with respect to the subsequent shape of the flow profile and to the controlled change in direction of the flow profile so as to catch the maximum of the scrubbing fluid that is launched at a landing zone on the opposite side of the flow profile before a subsequent launch so as to enhance the scrubbing effect from the bulk of the scrubbing fluid.

9. Equipment as claimed in claim 8 wherein the flow path has a flow profile that is configured and dimensioned, with a step towards the start of each inside radius, such that the position of launch of effectively the bulk of the scrubbing fluid is towards the beginning of each inside curve so as to enhance the contact between the launched scrubbing fluid and the gas.

10. Equipment as claimed in claim 2 wherein the flow path has a flow profile that is configured and dimensioned such that the scrubbing fluid leaves at the point of launch as a substantially single, flat layer of fluid, thereby ensuring that the minimum of droplets are released within the shadow of droplets that left prior thereto so as to maximize the contact between the launched fluid and the gas.

11. Equipment as claimed in claim 2 wherein the flow path has a flow profile that is configured and dimensioned such that the bulk of the scrubbing fluid reaches the far side of the flow profile before the scrubbing fluid on that side is released at the position of launch towards the beginning of the next bend so as to maximize the contact between the launched scrubbing fluid and the gas.

12. Equipment as claimed in claim 3 wherein the flow path has a flow profile that is configured and dimensioned such that, by the angle of the lead up to that step and the introduction of substantially axially orientated straight sections to the flow profiles, the scrubbing fluid, when reaching the opposite side wall, arrives at an angle of approach which approaches zero degrees so as to maximise the recovery of the energy of the droplets within the surface film and therefore to minimise abrasion at the landing zone.

13. Equipment as claimed in claim 3 wherein the flow path has a flow profile that is configured and dimensioned, by the introduction of substantially axially orientated straight sections to the flow profiles, so that the distance from the landing zone to the subsequent launching point is reduced so as to minimise the subsequent effects of viscous drag on the landing velocity of the fluid.

14. Equipment as claimed in claim 3 wherein the flow path has an increased launch angle of between about 3° and 10° relative to that which is used for the outer annulus.

15. Equipment as claimed in claim 3 wherein the flow path is configured and dimensioned to provide an increased gas velocity down the inner annulus of between about 5 and 25% relative to that down the outer annulus.

16. Equipment as claimed in claim 3 wherein the flow path has a flow profile that is characterised in that the bend that gathers the scrubbing fluid ready for launching into the outer annulus is configured and dimensioned such that the scrubbing fluid droplet impingement and film velocity on this bend and at the subsequent launch point are no more severe than for that at the equivalent point in the outer annulus.

17. Equipment as claimed in claim 3 wherein the flow path has a flow profile that is configured and dimensioned such that the section of the flow profile leading from each inner annular zone to the respective following outer annular zone optimises recovery of the extra velocity energy in the inner annulus area back to pressure energy at the outer annulus.

18. Equipment as claimed in claim 3 wherein the flow path has a flow profile downstream of the landing zone for the bulk of the droplets wherein the flow area increases substantially steadily and progressively whilst maintaining a relatively constant flow direction and achieving a substantial portion of the flow area of the outer annulus prior to the outer annulus launch point and prior to the associated change in direction of the gas flow.

19. Equipment as claimed in claim 3 wherein the mixer section is characterized in achieving removal efficiencies of above 90% of particle sizes of less than 0.05 micron.

20. Equipment as claimed in claim 2 wherein the gas is waste gas from a modern high-performance Sinter Plant.

21. Equipment as claimed in claim 2 wherein the mixer section is provided with a scrubbing fluid inlet, the scrubbing fluid inlet being configured and dimensioned to create relative adiabatic quenching of the gases.

22. Equipment as claimed in claim 21 wherein the adiabatic quenching of the gases is to a temperature of between 20 and 60° C.

23. Equipment as claimed in claim 22 wherein the adiabatic quenching of the gases is to a temperature of about 30 to 50° C.

24. Equipment as claimed in claim 2 wherein the scrubbing fluid inlet is arranged such that the bulk of the scrubbing fluid retains a large droplet form and a low launch velocity relative to the droplet sizes and launch velocities in the subsequent stages in the mixer section.

25. Equipment as claimed in claim 2 including a cyclonic section for the separation of the gas and the scrubbing fluid.

26. Equipment as claimed in claim 25 wherein the cyclonic section fits substantially within the same cylindrical profile as that of the mixer section.

27. Equipment as claimed in claim 26 wherein the outlet for the scrubbing fluid is connected in an axial direction and substantially within the same overall cylindrical profile.

28. Equipment as claimed in claim 25 wherein the cyclonic section is provided with an exit end in the form of a vortex finder configured and dimensioned to duct away the main vortex of the substantially scrubbing fluid free gas while gathering the substantially gas free scrubbing fluid off the wall of the cyclonic section.

29. Equipment as claimed in claim 25 characterized in having a cyclonic section of predetermined length in order to retain the radial velocity component of the gas flow within the cyclone body within a range required to get the required degree of separation of scrubbing fluid droplets prior to discharging the gas.

30. Equipment as claimed in claim 29 wherein the distance between the spinner section and the top of the vortex finder is about 5 to 10 times the diameter of the cyclonic section.

31. Equipment as claimed in claim 30 wherein the cyclonic section has a length of about 1.5 to 2.5 metres and a diameter of about 0.1 to 0.5 metres.

32. Equipment as claimed in claim 31 wherein the cyclonic section has a length of about 2 metres and a diameter of about 0.3 metres.

33. Equipment as claimed in claim 2 including a spinner section, having a set of angled blades for imparting a circulatory motion to the gas and scrubbing fluid mixture prior to entry of the cyclonic section.

34. Equipment as claimed in claim 33 wherein the width of the flow path through the spinner section is increased radially so that the cross sectional area for the flow is maintained relatively constant as the flow direction changes, thus retaining relative exit velocities of the gas and the scrubbing fluid substantially similar to the respective entry velocities.

35. Equipment as claimed in claim 33 wherein the spinner section is configured and dimensioned so that any object that can pass through the main mixer section can also pass through the spinner section.

36. Equipment as claimed in claim 33 wherein the spinner section is provided with an annulus through which the gases and scrubbing fluid flow so as to calm the bulk of any residual turbulence from the spinner blades.

37. Equipment as claimed in claim 36 wherein the annulus has an inner, substantially hollow profile with a cylindrical recess with a suitably shaped inner end in order to remove droplets of scrubbing fluid that contaminate the scrubbed and cycloned product gases.

38. Equipment as claimed in claim 3 including a centrally orientated, discharge pipe relatively to the vortex finder, with a diameter of about 70 to 90 % of that of the vortex finder outlet, providing an annular gap there between.

39. Equipment as claimed in claim 38 wherein the annular gap is configured and dimensioned to pass debris that could access the equipment and wider than the typical maximum splash and spray layer that would accompany the scrubbing fluid as it runs down the inner walls of the cyclonic section.

40. Equipment as claimed in claim 33 wherein the gap is configured and dimensioned so that the minimum width of the annular gap at the vortex finder is based on the concept of capturing all the splash and spray into this annular area.

41. Equipment as claimed in claim 33 wherein the mixer section, the spinner section and the cyclonic section are cast in a single, substantially integral unit.

* * * * *